United States Patent
Rayl

(10) Patent No.: US 7,979,195 B2
(45) Date of Patent: Jul. 12, 2011

(54) VALVETRAIN CONTROL SYSTEMS FOR INTERNAL COMBUSTION ENGINES WITH MULTIPLE INTAKE AND EXHAUST TIMING BASED LIFT MODES

(75) Inventor: Allen B. Rayl, Waterford, MI (US)

(73) Assignee: GM Global Technology Operations LLC, Washington, DC (US)

( * ) Notice: Subject to any disclaimer, the term of this patent is extended or adjusted under 35 U.S.C. 154(b) by 754 days.

(21) Appl. No.: 12/062,918

(22) Filed: Apr. 4, 2008

(65) Prior Publication Data
US 2009/0070015 A1 Mar. 12, 2009

Related U.S. Application Data

(60) Provisional application No. 60/993,047, filed on Sep. 7, 2007.

(51) Int. Cl.
*F02D 45/00* (2006.01)
*F01L 1/34* (2006.01)
(52) U.S. Cl. .................. 701/105; 123/90.15
(58) Field of Classification Search .......... 123/435–438, 123/321, 322, 90.11, 90.15, 90.16; 701/102–105, 701/115
See application file for complete search history.

(56) References Cited

U.S. PATENT DOCUMENTS

| | | | |
|---|---|---|---|
| 6,343,581 B2 | 2/2002 | Suzuki | |
| 6,390,054 B1 | 5/2002 | Yang | |
| 6,450,136 B1 | 9/2002 | Klomp | |
| 6,637,393 B2 | 10/2003 | Sutherland | |
| 6,971,365 B1 | 12/2005 | Najt | |
| 7,080,613 B2 | 7/2006 | Kuo | |
| 7,093,568 B2 | 8/2006 | Yang | |
| 7,121,254 B2 | 10/2006 | Wickman | |
| 7,231,998 B1 * | 6/2007 | Schechter | 180/165 |
| 7,462,129 B2 * | 12/2008 | Hrovat et al. | 477/107 |
| 7,529,637 B2 * | 5/2009 | Snyder | 702/138 |
| 7,712,441 B2 * | 5/2010 | Cinpinski et al. | 123/90.15 |
| 2005/0028764 A1 * | 2/2005 | Mitani et al. | 123/90.15 |
| 2008/0066701 A1 * | 3/2008 | Sun | 123/90.11 |

FOREIGN PATENT DOCUMENTS

WO WO2007/017109 2/2007

OTHER PUBLICATIONS

U.S. Appl. No. 12/062,869, filed Apr. 4, 2008, Allen B. Rayl.
U.S. Appl. No. 12/062,890, filed Apr. 4, 2008, Allen B. Rayl.
U.S. Appl. No. 12/062,920, filed Apr. 4, 2008, Allen B. Rayl.
U.S. Appl. No. 12/062,938, filed Apr. 4, 2008, Allen B. Rayl.

* cited by examiner

*Primary Examiner* — John T Kwon
*Assistant Examiner* — Johnny H Hoang

(57) ABSTRACT

A valve control system for an internal combustion engine includes a valve actuation system that actuates each of an intake valve and an exhaust valve between N open lift modes where N is an integer greater than one. A control module defines a switching window having a start time based on intake valve timing and an end time based on exhaust valve timing. The control module enables transitioning of at least one of the intake and exhaust valves between the N open lift modes based on the switching window.

24 Claims, 47 Drawing Sheets

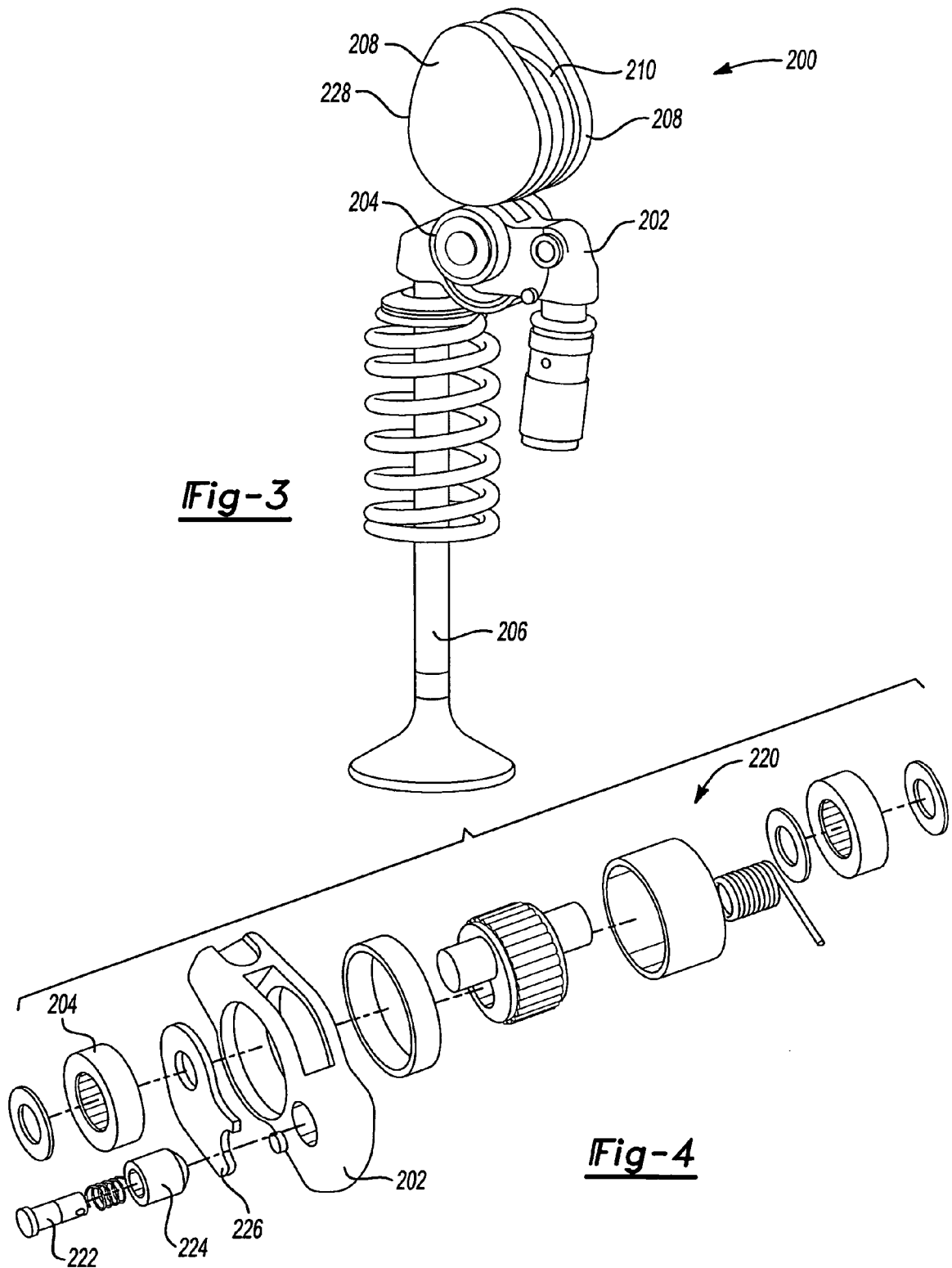

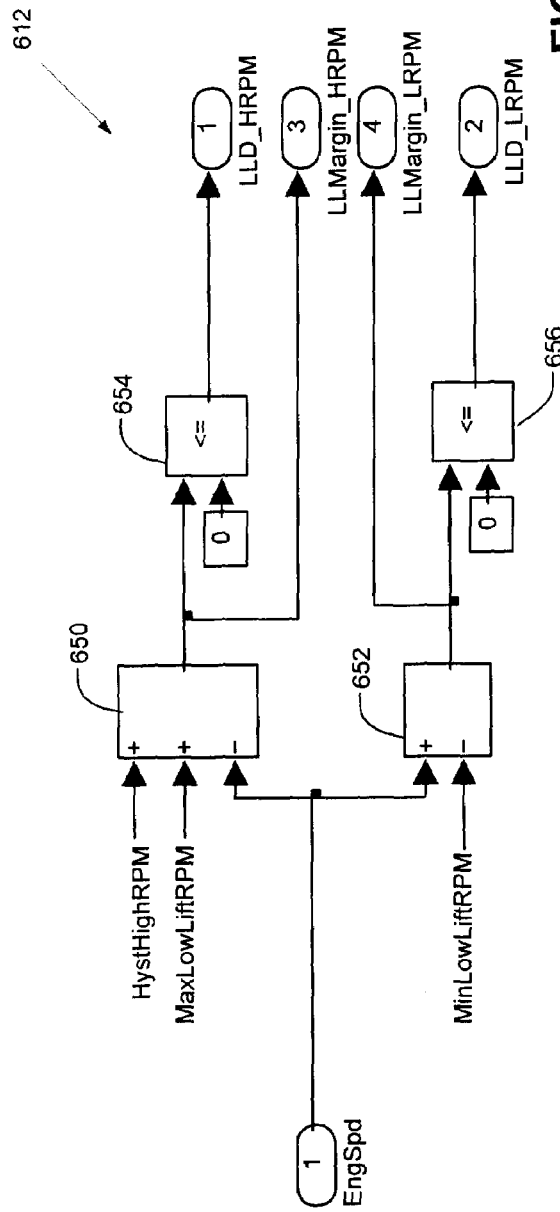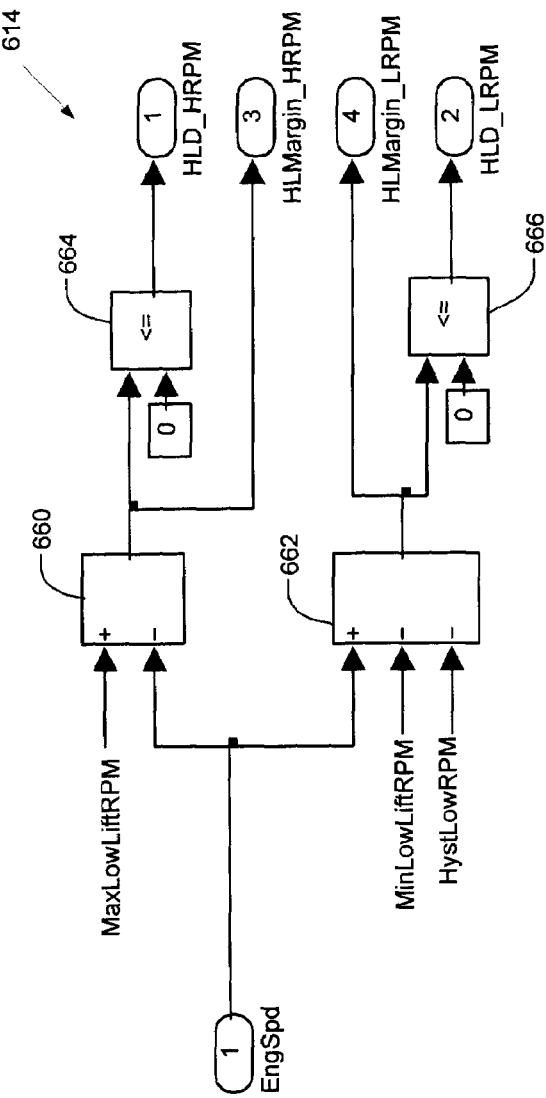
FIG. 22
FIG. 23

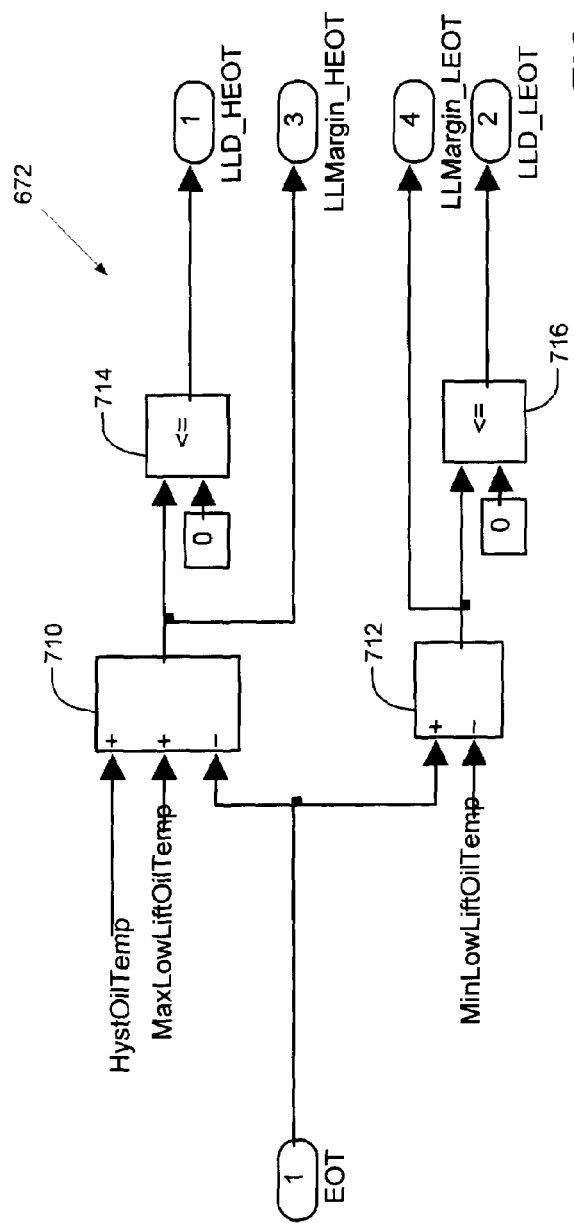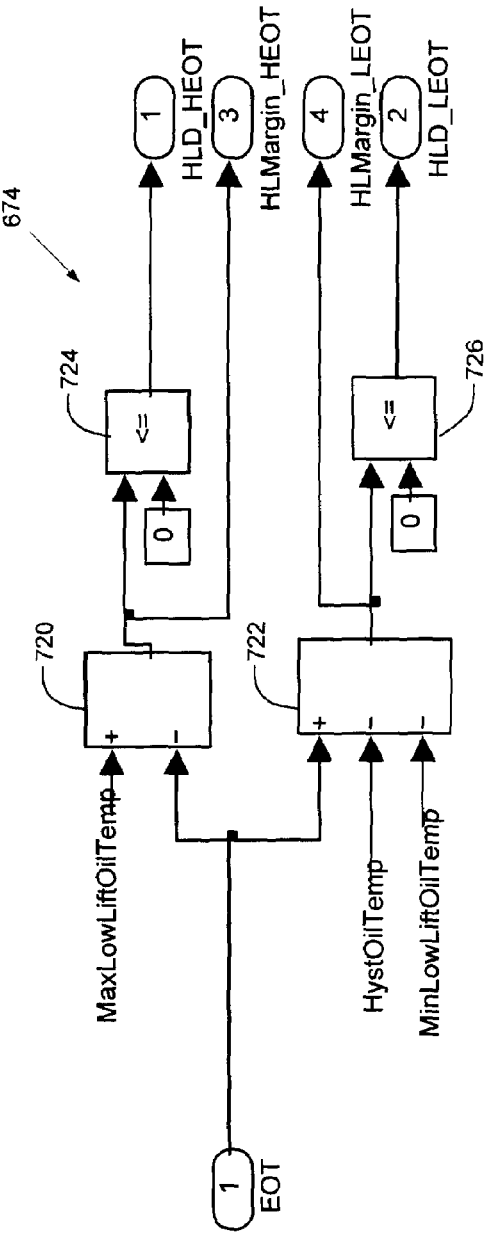

VALVETRAIN CONTROL SYSTEMS FOR INTERNAL COMBUSTION ENGINES WITH MULTIPLE INTAKE AND EXHAUST TIMING BASED LIFT MODES

CROSS-REFERENCE TO RELATED APPLICATIONS

This application claims the benefit of U.S. Provisional Application No. 60/993,047, filed on Sep. 7, 2007. This application is related to U.S. patent application Ser. Nos. 12/062,890 filed on Apr. 4, 2008, 12/062,869 filed on Apr. 4, 2008, 12/062,920 filed on Apr. 4, 2008, and 12/062,938 filed on Apr. 4, 2008. The disclosures of the above applications are incorporated herein by reference in their entirety.

FIELD OF THE INVENTION

The present invention relates to internal combustion engines, and more particularly to valve train systems of internal combustion engines and control thereof.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A homogeneous charge compression ignition (HCCI) refers to a form of internal combustion within an internal combustion engine. HCCI compressing a mixture of fuel and oxidizer to a point of auto-ignition. The auto-ignition release chemical energy that is translated into work and heat. In an HCCI engine ignition occurs at several places at a time which makes a fuel/air mixture burn nearly simultaneously. An HCCI engine performs closer to an ideal OTTO cycle, provides improved operating efficiency (operates leaner), and generates less emissions than spark ignition engines. However, since there is no direct initiator of combustion, the ignition process is inherently challenging to control.

To achieve dynamic operation in an HCCI engine a control system may alter the conditions that induce combustion. For example, a control system may adjust compression ratios, induced gas temperature, induced gas pressure, or the quantity of retained or reinducted exhaust. Several approaches have been used to perform the stated adjustments and thus extend the HCCI operating region by providing finer control over temperature-pressure-time histories within a combustion chamber.

One approach is variable valve timing. Compression ratios can be controlled by adjusting when intake valves close. The amount of exhaust gas retained in a combustion chamber can be controlled by valve re-opening and/or valve overlap. Variable valve timing is limited in control over the auto-ignition process.

Another approach that is used to further increase control is referred to as a "2-step" intake valve lift approach. The 2-step intake valve lift approach includes switching intake valve modes of operation between a HIGH lift mode and a LOW lift mode, which have corresponding lift profiles. During the HIGH lift mode, the intake valves are lifted to a HIGH level to allow for a predetermined volume of air to enter the corresponding cylinders. During the LOW lift mode, the intake valves are lifted to a LOW level, which allows a smaller predetermined volume of air to enter the corresponding cylinders relative to the HIGH lift mode. Current 2-step approaches tend to exhibit inconsistent and non-uniform lift transitions and thus inconsistent end results.

SUMMARY

In one exemplary embodiment, a valve control system for an internal combustion engine includes a valve actuation system that actuates each of an intake valve and an exhaust valve between a N open lift modes where N is an integer greater than one. A control module defines a switching window having a start time based on intake valve timing and an end time based on exhaust valve timing. The control module enables transitioning of at least one of the intake and exhaust valves between the N open lift modes based on the switching window.

In other features, a valve control system for an internal combustion engine is provided and includes a vehicle control module that generates a lift mode command signal to transition at least one of an intake valve and an exhaust valve between N open lift modes, where N is an integer greater than one. A time module generates a response time signal that indicates a duration for performing the transition and a lift limit signal that disables the transition. The time module generates the response time signal and the lift limit signal based on a current lift mode signal and a status signal. The current lift mode signal indicates a current lift state of at least one of the intake valve and the exhaust valve. The status signal indicates status of a lift control valve. The lift control valve actuates at least one of the intake valve and the exhaust valve. The event module generates the current lift mode signal and the status signal based on the lift command signal, the response time signal, and the lift limit signal. At least one of the time and event modules enables the transition.

In other features, a valve control system for an internal combustion engine is provided and includes a valve actuation system that actuates at least one of an intake valve and an exhaust valve between N open lift modes, where N is an integer greater than one. A control module enables transitioning of at least one of the intake and exhaust valves between said N open lift modes based on at least one of an oil pressure signal, a lift control valve temperature, and an oil temperature.

In other features, a valve control system for an internal combustion engine is provided and includes a valve actuation system. The valve actuation system includes at least one of first and second configurations. The first configuration includes a shared lift control valve that actuates an intake valve and an exhaust valve between N open lift modes, where N is an integer greater than one. A second configuration includes a first lift control valve that actuates the intake valve and not the exhaust valve and a second lift control valve that actuates the exhaust valve and not the intake valve between the N open lift modes. A control module that enables transitioning of at least one of the intake and exhaust valves between the N open lift modes for the first and second configurations.

In other features, a valve control system for an internal combustion engine is provided and includes a valve actuation system. The valve actuation system includes lift control valves that actuate at least one of an intake valve and an exhaust valve between N open lift modes, where N is an integer greater than one. A control module enables transitioning of at least one of the intake valve and the exhaust valve between the open lift modes. The control module synchronizes transitions between the N open lift modes with crankshaft and valvetrain timing. The control module generates an engine position synchronization signal based on the transitioning.

In other features, a valve control system for an internal combustion engine is provided and includes a valve actuation system. The valve actuation system actuates at least one of an intake valve and an exhaust valve between N open lift modes via lift control valves. The control module enables transitioning of at least one of the intake valve and the exhaust valve between the N open lift modes. The control module defines M valve leading modes that indicate whether the intake valve transitions between the N open lift modes before, during the same time period, or after the exhaust valve. The control module selectively transitions the intake valve and the exhaust valve based on a current one of the M valve leading modes. N and M are integers greater than one.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein:

FIG. 3 is a perspective view of a switchable valve lift actuating mechanism in relation to a set of camshaft lobes and in accordance with an embodiment of the present disclosure;

FIG. 4 is an exploded view of the switchable valve lift actuating mechanism of FIG. 3;

FIG. 22 is a functional block diagram of a speed low lift module of FIG. 21

FIG. 23 is a functional block diagram of a speed high lift limit module of FIG. 21

FIG. 25 is a functional block diagram of a engine oil temperature low lift module of FIG. 24;

FIG. 26 is a functional block diagram of a engine oil temperature high lift module of FIG. 24;

DETAILED DESCRIPTION

Figure 1:
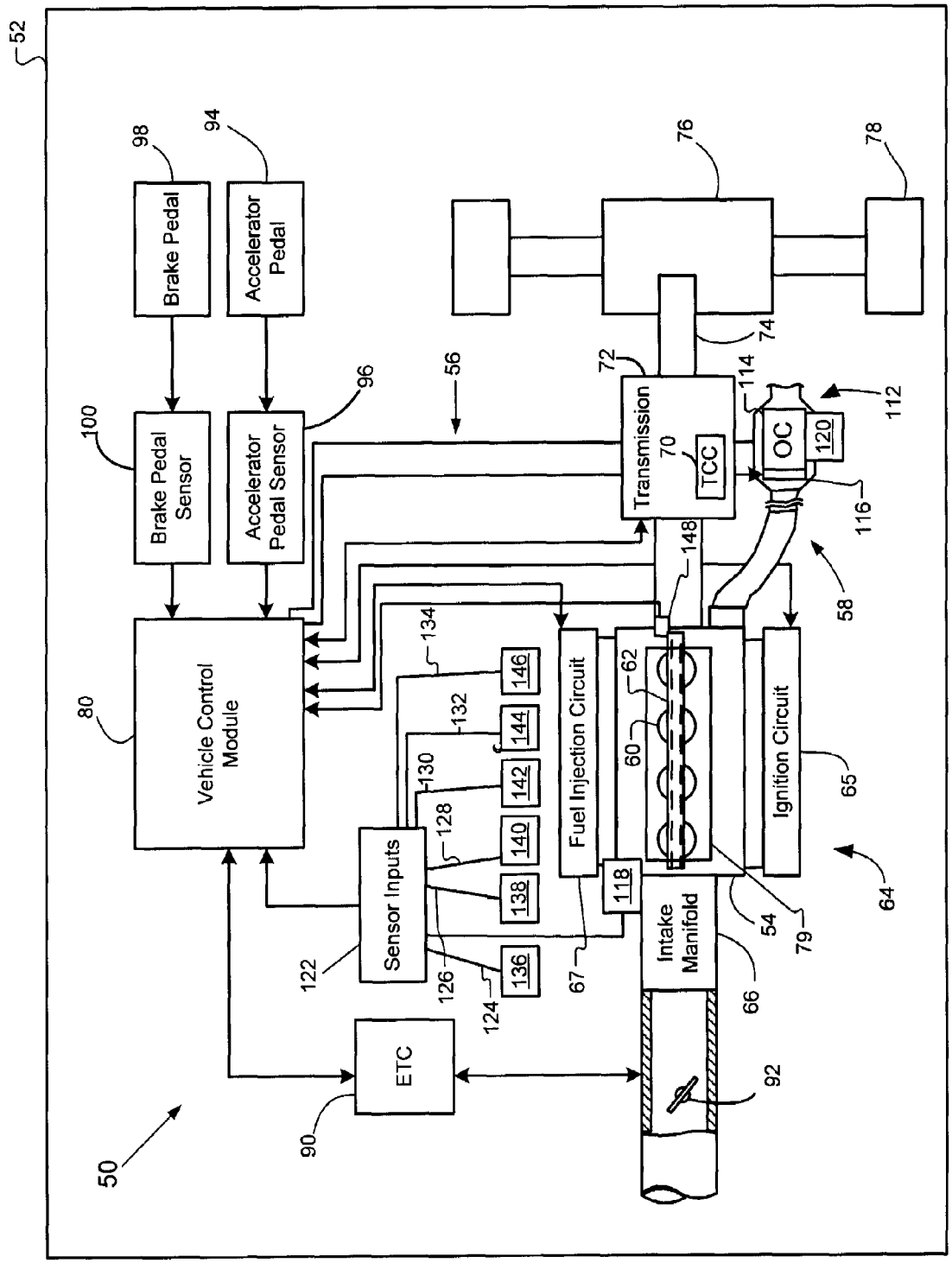
FIG. 1 is a functional block diagram of an internal combustion engine system incorporating valve lift control in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are continuously repeated during operation of the engine.

In addition, although the following embodiments are described primarily with respect to example internal combustion engines and homogeneous charge compression ignition (HCCI) engines, the embodiments of the present disclosure may apply to other internal combustion engines. For example, the present invention may apply to compression ignition, spark ignition, homogenous spark ignition, stratified spark ignition, and spark assisted compression ignition engines.

Also, in the following described Figures, reference labels that refer to signals, devices, objects, elements, etc. in one Figure may or may not refer to other signals, devices, objects, elements, etc. in another Figure, which have the same reference label. For example, a signal in a first figure that has the same reference label as a signal in a second figure may be the same signal, may refer to a similar signal, a similar signal generated during a different time period, or may be a different signal.

Referring now to FIG. 1, a functional block diagram of an internal combustion engine system 50, more specifically, an HCCI engine system incorporating variable valve lift control is shown. The HCCI engine system 50 is on a vehicle 52 and includes a HCCI engine 54, a valve lift control system 56, and an exhaust system 58. The valve lift control system 56 controls variable opening lift operation of intake and exhaust valves of the engine 54. The intake and exhaust valves of the engine 54 may each operate in 2-step, multi-step, or variable lift modes. The 2-step mode may include, for example, HIGH lift and LOW lift modes. The multi-step mode may include any number of lift modes. The variable lift mode refers to continuously variable control over lift position of intake and exhaust valves. The embodiments disclosed herein provide repeatable, consistent, uniform, and reliable control over operation of intake and exhaust valves and mode transition thereof. The variable valve lift control system 56 operates based on various characteristics and parameters of the engine 54.

Figure 2:
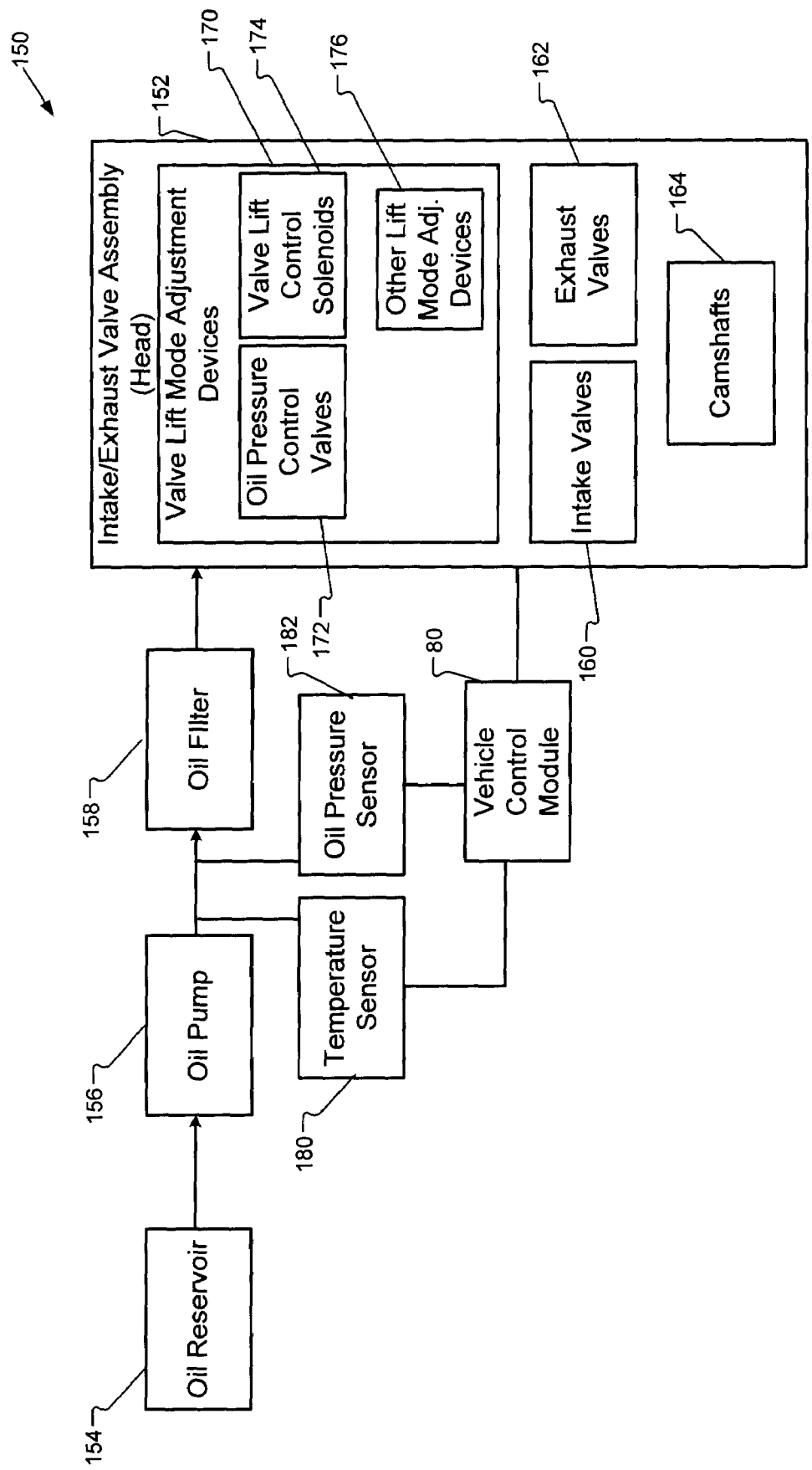
FIG. 2 is a functional block diagram of a valve lift control circuit in accordance with an embodiment of the present disclosure.
Figure 5:
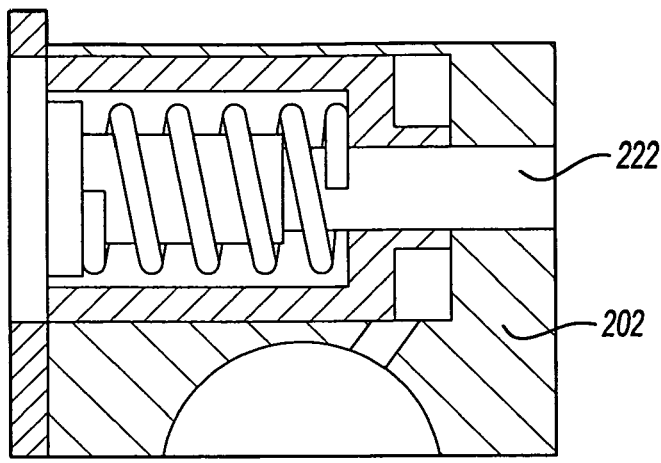
FIG. 5 is a side cross-sectional view of lift pin actuating portion of the switchable valve lift actuating mechanism of FIG. 3.
Figure 6:
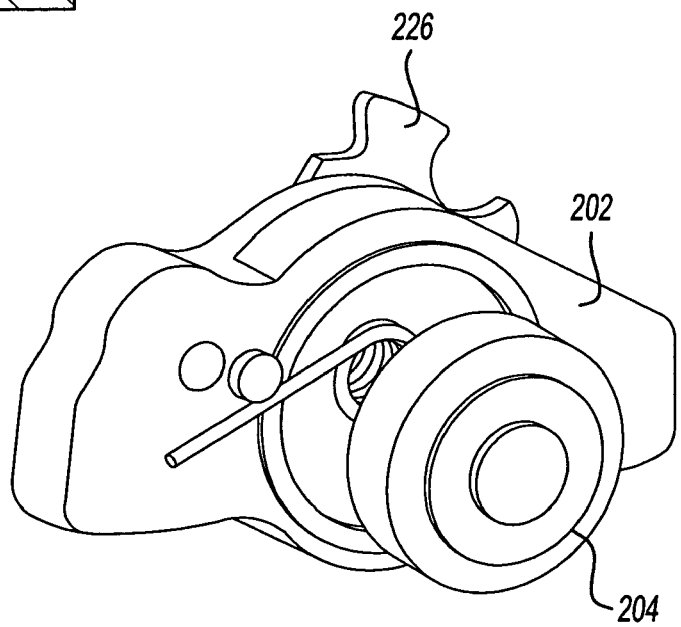
FIG. 6 is a side perspective view of rocker assembly of the switchable valve lift actuating mechanism of FIG. 3.
Figure 7:
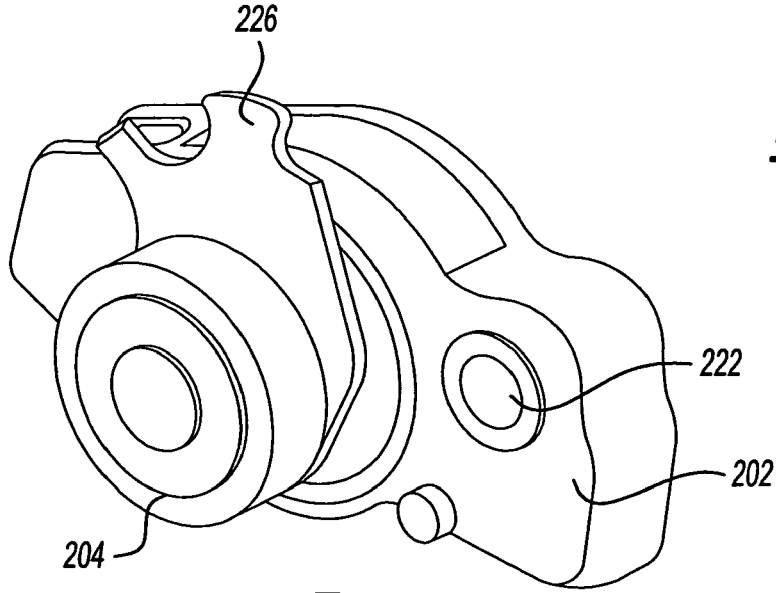
FIG. 7 is another side perspective view of rocker assembly of the switchable valve lift actuating mechanism of FIG. 3.

The engine 54 has cylinders 60. Each cylinder 60 may have one or more intake valves and/or exhaust valves. Each cylinder 60 also includes a piston that rides on a crankshaft 62. The engine 54 is configured with at least a portion of the valve lift control system 56 and may be configured with an ignition system 64 with an ignition circuit 65. The engine 54 is also configured with a fuel injection circuit 67, and the exhaust system 58. The engine 54 includes an intake manifold 66. The engine 54 combusts an air and fuel mixture to produce drive torque. The engine 54, as shown, includes four cylinders in an in-line configuration. Although FIG. 2 depicts four cylinders (N=4), it can be appreciated that the engine 54 may include additional or fewer cylinders. For example, engines having 2, 4, 5, 6, 8, 10, 12 and 16 cylinders are contemplated. It is also anticipated that the fuel injection control of the present invention can be implemented in a V-type or another type of cylinder configuration.

An output of the engine 54 is coupled by a torque converter 70, a transmission 72, a driveshaft 74 and a differential 76 to driven wheels 78. The transmission 72 may, for example, be a continuously variable transmission (CVT) or a step-gear automatic transmission. The transmission 72 is controlled by a vehicle control module 80.

Figure 12:
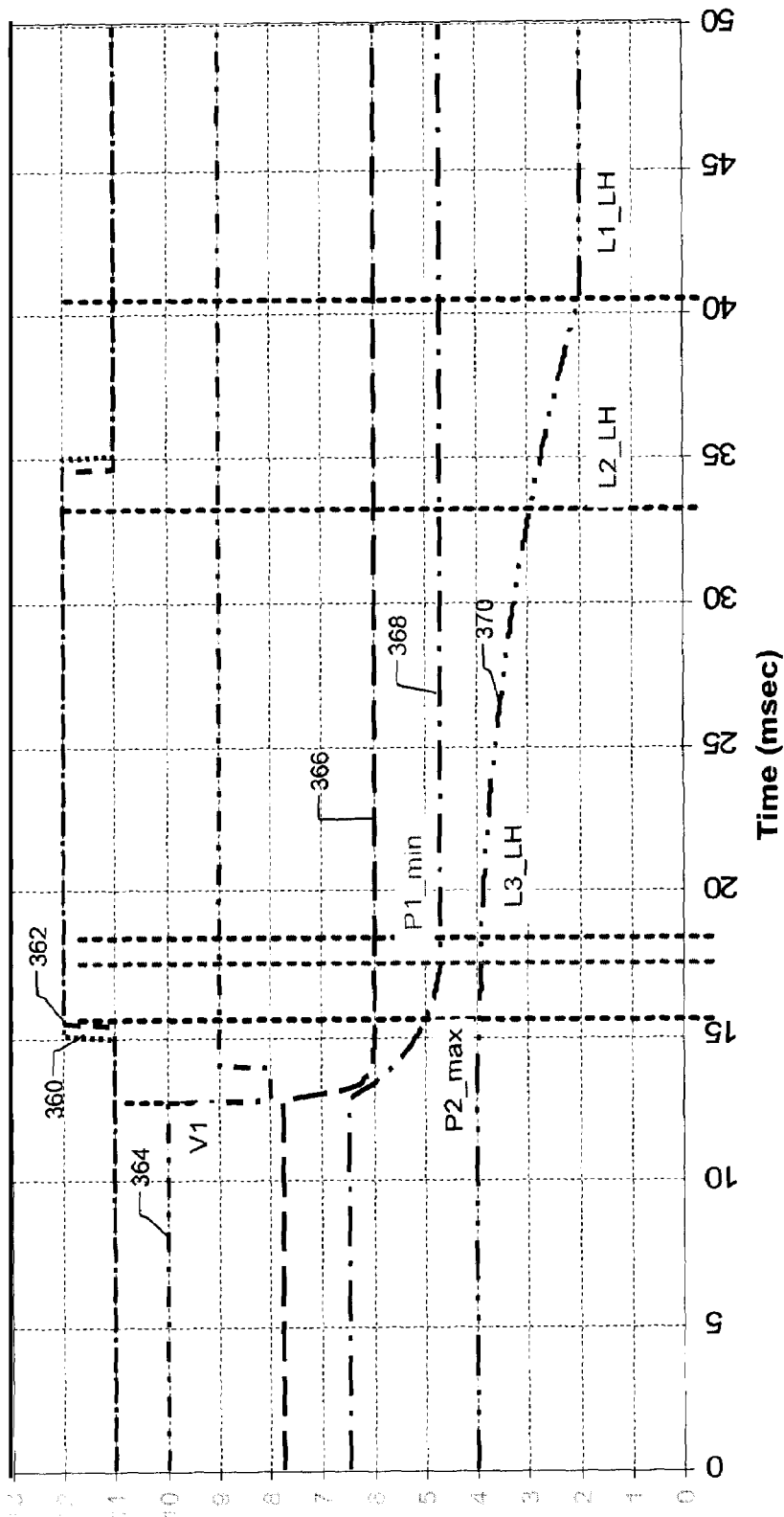
FIG. 12 is a response time signal diagram for low to high lift in accordance with an embodiment of the present disclosure.

The valve lift control system includes an intake and exhaust valve assembly (head) 79, the control module 80, and various sensors. Some of the sensors are shown in FIGS. 1, 2 and 12. The control module 80 controls lift operation of intake and exhaust valves of the valve assembly 79.

Air is drawn into the intake manifold 66 via an electronic throttle controller (ETC) 90, or a cable-driven throttle, which adjusts a throttle plate 92 that is located adjacent to an inlet of an intake manifold 66. The adjustment may be based upon a position of an accelerator pedal 94 and a throttle control algorithm that is executed by the control module 80. The throttle 92 adjusts airflow and intake manifold pressure that affects output torque that drives the wheels 78. An accelerator pedal sensor 96 generates a pedal position signal that is output to the control module 80 based on a position of the accelerator pedal 94. A position of a brake pedal 98 is sensed by a brake pedal sensor or switch 100, which generates a brake pedal position signal that is output to the control module 80.

Air is drawn into the cylinders 60 from the intake manifold 66 and is compressed therein. Fuel is injected into cylinders 60 by the fuel injection circuit 67 and the spark generated by the ignition system 64 ignites the air/fuel mixtures in the cylinders 60. Exhaust gases are exhausted from the cylinders 60 into the exhaust system 58. In some instances, the engine system 80 can include a turbocharger that uses an exhaust driven turbine to drive a compressor that compresses the air entering the intake manifold 66. The compressed air may pass through an air cooler before entering into the intake manifold 66.

The fuel injection circuit 67 may include fuel injectors that are associated with each of the cylinders 60. A fuel rail provides fuel to each of the fuel injectors after reception from, for example, a fuel pump or reservoir. The control module 80 controls operation of the fuel injectors including the number and timing of fuel injections into each of the cylinders 60 and per combustion cycle thereof. The fuel injection timing may be relative to crankshaft positioning.

The ignition system 64 may include spark plugs or other ignition devices for ignition of the air/fuel mixtures in each of the cylinders 60. The ignition system 64 also may include the control module 80. The control module 80 may, for example, control spark timing relative to crankshaft positioning.

The exhaust system 58 may include exhaust manifolds and/or exhaust conduits, such as the conduit 110 and a filter system 112. The exhaust manifolds and conduits direct the exhaust exiting the cylinders 60 into filter system 112. Optionally, an EGR valve re-circulates a portion of the exhaust back into the intake manifold 66. A portion of the exhaust may be directed into a turbocharger to drive a turbine. The turbine facilitates the compression of the fresh air received from the intake manifold 66. A combined exhaust stream flows from the turbocharger through the filter system 112.

The filter system 112 may include a catalytic converter or an oxidation catalyst (OC) 114 and a heating element 116, as well as a particulate filter, a liquid reductant system and/or other exhaust filtration system devices. The heating element 116 may be used to heat the oxidation catalyst 114 during startup of the engine 54 and be controlled by the control module 80. The liquid reductant may include urea, ammonia, or some other liquid reductant. Liquid reductant is injected into the exhaust stream to react with NOx to generate water vapor ($H_2O$) and $N_2$ (nitrogen gas).

The valve lift control system 56 further includes an engine temperature sensor 118 and an exhaust temperature sensor 120. The engine temperature sensor 118 may detect oil or coolant temperature of the engine 54 or some other engine temperature. The exhaust temperature sensor 120 may detect temperature of the oxidation catalyst 114 or some other component of the exhaust system 58. The temperatures of the engine 54 and the exhaust system 58 may be indirectly determined or estimated based on engine and exhaust operating parameters and/or other temperature signals. Alternatively, the temperatures of the engine 54 and the exhaust system 58 may be determined directly via the engine and exhaust temperature sensors 118, 120.

Other sensor inputs collectively indicated by reference number 122 and used by the control module 80 include an engine speed signal 124, a vehicle speed signal 126, a power supply signal 128, oil pressure signal 130, an engine temperature signal 132, and a cylinder identification signal 134. The sensor input signals 124-134 are respectively generated by engine speed sensor 136, vehicle speed sensor 138, a power supply sensor 140, an oil pressure sensor 142, an engine temperature sensor 144, and cylinder identification sensor 146. Some other sensor inputs may include an intake manifold pressure signal, a throttle position signal, a transmission signal, and manifold air temperature signal.

The valve lift control system 56 may also include one or more timing sensors 148. Although the timing sensor 148 is shown as a crankshaft position sensor, the timing sensor may be a camshaft position sensor, a transmission sensor, or some other timing sensor. The timing sensor generates a timing signal that is indicative of position of one or more pistons and/or a crankshaft and/or a camshaft.

Referring now to FIG. 2, a functional block diagram of a valve lift control circuit 150 is shown. The valve lift control circuit 150 includes an intake/exhaust valve assembly 152 that receives oil from an oil reservoir 154 via an oil pump 156. The oil is filtered through an oil filter 158 prior to reception by the valve assembly 152. The vehicle control module 80 controls lift operation of intake and exhaust valves 160, 162 of the valve assembly 152.

The valve assembly 152 includes the intake and exhaust valves 160, 162, which have open and closed states and are actuated via one or more camshafts 164. A dedicated intake camshaft and a dedicated exhaust camshaft may be included. In another embodiment, the intake and exhaust valves 160, 162 share a common camshaft. When in an open state the intake and exhaust valves 160, 162 may be operating in various lift modes, some of which are mentioned above.

The valve assembly 152 also includes valve lift mode adjustment devices 170. The lift mode adjustment devices 170 may include oil pressure control valves 172 and valve lift control valves, such as solenoids 174. Other lift mode adjustment devices 176, such as lift pins, levers, rockers, springs, locking mechanisms, tappets, etc may be included. Examples of lift mode adjustment devices are shown in FIGS. 3-7 and are part of a switchable valve lift actuating mechanism.

The valve lift control circuit 150 may include an oil temperature sensor 180 and/or an oil pressure sensor 182. The vehicle control module 80 signals the oil pressure control valves 172 based on temperature and pressure signals received from the temperature and pressure sensors 180, 182.

Referring now to FIGS. 3-7, perspective, exploded and side cross-sectional views of a switchable valve lift actuating mechanism 200 are shown.

The switchable valve lift actuating mechanism 200 includes a valve lever (follower) 202 on which circular rollers 204 and 205 are attached. The rollers 204 are associated with HIGH lift mode operation. The rollers 205 are associated with LOW lift mode operation. During the HIGH lift mode a valve 206 is lifted or actuated to a first predetermined position. During the LOW lift state the valve 206 is lifted or actuated to a second predetermined position. The valve 206 is actuated further away from a closed position when in the first predetermined position, as opposed to when in the second predetermined position. The rollers 204, when in a HIGH state, come in contact with HIGH lift lobes 208. Unlatching of the bracket 226, allows the rollers 204 to move without affecting camlift. This allows the rollers 205 to contact the LOW lift lobe 210. The rollers 205, when rotated to a LOW state, come in contact with LOW lift lobes 210 of the camshaft.

The switchable valve lift actuating mechanism 200 further includes a lift pin assembly 220, which includes a lift pin 222 and a locking mechanism 224. Oil enters and exits the valve lever 202 to extend and retract the lift pin 222. A bracket 226 is rotated based on actuation of the lift pin 222. Rotation of the bracket 226 raises and lowers the bushings 204.

For a further description of the switchable valve lift actuating mechanism see International Patent Application No. WO 2007/017109 entitled, "Switchable Valve Actuating Mechanism", which is also incorporated by reference herein. The embodiments of the present disclosure may apply to other valve lift actuating mechanisms and/or systems. A couple other valve lift actuating systems are shown in U.S. Pat. No. 6,343,581 entitled, "Variable Valve Timing and Lift Structure for Four Cycle Engine" and U.S. Pat. No. 7,213,566 entitled, "Engine System and Method of Control", which are incorporated herein by reference.

Also, although the embodiments disclosed herein are primarily described with respect to operating in dual modes, such as a high lift and a low lift mode, the embodiments are not limited to dual mode operation. The embodiments apply to operation that includes more than two modes and continuous variable lift operation.

Transition between HIGH and LOW lift modes occurs when the camshaft is riding on the base circle and not when the camshaft is riding on one of the HIGH or LOW lift lobes. An example of a base circle for the HIGH lift lobe 208 is shown and numerically designated as 228. The based circle 228 is the lower circular portion of the camshaft associated with the HIGH lift lobe 208.

Transitioning when off of the lobes of a camshaft prevents damage to lift pins, such as the lift pin 222. When the camshaft is riding on the base circle there is minimum load on the corresponding lift pins. A valvetrain control circuit may be configured to be pressurized when in LOW lift mode (unlatch pin) and unpressurized when in HIGH lift mode (pin latched) or vice versa. When in LOW lift mode oil pressure is maintained to prevent pin from transitioning to HIGH lift mode. Oil pressure at or near the solenoids that control pin operation may be directly sensed or estimated. Control may estimate oil pressure at the solenoids based on oil pressure at the gallery or at a point upstream from the solenoids. Engine speed may be lower when in LOW lift mode and higher when in HIGH lift mode. HIGH lift mode may be associated with increased engine performance and LOW lift mode may be associated with increased fuel economy.

Figure 8:
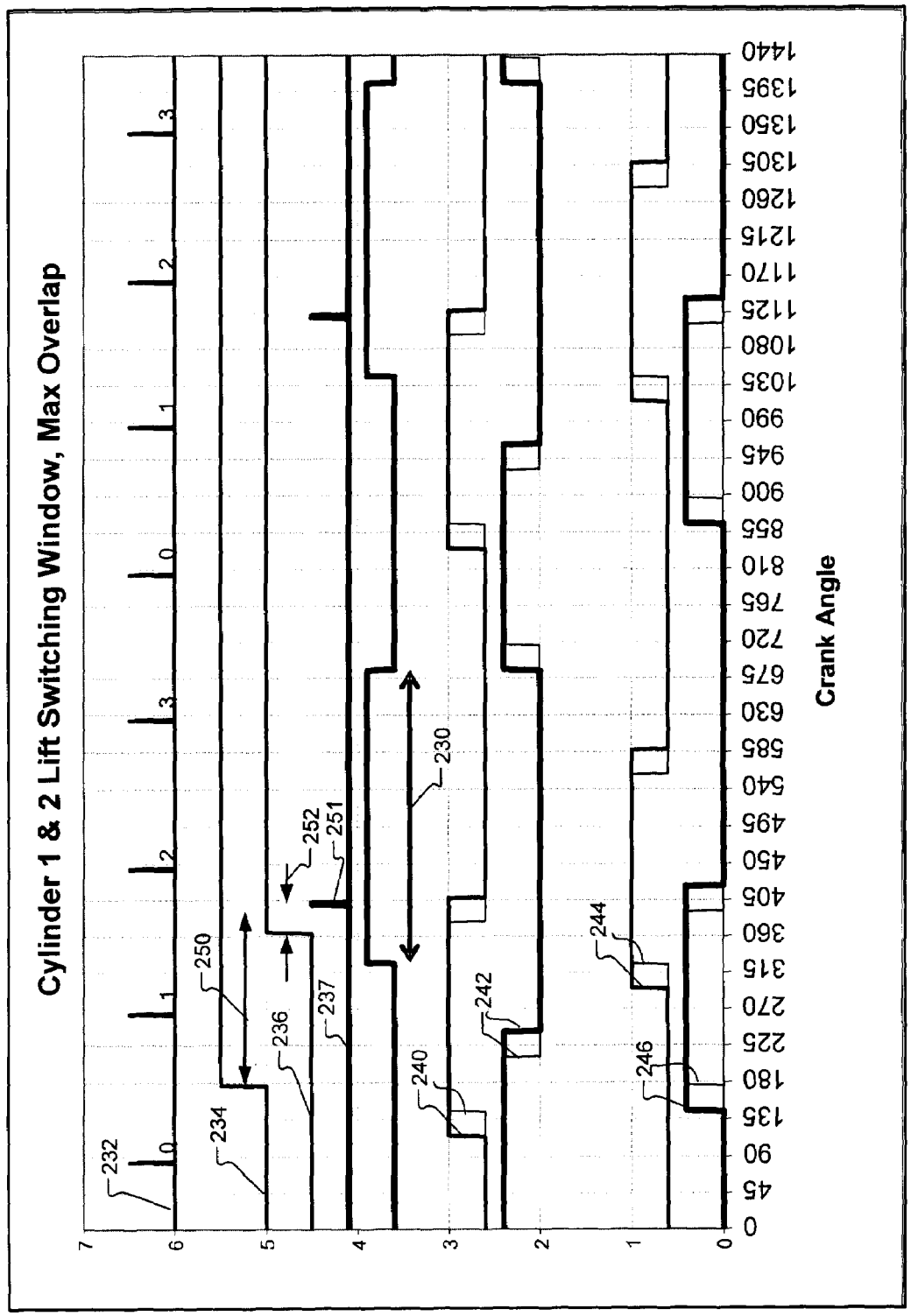
FIG. 8 is an intake and exhaust valve opening signal diagram illustrating a lift switching window in accordance with an embodiment of the present disclosure.

Referring now to FIG. 8, an intake and exhaust valve opening signal diagram illustrating a switching window 230 is shown. The switching window 230 represents a crank angle window available or the time available to switch between open lift modes, such as HIGH and LOW open lift modes. The signal diagram includes a synchronized event signal 232, a first start angle signal 234, a second start angle signal 236, a target angle signal 237, a switching window signal 238, a cylinder 2 intake signal 240, a cylinder 2 exhaust signal 242, a cylinder 1 intake signals 244, and a cylinder 1 exhaust signals 246.

FIG. 8 illustrates a timing window for lift transitioning with maximum exhaust and intake cam overlap. Actual transition to LOW lift is not shown in FIG. 8, but can be seen in FIG. 10. The cylinder signals 237-246 illustrate open and closed states of intake and exhaust valves for HIGH lift and when transitioning between HIGH and LOW lift modes may occur. The example timing window is provided when exhaust valves may be switched between lift modes prior to intake valves. Exhaust and Intake valves may be switched during the same time period or simultaneously. Also, intake valves may be switched prior to exhaust valves.

The example switching window shown begins when cylinder one intake valve is off the base circle and is starting lift or, in other words, after the rising edge of one of the cylinder 1 intake signals 244. The switching window may begin after a predetermined amount of lift of a valve and prior to full lift of that valve. Full lift referring to a maximum amount of lift associated with a given lift mode. Two curves are provided for each on the intake and exhaust valves on first and second cylinders, the first is associated with a first HIGH lift value and the second is associated with a second HIGH lift value. The HIGH lift values represent travel distance or the amount of transitional movement of a valve. The intake and exhaust valves for cylinders 1 and 2 may operate off of a single solenoid (one solenoid for both intake and for both exhaust valves), dual solenoids (one for intake valves and one for exhaust valves), or four solenoids (one for each valve).

The size and position in time of a switching window may vary based on camshaft timing/phasing and the number of lift control valves used. For example, when a lift control valve is used to control both intake and exhaust valves, the associated switching window may vary position in time and decrease in size with relative exhaust and intake camshaft timing. As another example, when separate lift control valves are used for intake and exhaust valves, the associated switching window size may remain constant, but position in time of the switching window may vary with camshaft timing.

There is a lapse in time from when a transition command signal is generated from when a switch between HIGH and LOW lift modes occurs. A start angle refers to when a transition command signal is generated. A target angle refers to when the oil pressure signal change to control a switch between open lift modes, such as a HIGH to LOW lift switch is intended to occur. A switch occurs after oil pressure changes, and when the cam lobe is on the base circle. The target angle varies with the switching window as a function of engine speed.

Figure 9:
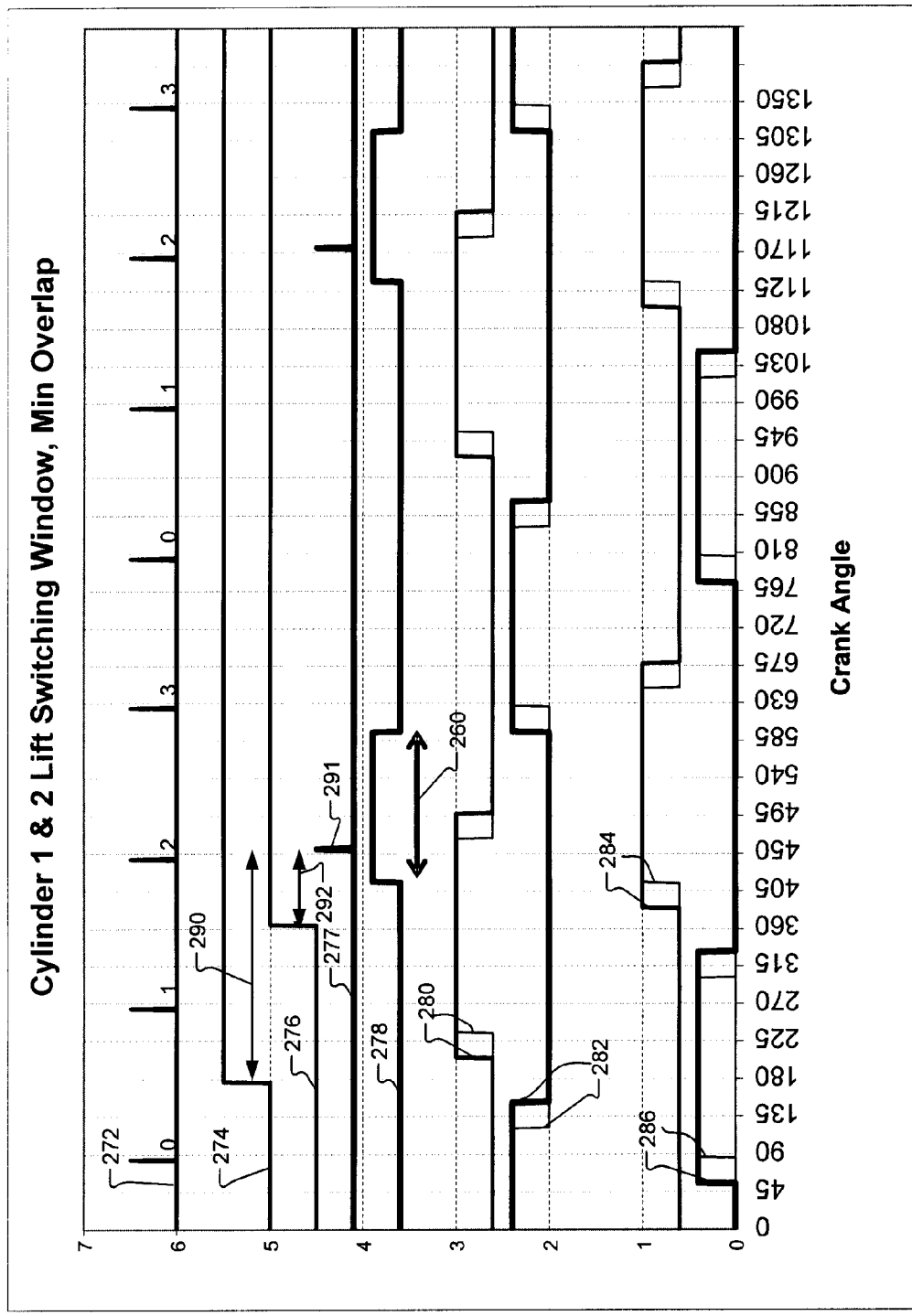
FIG. 9 is another intake and exhaust valve opening signal diagram illustrating a lift switching window in accordance with an embodiment of the present disclosure.

The first and second start angle signals 234, 236 provide example start angles for different engine operating speeds. The first start angle signal 234 is associated with a first engine speed that is faster than the second engine speed associated with the second engine speed signal 236. Duration 250 represents lead time between the first start angle and a target angle 251. Duration 252 represents lead time between the second start angle and the target angle. The start angles and target angle correspond to crankshaft rotation angles. In one embodiment the switching window begins at approximately 1 mm of lift on intake valve of cylinder 1 and ends at start of lift on exhaust valve of cylinder 2, as shown in FIGS. 8 and 9. Timing windows may be generated that are associated with camshaft rotation angles. Control of intake and exhaust valve timing is synchronized relative to the switching window.

Referring now to FIG. 9, another intake and exhaust valve opening signal diagram illustrating a switching window is shown. The diagram of FIG. 9 is similar to the diagram of FIG. 8, however, camshaft positioning is different relative to a crankshaft. The size and position in time of the switching window changes with camshaft positioning or phasing relative to a crankshaft.

For the embodiments of FIGS. 8 and 9, the switching window 260 of FIG. 9 is smaller than the switching window 230. FIG. 8 provides a maximum overlap example and FIG. 9 provides a minimum overlap example.

The signal diagram of FIG. 9 includes a synchronized event signal 272, a first start angle signal 274, a second start angle signal 276, a target angle signal 277, a switching window signal 278, a cylinder 2 intake signal 280, a cylinder 2 exhaust signal 282, a cylinder 1 intake signals 284, and a cylinder 1 exhaust signals 286. Duration 290 represents lead time between the first start angle and a target angle 291. Duration 292 represents lead time between the second start angle and the target angle.

Figure 10:
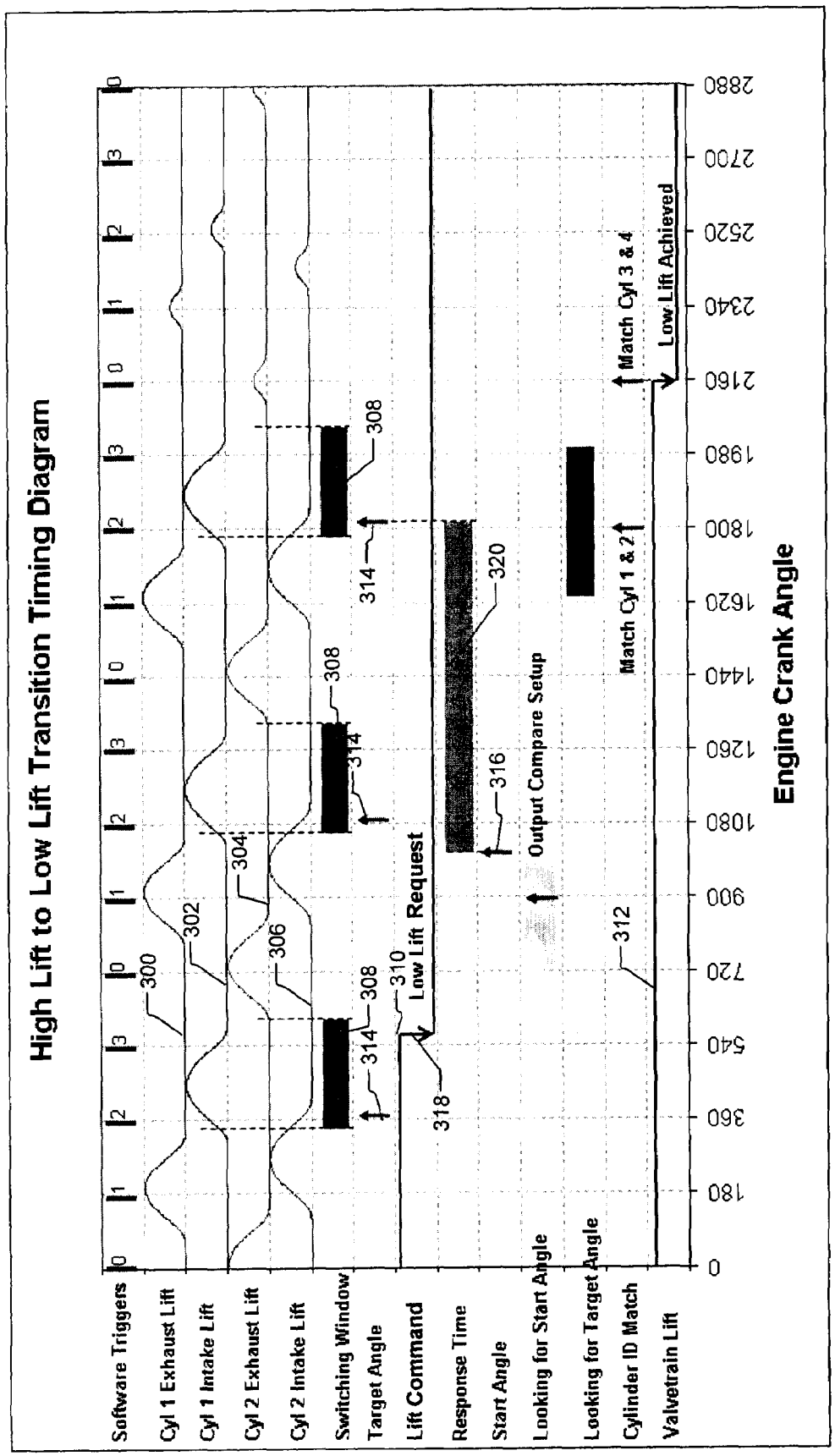
FIG. 10 is still another intake and exhaust valve opening signal diagram illustrating a high to low switching window in accordance with an embodiment of the present disclosure.

Referring now to FIG. 10, another intake and exhaust valve opening signal diagram is shown. FIG. 10 illustrates a transition from HIGH lift to LOW lift. The signal diagram of FIG. 10 includes a cylinder 1 exhaust signal 300, and a cylinder 1 intake signal 302, a cylinder 2 exhaust signal 304, a cylinder 2 intake signal 306, switching windows 308, a lift signal 310, a valvetrain lift signal 312. The switching windows 308 indicate when oil pressure may change to allow a switch between lift modes. The lift command signal 310 indicates a lift mode change is requested. The valve train lift signal 312 indicates a current lift mode of intake and exhaust valves.

Target angles 314 are shown for when a change in oil pressure to change lift may be intended to occur once a change in lift is requested. A start angle 316 is shown for when a switch is initiated after a lift command signal 318 is generated. There is a lapse in time, referred to as response time 320, between when a switch is initiated and when oil pressure changes for an intended switch occurs. The response time 320 may be predetermined and thus the switch may be initiated based on the response time to achieve a switch when intended.

Figure 11:
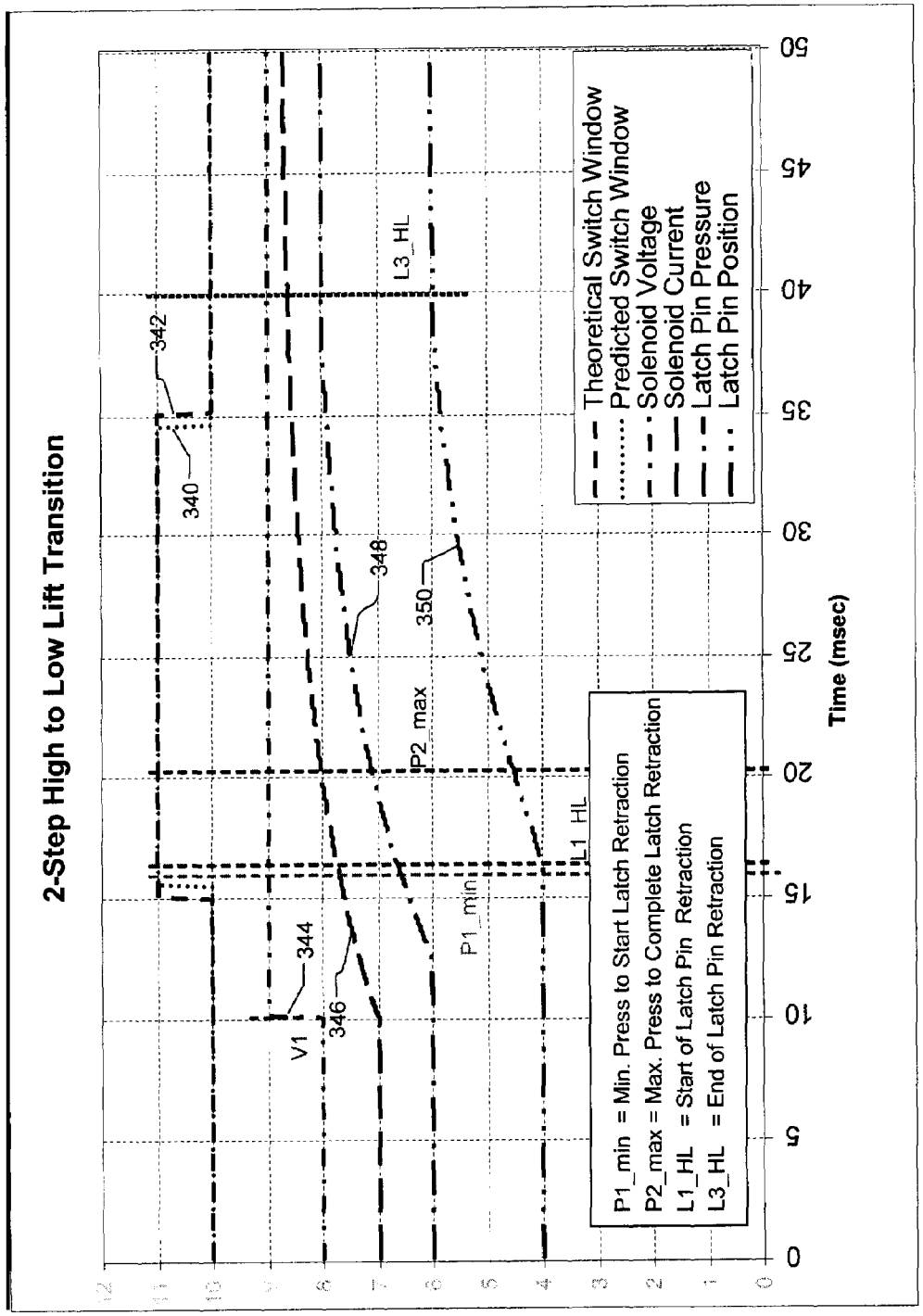
FIG. 11 is a response time signal diagram for high to low lift in accordance with an embodiment of the present disclosure.

Referring now to FIG. 11, a response time signal diagram for high to low lift is shown. Predicted and theoretical switching windows 340, 342 are shown for a two-step high-to-low transition. A solenoid voltage signal 344 illustrates when a solenoid receives a command signal to switch mode of operation. Current signal 346 illustrates rise time of solenoid current. A latch pin pressure signal 348 and a latch pin position signal 350 illustrate increase in latch pin pressure and change in latch pin position. The latch pin is not fully transitioned within the switching windows 340, 342 for the example shown.

Referring now to FIG. 12, a response time signal diagram for low to high lift is shown. Predicted and theoretical switching windows 360, 362 are shown for a two-step low-to-high transition. A solenoid voltage signal 364 illustrates when a solenoid receives a command signal to switch mode of operation. Current signal 366 illustrates reduction time of solenoid current. A latch pin pressure signal 368 and a latch pin position signal 370 illustrate decrease in latch pin pressure and change in latch pin position. The latch pin latches into HIGH lift at L2_LH. Thus, the latch pin latches prior to full transitioning of the latch pin and within the switching windows 360, 362. The latch pin is not fully transitioned within the switching windows 360, 362 for the example shown.

Figure 13:
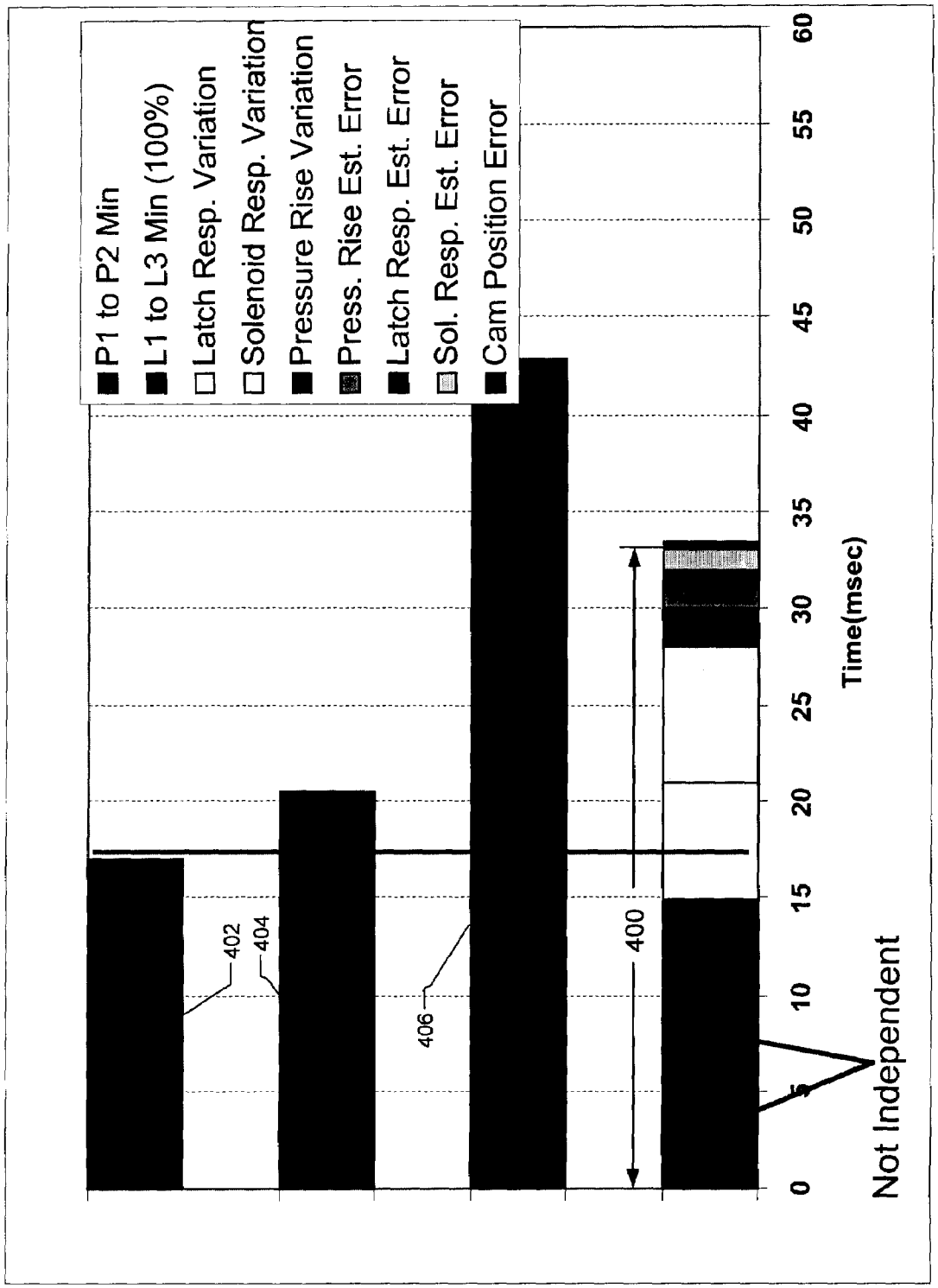
FIG. 13 is a bar graph illustrating switch window size variation relative to engine speed in accordance with an embodiment of the present disclosure.

Referring now to FIG. 13, a bar graph illustrating switch window size variation relative to engine speed is shown. Overall response time for switching between modes can affect the ability to switch between modes depending upon the engine speed. There are various times that may be accounted for in determining an overall response time upon which to base a switch between modes. The times may include, for example, pressure to complete and start latch extension P1 and P2 minimums, latching of pins, latch response variation, solenoid response variation, pressure rise variation, pressure rise estimated error, latch response estimated error, solenoid response estimated error, camshaft position error, etc.

FIG. 13 illustrates an example of an overall time 400 and switching windows 402, 404, and 406 associated with three different engine speeds. Switching window 404 has a slower associated engine speed than switching window 402. Switching window 406 has a slower associated engine speed than switching window 404. Note that the switching window size increases with a decrease in engine speed and an increase in negative value overlap (NVO). NVO is defined as the duration in crank angle between exhaust valve closing and intake valve opening. Thus, for the example provided a switch may occur in association with the switching window 406 and not in association with the switching windows 402 and 404.

Figure 14:
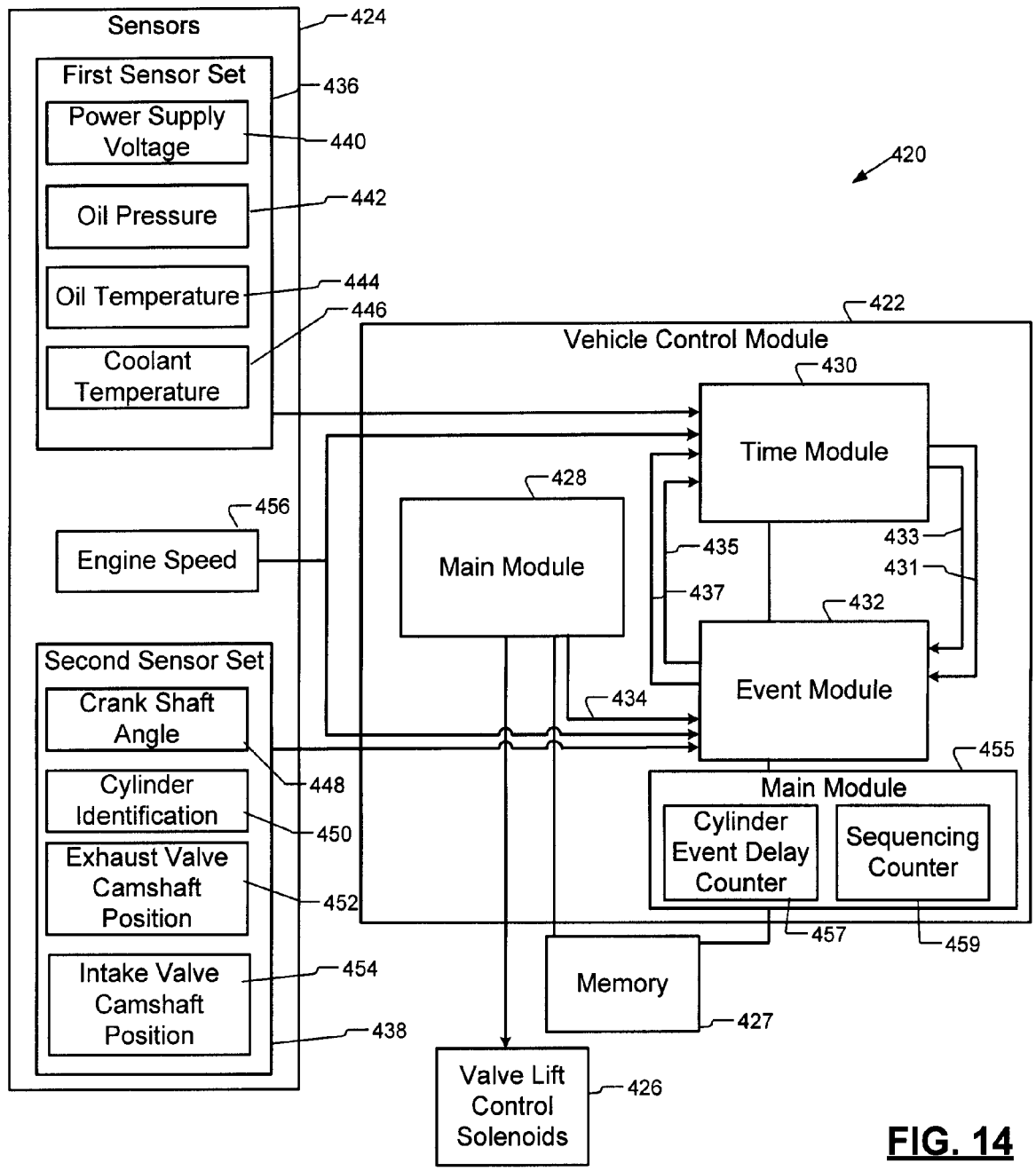
FIG. 14 is a functional block diagram of a valve control system in accordance with an embodiment of the present disclosure.

Referring now to FIG. 14, a functional block diagram of a valve control system 420 is shown. The valve control system 420 includes a vehicle control module 422, sensors 424, valve lift control solenoids 426 and memory 427. The vehicle control module 422 includes a main module 428, a time module 430 and an event module 432. The main module 428 controls operation including switching between operating modes of the valve lift control solenoids 426 based on information stored in the memory 427, which is modified by the time module 430 and the event module 432. The memory 427 may be part of the vehicle control module 422 or separate as shown.

The time module 430 determines estimations for valve control solenoid response 431 and limitations for switching between valve operating modes 433. The time module 430 receives inputs from the sensors 424 and from the event module 432 and generates the estimations 431 and the limitations 433 based thereon. The time module 430 determines response times and may enable control of any number of lift control valves. The response times, for example, may include response times associated with the lift control valves and be based on oil temperatures and lift control valve ON times. Response time of a lift control valve varies with temperature.

The event module 432 allows or prevents switching between valve operating modes and sets various flags, which include states of lift control valves. The event module 432 receives a selected operating mode signal 434 from the main module 428 and determines whether a switch can be made and how to make the switch based on parameters, such as response time, crank angle, low lift limits, engine speed, and camshaft phasing. The event module 432 determines whether to permit operation in the selected mode and/or a switch to operating in the selected mode based on inputs received from the sensors 424 and the time module 430.

The event module 432 receives the estimations 431 and limitations 433 from the time module 430 and indicates a current operating lift (Lift_Mode) 435 and sets flags (LiftSol_Flags) 437 within the memory 427 indicating whether a switch between modes is permitted or not permitted. A synchronization flag may be set when a switch has occurred and/or when a switch has been completed. The synchronization flag may be read by the main module 428. The main module may adjust fuel injection, ignition system operation, etc. based on the synchronization flag.

As shown, the time module 430 and the event module 432 may have associated sensor sets 436 and 438. The first sensor set 436 may include one or more power supply voltage sensors 440, oil pressure sensors 442, oil temperature sensors 444, and coolant temperature sensors 446. The second sensor set 438 may include one or more crank shaft angle sensors 448, cylinder identification sensors 450, exhaust valve camshaft position sensors 452, and intake valve camshaft position sensors 454. The sensors 424 may also include an engine speed sensor 456.

The vehicle control module 422 may also include various counters 455, such as a cylinder event delay counter 457, a sequencing counter 459, or other counter. The counters 455, as described further below, may be used when sequencing between different leading modes, such as an intake leading mode, an exhaust leading mode, and a non-leading mode. The counters may also be used to account for when a lift control valve response time is longer than an engine cycle. An engine cycle may refer to a number of intake, compression, ignition, and/or exhaust strokes. One engine cycle may include 4-strokes; the strokes respectively associated with intake, compression, ignition, and exhaust.

The time module 430 and the event module 432 may be operating at different speeds. In one embodiment, the time module 430 is operating a predetermined frequency and the event module 432 is synchronized to crankshaft timing. The time module 430 may operate at a slower speed than the event module 432. The time module 430 and the event module 432 are in a closed loop arrangement and provide reliable and predictable open lift mode transitioning.

The vehicle control module 422, the main module 428, the time module 430, and the event module 432 may operate the valve lift control solenoids 426 in a multi-intake open lift mode, a multi-exhaust open lift mode, a combined intake and exhaust open lift mode, or in a combined single lift mode. In the multi-intake open lift mode, intake valves have multiple open lift modes and exhaust valves have a single open lift mode. In the multi-exhaust open lift mode, exhaust valves have multiple open lift modes and intake valves have a single open lift mode. In the combined intake and exhaust open lift mode, both intake and exhaust valves have multiple open lift modes. In the combined single lift mode, the intake and exhaust valves each have a single open lift mode.

Although the following FIGS. 15-49 may be primarily described with respect to one transition of lift mode switching, such as low to high lift switching or high to low lift switching, each of the Figures and associated embodiments may apply to other modes of switching. Also, although the following FIGS. 15-49 may be primarily described with respect to lift mode switching of exhaust or intake valves, each of the Figures and associated embodiments may apply to both exhaust and intake lift mode switching.

Figure 15:
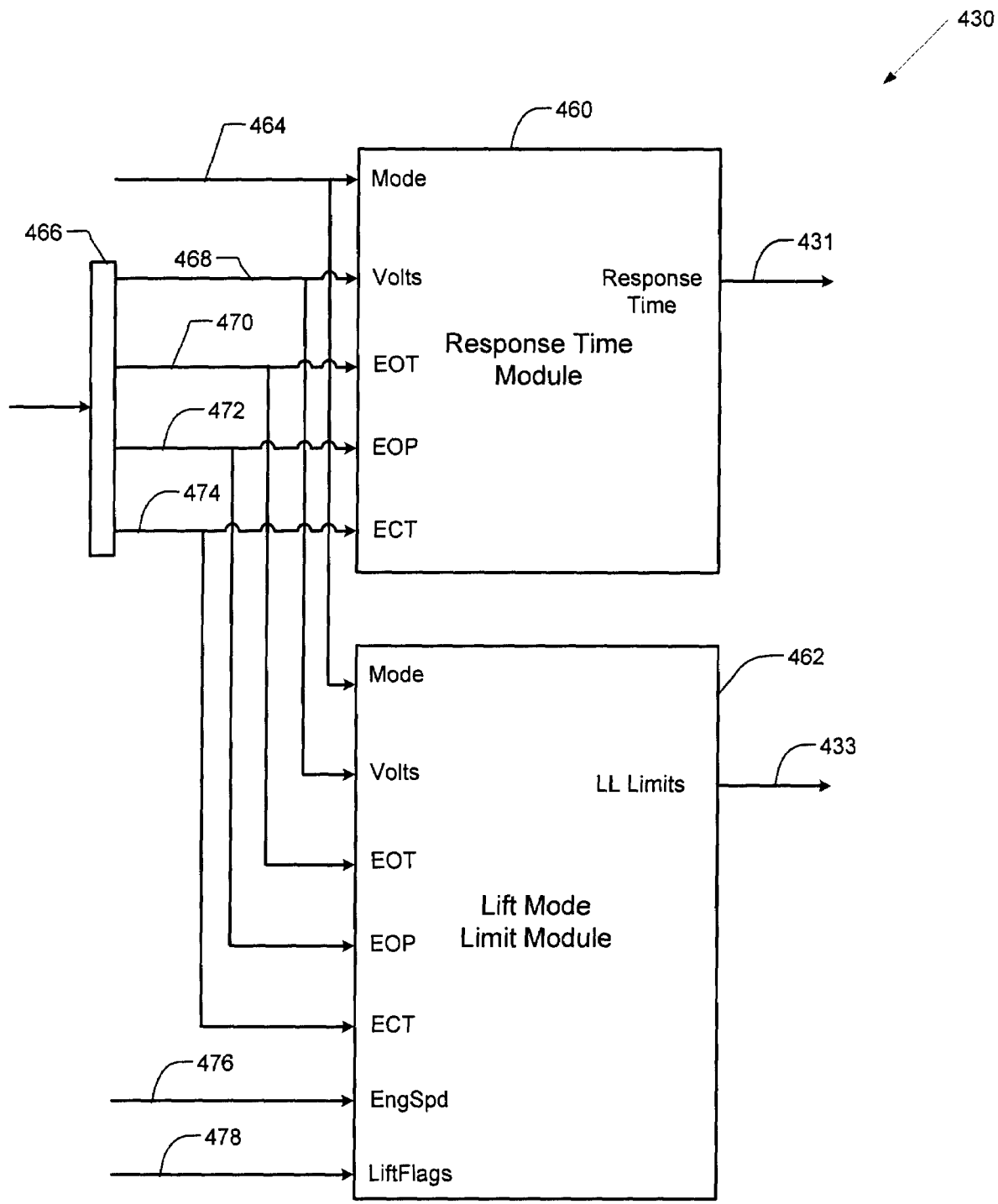
FIG. 15 is a functional block diagram of a time module of the valve control system of FIG. 14.

Referring now also to FIG. 15, a functional block diagram of the time module 430 of FIG. 14 is shown. The time module 430 includes a response time module 460 and a lift mode limit module 462. The response time module 460 generates the estimations 431 for valve control solenoid response. As shown, the response time module 460 receives a current operating mode signal (mode) 464, which is from the event module 432, and multiple sensors signals. The sensor signals may be received over a bus 466. The sensor signals may include a power supply voltage (volts) signal 468, an engine oil temperature (EOT) signal 470, an engine oil pressure (EOP) signal 472 and an engine coolant temperature (ECT) signal 474. The lift modes may include static modes of a high lift mode and a low lift mode and transitional modes of a high-to-low lift mode and a low-to-high lift mode.

The lift mode limit module 462 generates the limitations 433 for switching between valve operating modes. The lift mode module 462 also receives the signals 464, 468, 470, 472 and 474. The lift mode module 462 further receives an engine speed (EngSpd) signal 476 and a lift flag (LiftFlags) signal 478. The LiftFlags 478 is from the event module 432 and includes the above-described flags indicating switch status and switching window size.

Figure 16:
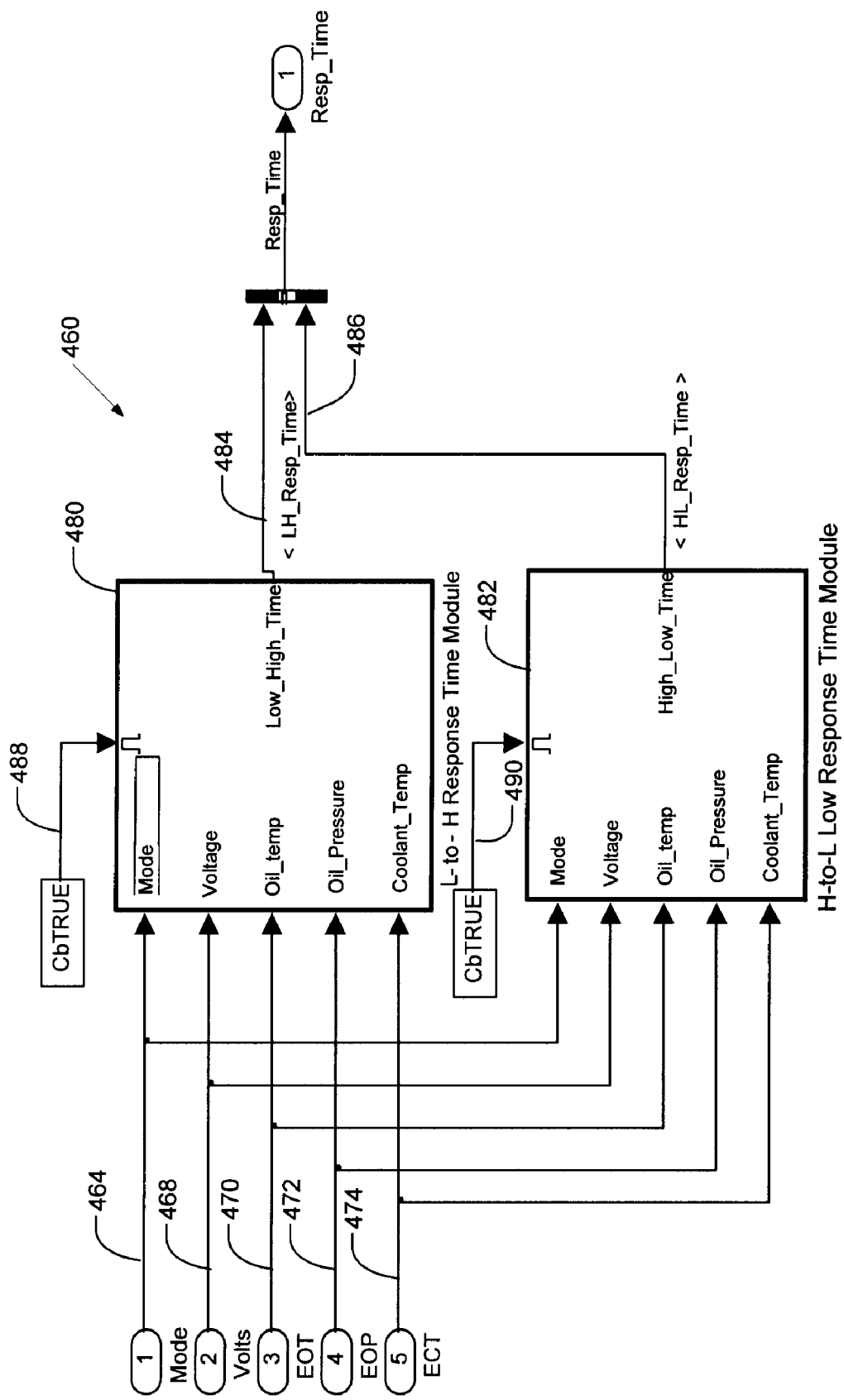
FIG. 16 is a functional block diagram of a response time module of the time module of FIG. 15.

Referring now to FIG. 16, a functional block diagram of the response time module 460 of FIG. 15 is shown. The response time module 460 includes a low-to-high response time module 480 and a high-to-low response time module 482. The low-to-high response time module 480 generates a low-to-high response time signal 484 based on the signals 464, 468, 470, 472 and 474. The high-to-low response time module 482 generates a high-to-low response time signal 486 based on the signals 464, 468, 470, 472 474. Calibration or control signals 488, 490 may be provided to activate the modules 480 and 482.

The modules 480 and 482 may have look-up tables and/or equations for generation of the high-to-low and low-to-high response time signals 484, 486 based on the received inputs. The response time signals refer to the response times from voltage change to oil pressure change that starts pin extension or retraction.

Figure 17:
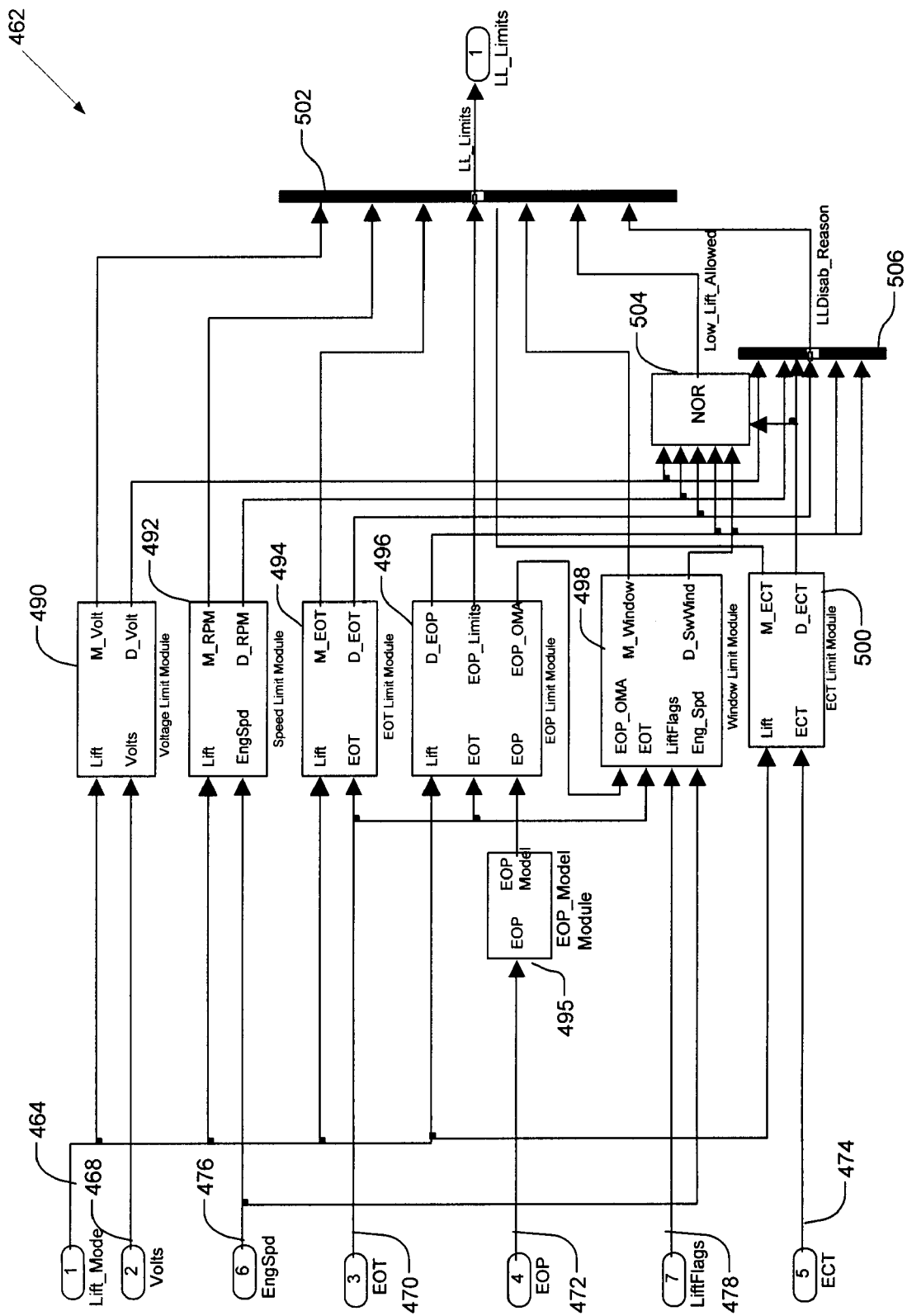
FIG. 17 is a functional block diagram of a lift mode limit module of FIG. 15.

Referring now to FIG. 17, a functional block diagram of the lift mode limit module 462 of FIG. 15 is shown. The lift mode limit module 462 and the provides switching limitations to protect hardware damage due to mistimed switching, unintended switches because of low oil pressure, and high speed operation in low lift. This provides predictable lift and prevents damage to switching pins. As stated above, and depending upon the valve control system configuration, control may not operate in a certain engine speed range to prevent damage to switching pins.

The lift mode limit module 462 includes a voltage limit module 490, a speed limit module 492, an engine oil temperature limit module 494, an engine oil pressure model module 495, an engine oil pressure limit module 496, a window limit module 498, and an engine coolant temperature limit module 500. The modules 490-500 receive the respective signals 464, 468, 470, 472, 474, 476, and 478.

The voltage limit module 490 prevents operation or mode switching at voltage levels below a threshold and at voltage levels above another threshold. The voltage limit module 490 generates a margin power supply (M_Volt) signal and a disable power supply (D_Volt) signal based on the mode 464 and the volts 468.

The speed limit module 492 prevents operation or mode switching at engine speeds below a threshold and at engine speeds above another threshold. The speed limit module 492 generates a margin engine speed (M_RPM) signal and a disable engine speed (D_RPM) signal based on the mode 464 and the EngSpd 476.

The engine oil temperature limit module 494 prevents operation or mode switching when oil temperatures are below a threshold and when oil temperatures are above another threshold. The engine oil temperature limit module 494 generates a margin engine oil temperature (M_EOT) signal and a disable engine oil temperature (D_EOT) signal based on the mode 464 and the EOT 470.

The engine oil pressure model module 495 generates an engine oil pressure model (EOP Model) signal based on the EOP 472.

The engine oil pressure limit module 496 prevents operation or mode switching when oil pressures are below a threshold and when oil pressures are above another threshold. The engine oil pressure limit module 496 generates a disable engine oil pressure (D_EOP) signal, an engine oil pressure limits (EOP_Limits) signal, and an engine oil pressure at the oil manifold assembly (EOP_OMA) signal based on the mode 464, the EOT 470 and the EOP 472. The EOP_OMA refers to an engine oil pressure at a switching control oil manifold assembly (OMA) of an engine. Solenoids that control switch mode operation may be located on the OMA and thus the EOP_OMA represents the input to the solenoid valves.

The window limit module 498 prevents switching based on switching window size and received input signals. Window limits may vary with camshaft phasing for a control system that changes mode operation for both intake and exhaust valves. When the control system switches mode of operation for intake and exhaust valves independently, than window limits may still rise. The window limit module 498 generates a mode window (M_Window) signal and a disable switching window (D_SwWind) signal based on the EOP_OMA, the EOT 470, the LiftFlags 478, and the Eng_Spd 476.

The engine coolant temperature limit module 500 prevents operation or mode switching when coolant temperatures are below a threshold and when coolant temperatures are above another threshold. The engine coolant temperature limit module 500 generates a margin engine coolant temperature (M_ECT) signal and a disable engine coolant temperature (D_ECT) signal based on the mode 464 and the ECT 474.

The output signals of the modules 490, 492, 494, 496, 498 and 500 are provided to a low lift limits output bus 502, to a NOR gate 504 and to a low lift disable bus reason 506. The disable output signals of the modules 490, 492, 494, 496, 498 and 500 and the output signals of the NOR gate 504 and of the low lift disable bus 506 may be HIGH/LOW or TRUE/FALSE type signals and thus indicate whether the associated parameter values are within corresponding predetermined ranges. For example, when the Volts 468 is within a predetermined range, the D_Volt may be LOW. When the Volts 468 is outside the predetermined range, the D_Volt may be HIGH. The NOR gate generates a low lift allowed signal based on the output signals. The low lift disable bus 506 provides a low lift disable reason (LLDisab_Reason) signal to the low lift limits bus 502. The output signals, the low lift allowed signal, and the LLDisab_Reason are provided as the low lift limit signals 433 to event module 432.

As an example, low lift operation is avoided and/or prevented when a low lift limit is set by one of the modules 490-500.

Figure 18:
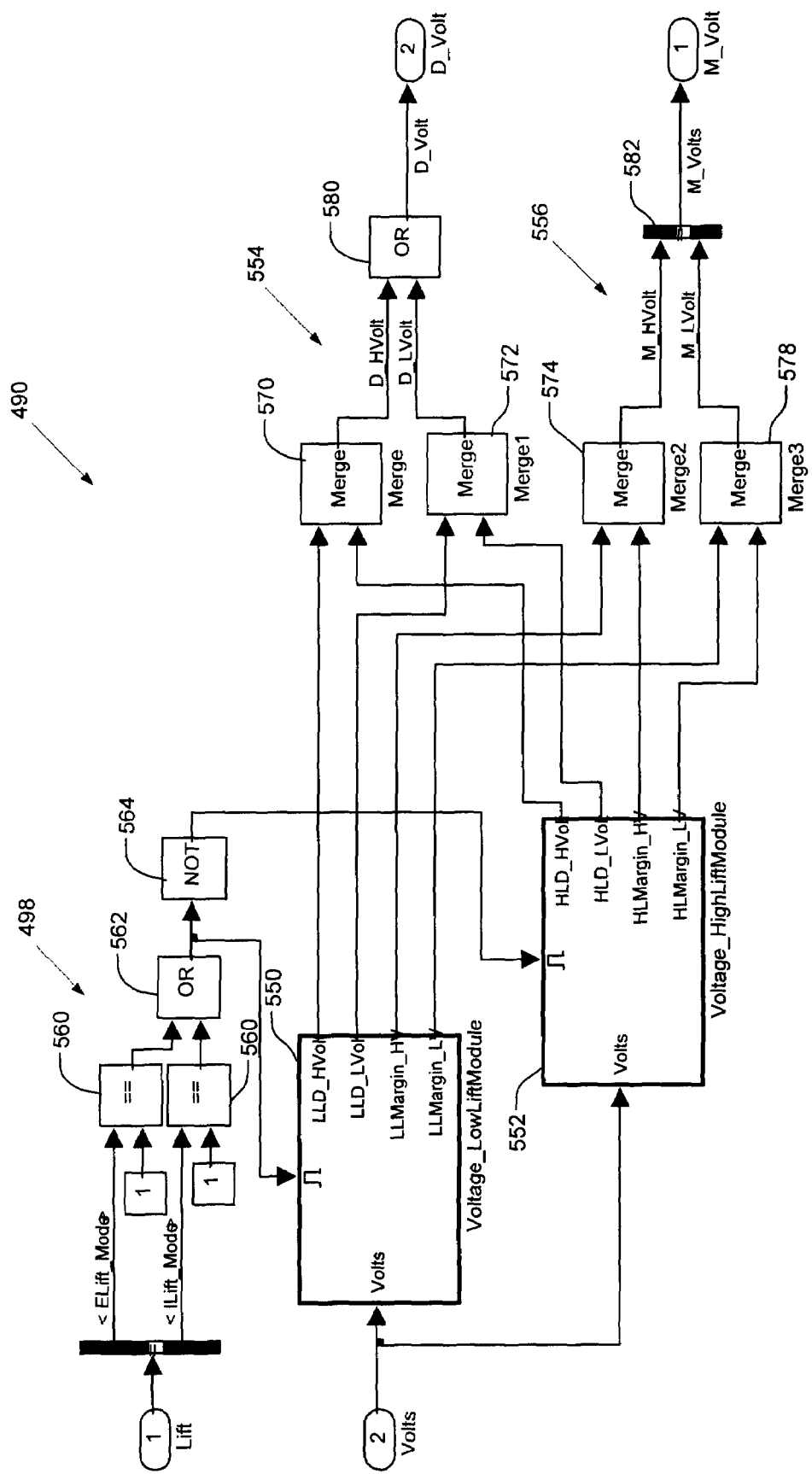
FIG. 18 is a functional block diagram of a voltage limit module of FIG. 17.

Referring now to FIG. 18, a functional block diagram of the voltage limit module 490 of FIG. 17 is shown. The voltage limit module 490 disables low lift when voltage is too high or too low and determines a voltage margin for control logic. The voltage margin refers to the difference between the power supply voltage and a voltage threshold or how close the current voltage supply voltage is too a limit. The voltage limit module 490 includes a lift mode determination circuit 498, a voltage low lift module 550, a voltage high lift module 552, and low lift disable and margin circuits 554 and 556.

The lift mode determination circuit 498 determines whether the system is operating in an exhaust lift mode and/or an intake lift mode. Exhaust lift mode and intake lift mode (ELift_Mode and ILift_Mode) signals are compared with a HIGH signal, such as a one (1), via comparators 560. Outputs of the comparators 560 is provided to an OR gate 562 and then inversed via a NOT gate 564. The output of the OR gate 562 is used to activate the voltage low lift module 550. The output of the NOT gate 564 is used to activate the voltage high lift module 552.

The voltage low lift module 550 generates a low lift disabled for high voltage (LLD_HVolt) signal, a low lift disabled for low voltage (LLD_LVolt) signal, a low lift margin high voltage (LLMargin_HV) signal, and a low lift margin low voltage (LLMargin_LV) signal based on the Volts 468.

The voltage high lift module 552 generates a high lift disabled for high voltage (HLD_HVolt) signal, a high lift disabled for low voltage (HLD_LVolt) signal, a high lift margin high voltage (HLMargin_HV) signal, and a high lift margin low voltage (HLMargin_LV) signal based on the Volts 468.

The low lift mode disable and margin circuits 554 and 556 include merge devices 570-576. The merge devices 570-576, as shown include two inputs and an output. The merge devices 570-576 provide the input that changes last or most recently as the output. The first merge device 570 receives the LLD_HVolt and the HLD_HVolt and provides a disabled for high voltage (D_HVolt) signal. The second merge device 572 receives the LLD_LVolt and the HLD_LVolt and provides a disabled for low voltage (D_LVolt) signal. The third merge device 574 receives the LLMargin_HV and the HLMargin_HV and provides a margin high voltage (M_HVolt) signal. The fourth merge device 576 receives the LLMargin_LV and the HLMargin_LV and provides a margin low voltage (M_LVolt) signal.

The low lift mode disable circuit 554 includes an OR gate 580, which provides a disabled for voltage (D_Volt) signal based on the D_HVolt and the D_LVolt from the merge devices 570 and 572. The low lift mode margin circuit includes a margin bus 582 that provides a margin (M_Volts) signal based on the M_HVolt and the M_LVolt.

Figure 19:
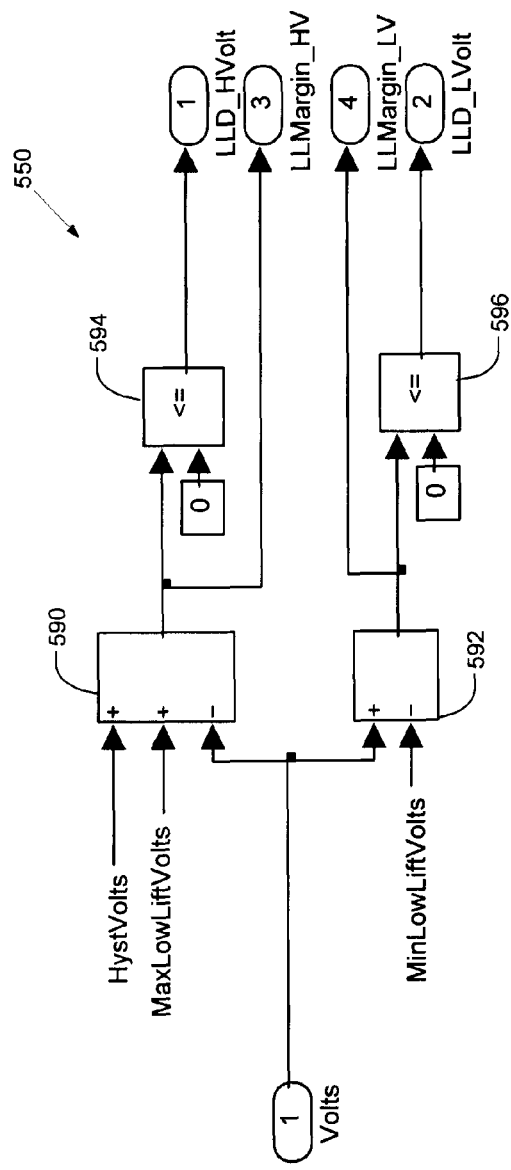
FIG. 19 is a functional block diagram of a voltage low lift module of FIG. 18.

Referring now to FIG. 19, a functional block diagram of the voltage low lift module 550 of FIG. 18 is shown. The voltage low lift module 550 includes a first summer 590, a second summer 592, a first comparator 594, and a second comparator 596. The first summer 590 receives and subtracts the Volts 468 from a sum of a hysteresis voltage (HystVolts) signal and a maximum low lift voltage (MaxLowLiftVolts) signal. The resultant output LLMargin_HV of the first summer 590 is compared with a LOW or zero (0) value. When the resultant output LLMargin_HV is less than or equal to zero, the output LLD_HVolt of the first comparator 594 is HIGH.

The second summer 592 subtracts a minimum low lift voltage (MinLowLiftVolts) signal from the Volts 468. The resultant output LLMargin_LV of the second summer 592 is compared via the second comparator 596 with zero. When the resultant output LLMargin_LV of the second comparator 596 is less than or equal to zero, the output LLD_LVolt of the second comparator 596 is HIGH.

Figure 20:
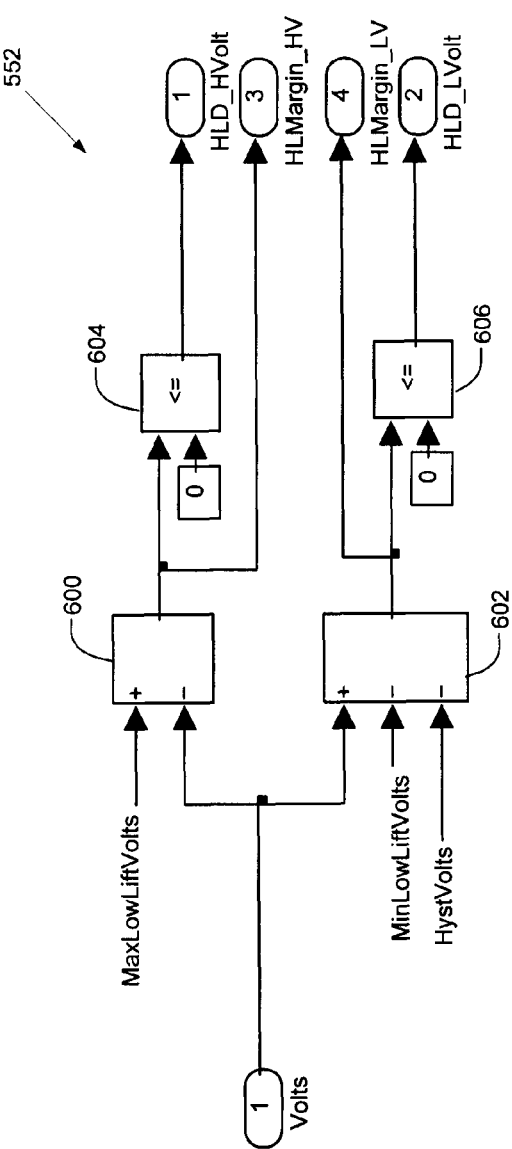
FIG. 20 is a functional block diagram of a voltage high lift module of FIG. 18.

Referring now to FIG. 20, a functional block diagram of the voltage high lift module 552 of FIG. 18 is shown. The voltage high lift module 552 includes a first summer 600, a second summer 602, a first comparator 604, and a second comparator 606. The first summer 600 subtracts the Volts 468 from the MaxLowLiftVolts. The resultant output HLMargin_HV of the first summer 600 is compared via the first comparator 604 with zero. When the resultant output HLMargin_HV of the first comparator 604 is less than or equal to zero, the output HLD_HVolt of the first comparator 604 is HIGH.

The second summer 602 receives and subtracts a sum of the HystVolts and the MinLowLiftVolts from the Volts 468. The resultant output HLMargin_LV of the second summer 602 is compared with a LOW or zero (0) value. When the resultant output HLMargin_LV is less than or equal to zero, the output HLD_LVolt of the second comparator 606 is HIGH.

The voltage low lift module 550 allows the system to remain in low lift mode when Volts 468 is within a predetermined range. When Volts 468 is outside the range and the system is not operating in low lift, control prevents switching to low lift operation. The voltage high lift module 552 allows the system to return to low lift mode when operating in high lift mode and Volts 468 is within a predetermined range. When operating in high lift mode and Volts 468 is outside the range, control remains in high lift mode and low lift is not allowed. The HystVolts signal and the corresponding Margin_HV and Margin_LV signals allow control to prevent continuous and/or frequent switching between lift modes when Volts 468 is near a limit or boundary of a range.

Figure 21:
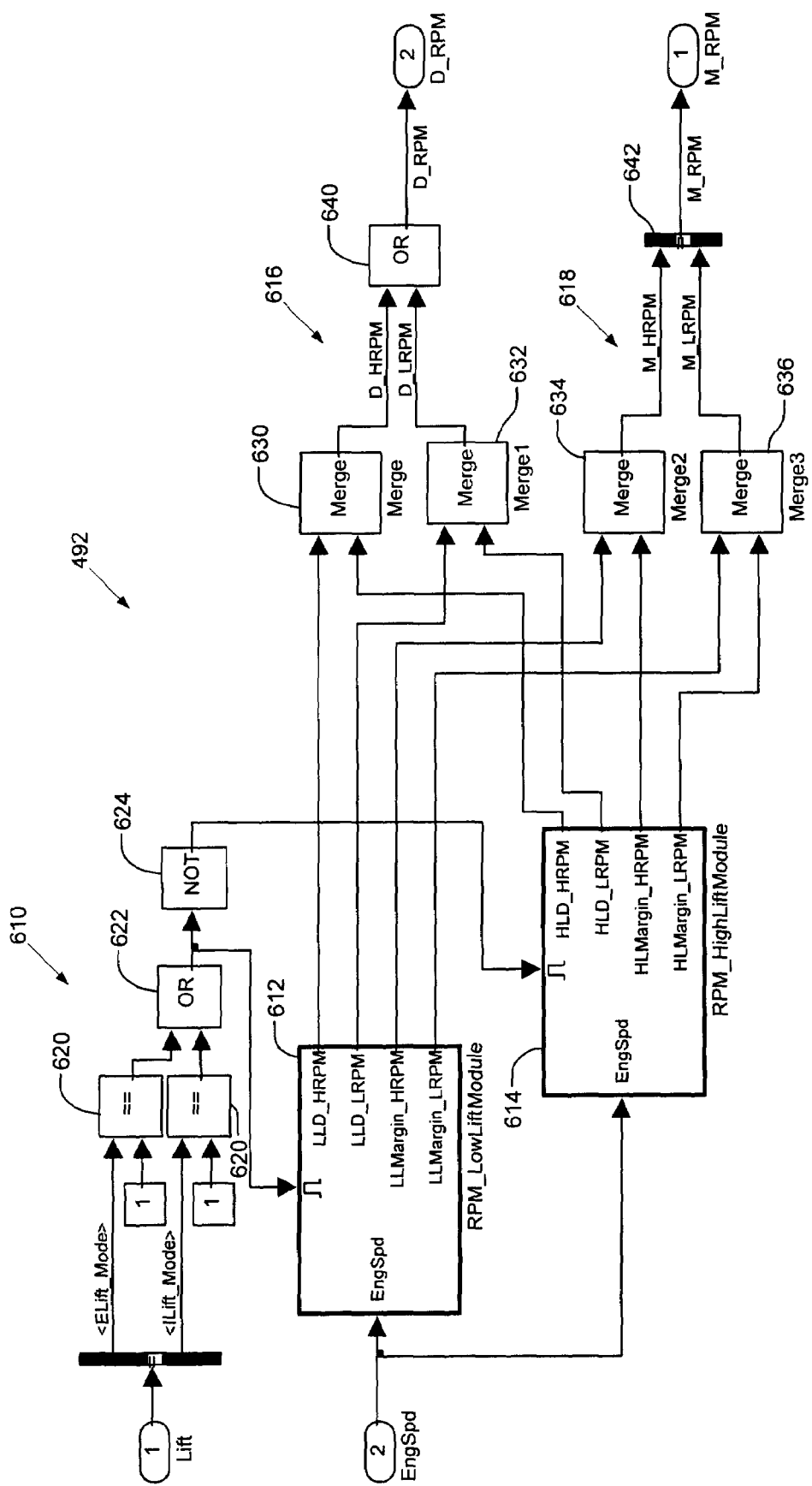
FIG. 21 is a functional block diagram of a speed limit module of FIG. 17.

Referring now to FIG. 21, a functional block diagram of a speed limit module 492 of FIG. 17 is shown. The speed limit module 492 disables low lift when the engine speed is too high or too low and determines a speed margin for control logic. The speed limit module 492 includes a lift mode determination circuit 610, a speed low lift module 612, a speed high lift module 614, and low lift disable and margin circuits 616 and 618.

The lift mode determination circuit 610 determines whether the system is operating in an exhaust lift mode and/or an intake lift mode. The ELift_Mode and the ILift_Mode are compared with a HIGH signal, such as a one (1), via comparators 620. Outputs of the comparators 620 is provided to an OR gate 622 and then inversed via a NOT gate 624. The output of the OR gate 622 is used to activate the speed low lift module 612. The output of the NOT gate 624 is used to activate the speed high lift module 614.

The speed low lift module 612 generates a low lift disable high speed (LLD_HRPM) signal, a low lift disable low speed (LLD_LRPM) signal, a low lift margin high speed (LLMargin_HRPM) signal, and a low lift margin low speed (LLMargin_LRPM) signal based on the EngSpd 476.

The speed high lift module 614 generates a high lift disable high speed (HLD_HRPM) signal, a high lift disable high speed (HLD_LRPM) signal, a high lift margin high speed (HLMargin_HRPM) signal, and a high lift margin low speed (HLMargin_LRPM) signal based on the EngSpd 476.

The low lift disable and margin circuits 616 and 618 include merge devices 630-636. The merge devices 630-636, as shown include two inputs and an output. The merge devices 630-636 provide the input that changes last or most recently as the output. The first merge device 630 receives the LLD_HRPM and the HLD_HRPM and provides a low lift disable high speed (D_HRPM) signal. The second merge device 632 receives the LLD_LRPM and the HLD_LRPM and provides a low lift disable low speed (D_LRPM) signal. The third merge device 634 receives the LLMargin_HRPM and the HLMargin_HRPM and provides a margin high speed (M_HRPM) signal. The fourth merge device 636 receives the LLMargin_LRPM and the HLMargin_LRPM and provides a margin low speed (M_LRPM) signal.

The low lift mode disable circuit 616 includes an OR gate 640, which provides a disable speed (D_RPM) signal based on the D_HRPM and the D_LRPM from the merge devices 630 and 632. The low lift mode margin circuit includes a margin bus 642 that provides a margin (M_RPM) signal based on the M_HRPM and the M_LRPM.

Referring now to FIG. 22, a functional block diagram of the speed low lift module 612 of FIG. 21 is shown. The speed low lift module 612 includes a first summer 650, a second summer 652, a first comparator 654, and a second comparator 656. The first summer 650 receives and subtracts the EngSpd 476 from a sum of a hysteresis speed (HystRPM) signal and a maximum low lift speed (MaxLowLiftRPM) signal. The resultant output LLMargin_HRPM of the first summer 650 is compared with a LOW or zero (0) value. When the resultant output LLMargin_HRPM is less than or equal to zero, the output LLD_HRPM of the first comparator 654 is HIGH.

The second summer 652 subtracts a minimum low lift speed (MinLowLiftRPM) signal from the EngSpd 476. The resultant output LLMargin_LRPM of the second summer 652 is compared via the second comparator 656 with zero. When the resultant output LLMargin_LRPM of the second comparator 656 is less than or equal to zero, the output LLD_LRPM of the second comparator 656 is HIGH.

Referring now to FIG. 23, a functional block diagram of the speed high lift limit module 614 of FIG. 21 is shown. The speed high lift limit module 614 includes a first summer 660, a second summer 662, a first comparator 664, and a second comparator 666. The first summer 660 subtracts the EngSpd 476 from the MaxLowLiftRPM. The resultant output HLMargin_HRPM of the first summer 660 is compared via the first comparator 664 with zero. When the resultant output HLMargin_HRPM of the first comparator 664 is less than or equal to zero, the output HLD_HRPM of the first comparator 664 is HIGH.

The second summer 662 receives and subtracts a sum of the HystRPM and the MinLowLiftRPM from the EngSpd 476. The resultant output HLMargin_LRPM of the second summer 662 is compared with a LOW or zero (0) value. When the resultant output HLMargin_LRPM is less than or equal to zero, the output HLD_LRPM of the second comparator 666 is HIGH.

The speed low lift module 612 allows the system to remain in low lift mode when EngSpd 476 is within a predetermined range. When EngSpd 476 is outside the range and the system is operating in low lift, control disallows remaining in low lift operation. The speed high lift module 614 allows the system to return to low lift mode when operating in high lift mode and EngSpd 476 is within a predetermined range. When operating in high lift mode and EngSpd 476 is outside the range, control remains in high lift mode. The HystRPM signal and the corresponding Margin_HV and Margin_LV signals allow control to prevent continuous and/or frequent switching between lift modes when EngSpd 476 is near a limit or boundary of a range.

Figure 24:
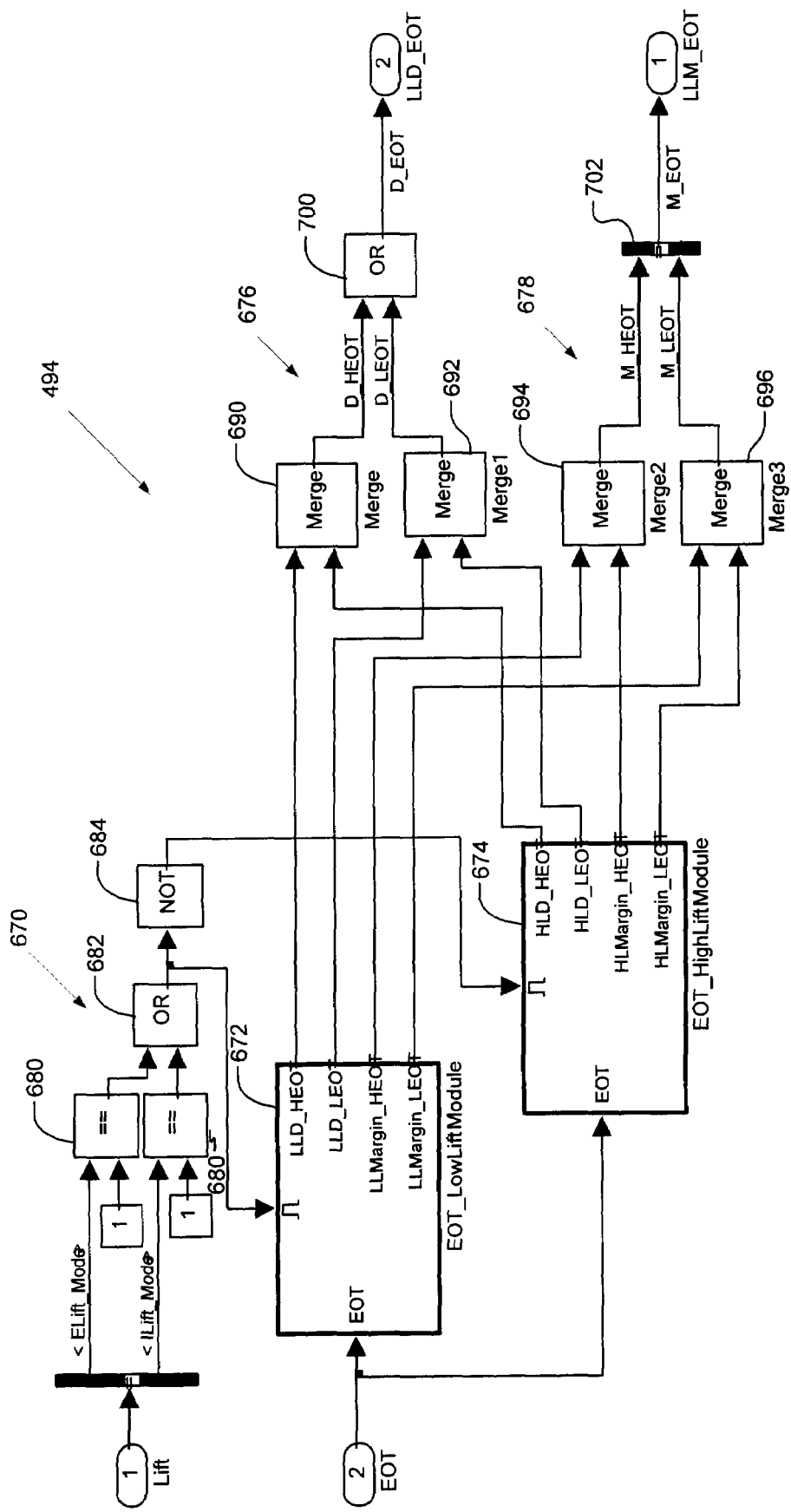
FIG. 24 is a functional block diagram of a engine oil temperature limit module of FIG. 17.

Referring now to FIG. 24, a functional block diagram of the engine oil temperature (EOT) limit module 494 of FIG. 17 is shown. The EOT limit module 494 disables low lift when the EOT is too high or too low and determines an engine oil temperature margin for control logic. The EOT limit module 494 includes a lift mode determination circuit 670, an EOT low lift module 672, an EOT high lift module 674, and low lift disable and margin circuits 676 and 678.

The lift mode determination circuit 670 determines whether the system is operating in an exhaust lift mode and/or an intake lift mode. The ELift_Mode and the ILift_Mode are compared with a HIGH signal, such as a one (1), via comparators 680. Outputs of the comparators 680 is provided to an OR gate 682 and then inversed via a NOT gate 684. The output of the OR gate 682 is used to activate the EOT low lift module 672. The output of the NOT gate 684 is used to activate the EOT high lift module 674.

The EOT low lift module 672 generates a low lift disable high EOT (LLD_HEOT) signal, a low lift disable low EOT (LLD_LEOT) signal, a low lift margin high EOT (LLMargin_HEOT) signal, and a low lift margin low EOT (LLMargin_LEOT) signal based on the EOT 470.

The EOT high lift module 674 generates a high lift disable high EOT (HLD_HEOT) signal, a high lift disable high EOT (HLD_LEOT) signal, a high lift margin high EOT (HLMargin_HEOT) signal, and a high lift margin low EOT (HLMargin_LEOT) signal based on the EOT 470.

The low lift disable and margin circuits 676 and 678 include merge devices 690-696. The merge devices 690-696, as shown include two inputs and an output. The merge devices 690-696 provide the input that changes last or most recently as the output. The first merge device 690 receives the LLD_HEOT and the HLD_HEOT and provides a disable high EOT (D_HEOT) signal. The second merge device 692 receives the LLD_LEOT and the HLD_LEOT and provides a disable low EOT (D_LEOT) signal. The third merge device 694 receives the LLMargin_HEOT and the HLMargin_HEOT and provides a margin high EOT (M_HEOT) signal. The fourth merge device 696 receives the LLMargin_LEOT and the HLMargin_LEOT and provides a margin low EOT (M_LEOT) signal.

The low lift mode disable circuit 676 includes an OR gate 700, which provides a disable EOT (D_EOT) signal based on the D_HEOT and the D_LEOT from the merge devices 690 and 692. The low lift mode margin circuit includes a margin bus 702 that provides a margin (M_EOT) signal based on the M_HEOT and the M_LEOT.

Referring now to FIG. 25, a functional block diagram of the EOT low lift module 672 of FIG. 24 is shown. The EOT low lift module 672 includes a first summer 710, a second summer 712, a first comparator 714, and a second comparator 716. The first summer 710 receives and subtracts the EOT 470 from a sum of a hysteresis EOT (HystEOT) signal and a maximum low lift EOT (MaxLowLiftEOT) signal. The resultant output LLMargin_HEOT of the first summer 710 is compared with a LOW or zero (0) value. When the resultant output LLMargin_HEOT is less than or equal to zero, the output LLD_HEOT of the first comparator 714 is HIGH.

The second summer 712 subtracts a minimum low lift EOT (MinLowLiftEOT) signal from the EOT 470. The resultant output LLMargin_LEOT of the second summer 712 is compared via the second comparator 716 with zero. When the resultant output LLMargin_LEOT of the second comparator 716 is less than or equal to zero, the output LLD_LEOT of the second comparator 716 is HIGH.

Referring now to FIG. 26, a functional block diagram of the EOT high lift module 674 of FIG. 24 is shown. The EOT high lift limit module 674 includes a first summer 720, a second summer 722, a first comparator 724, and a second comparator 726. The first summer 720 subtracts the EOT 470 from the maximum low lift oil temperature MaxLowLiftEOT. The resultant output HLMargin_HEOT of the first summer 720 is compared via the first comparator 724 with zero. When the resultant output HLMargin_HEOT of the first comparator 724 is less than or equal to zero, the output HLD_HEOT of the first comparator 724 is HIGH.

The second summer 722 receives and subtracts a sum of the hysteresis oil temperature (HystEOT) and the minimum low lift oil temperature (MinLowLiftEOT) from the EOT 470. The resultant output HLMargin_LEOT of the second summer 722 is compared with a LOW or zero (0) value. When the resultant output HLMargin_LEOT is less than or equal to zero, the output HLD_LEOT of the second comparator 726 is HIGH.

The EOT low lift module 672 allows the system to remain in low lift mode when EOT 470 is within a predetermined range. When EOT 470 is outside the range and the system is not operating in low lift, control disallows remaining in low lift operation. The EOT high lift module 674 allows the system to return to low lift mode when operating in high lift mode and EOT 470 is within a predetermined range. When operating in high lift mode and EOT 470 is outside the range, control remains in high lift mode. The HystEOT signal and the corresponding Margin_HV and Margin_LV signals allow control to prevent continuous and/or frequent switching between lift modes when EOT 470 is near a limit or boundary of a range.

Figure 27:
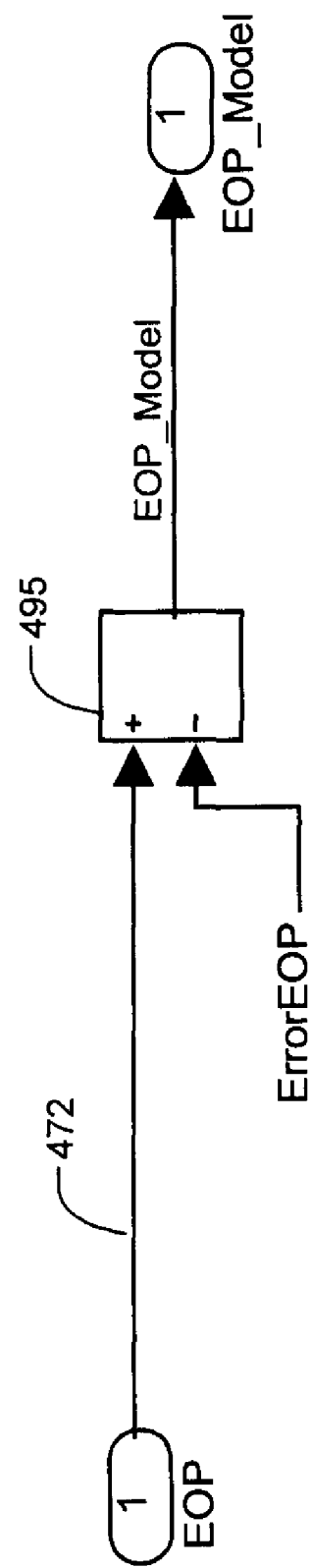
FIG. 27 is a functional block diagram of a engine oil pressure model module of FIG. 17.

Referring now to FIG. 27, a functional block diagram of the engine oil pressure (EOP) model module 495 of FIG. 17 is shown. The EOP model module 495 receives the EOP signal 472 and may also receive an EOP error (ErrorEOP) signal. The EOP model module 495 subtracts the ErrorEOP from EOP 472 to generate EOP_Model. ErrorEOP may be a calibration signal a feedback error control signal, a sensor error correction signal, or other correction signal. Reported oil pressure may be reduced by possible worst case sensing errors.

Referring to FIG. 17, note that the ECT limit module 500 may be configured similarly to that of voltage limit module 490, the speed limit module 492 and the EOT limit module 494. The ECT limit module 500 may include, for example, similar lift mode detection modules, summers, comparators, merge devices, gates and buses.

Figure 28:
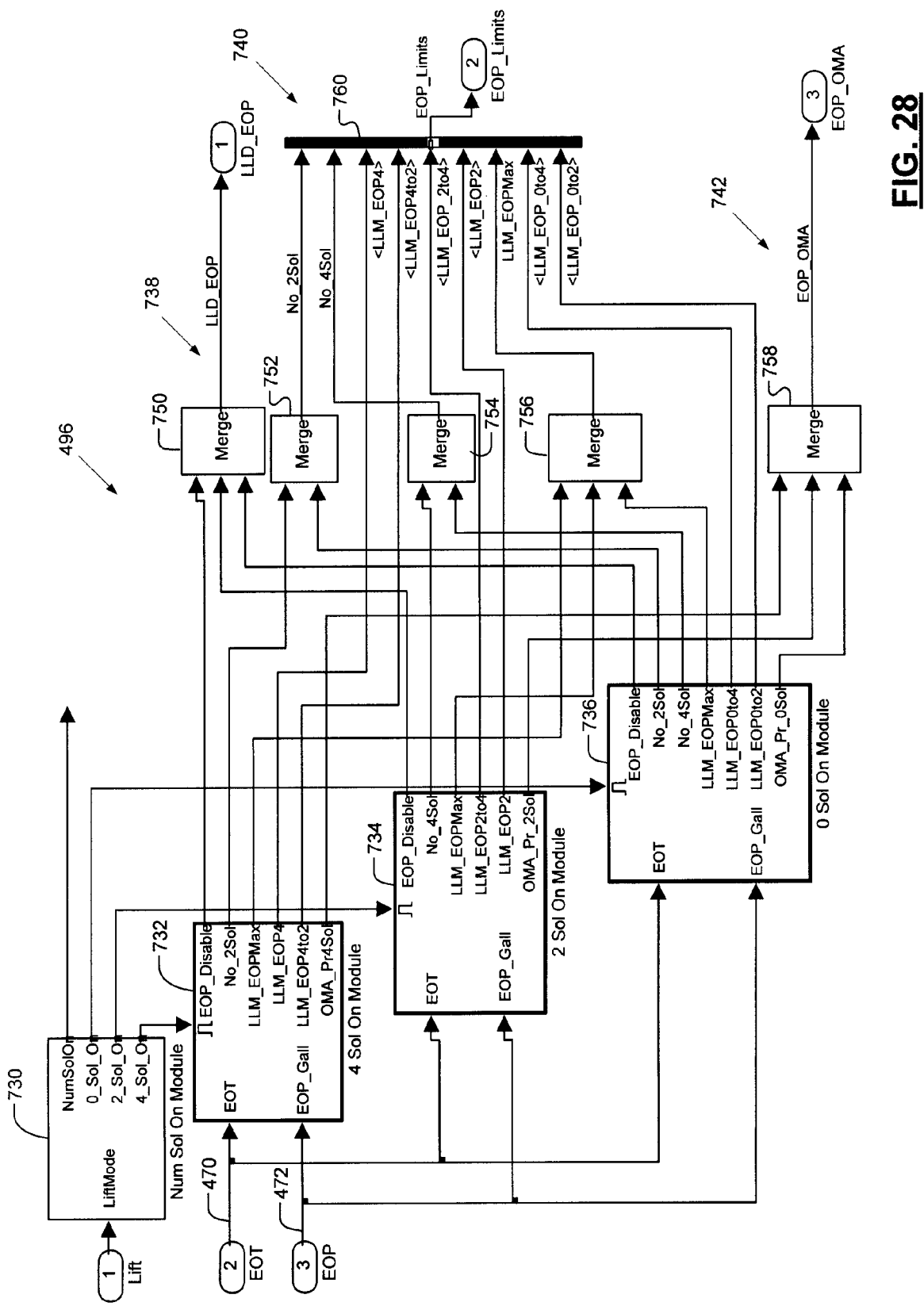
FIG. 28 is a functional block diagram of a engine oil pressure limit module of FIG. 17.

Referring now to FIG. 28, a functional block diagram of the engine oil pressure (EOP) limit module 496 of FIG. 17 is shown. The EOP limit module 496 disables low lift when the EOP is too high or too low and determines an engine oil pressure margin for control logic. As an increased number of solenoids are activated or in an ON state, oil pressure decreases with the increased oil flow through the solenoid valves. Control requires oil pressure remain above a predetermined level, such as approximately 200 kpa, to allow for switching between modes. Thus, control monitors fluctuation in oil pressure due to the number of active solenoids. Control prevents switching when oil pressure is outside a range. The EOP limit module 496 includes a number of solenoids ON module 730, a four (4) solenoid ON module 732, a two (2) solenoid ON module 734, a zero (0) solenoid ON module 736, and a low lift disable, EOP limit and EOP at oil manifold assembly (OMA) circuits 738, 740, 742.

The number of solenoids ON module 730 determines whether the system is operating in an exhaust lift mode and/or an intake lift mode and the number of solenoids in an ON state for the corresponding mode(s). The number of solenoids ON module 730 activates the modules 732-736 based on the number of ON solenoids via signals 0_Sol_On, 2_Sol_On and 4_Sol_On.

The four (4) solenoid ON module 732 generates an EOP disable signal, a low EOP disallow for 2 solenoids (No_2Sol) signal, a low lift margin EOP maximum (LLM_EOPMax) signal, a low lift margin EOP for 4 solenoids (LLM_EOP4) signal, a low lift margin EOP for 4-to-2 solenoid transition (LLM_EOP4to2) signal, and a OMA pressure for 4 solenoids (OMA_Pr4Sol) signal based on the EOT 470 and the EOP 472.

The two (2) solenoid ON module 734 generates an EOP disable signal, a low EOP disallow for 4 solenoids (No_4Sol) signal, a low lift margin EOP maximum (LLM_EOPMax) signal, a low lift margin EOP 2-to-4 solenoid transition (LLM_EOP2to4) signal, a low lift margin EOP for 2 solenoids (LLM_EOP2) signal, and a OMA pressure for 2 solenoids (OMA_Pr2Sol) signal based on the EOT 470 and the EOP 472.

The zero (0) solenoid ON module 736 generates an EOP disable signal, a low EOP disallow for 2 solenoids (No_2Sol) signal, a low EOP disallow for 4 solenoids (No_4Sol) signal, a low lift margin EOP maximum (LLM_EOPMax) signal, a low lift margin EOP 0-to-4 solenoid transition (LLM_EOP0to4) signal, a low lift margin EOP 0-to-2 solenoid transition (LLM_EOP0to2) signal, and a OMA pressure for 0 solenoids (OMA_Pr0Sol) signal based on the EOT 470 and the EOP 472

The low lift disable, EOP limit and EOP at oil manifold assembly (OMA) circuits 738, 740, 742 include merge devices 750-758. The merge devices 750-758, as shown include two or three inputs and an output. The merge devices 750-758 provide the input that changes last or most recently as the output. The first merge device 750 receives the EOP_disable signals and provides a low lift disable EOP (LLD_EOP) signal. The second merge device 752 receives the No_2Sol signals and provides the latest thereof as a limit signal to an EOP limit bus 760. The third merge device 754 receives the No_4Sol signals and provides the latest thereof as a limit signal to the EOP limit bus 760. The fourth merge device 756 receives the LLM_EOPMax signals and provides the latest thereof as a limit signal to the EOP limit bus 760. The fifth merge device 758 receives the OMA_Pr4Sol, OMA_Or_2Sol and OMA_Pr_0Sol signals to provide an EOP OMA pressure signal (EOP_OMA). Other generated signals of the modules 732-736 are provided to the EOP limit bus 760 as limit signals.

Figure 29:
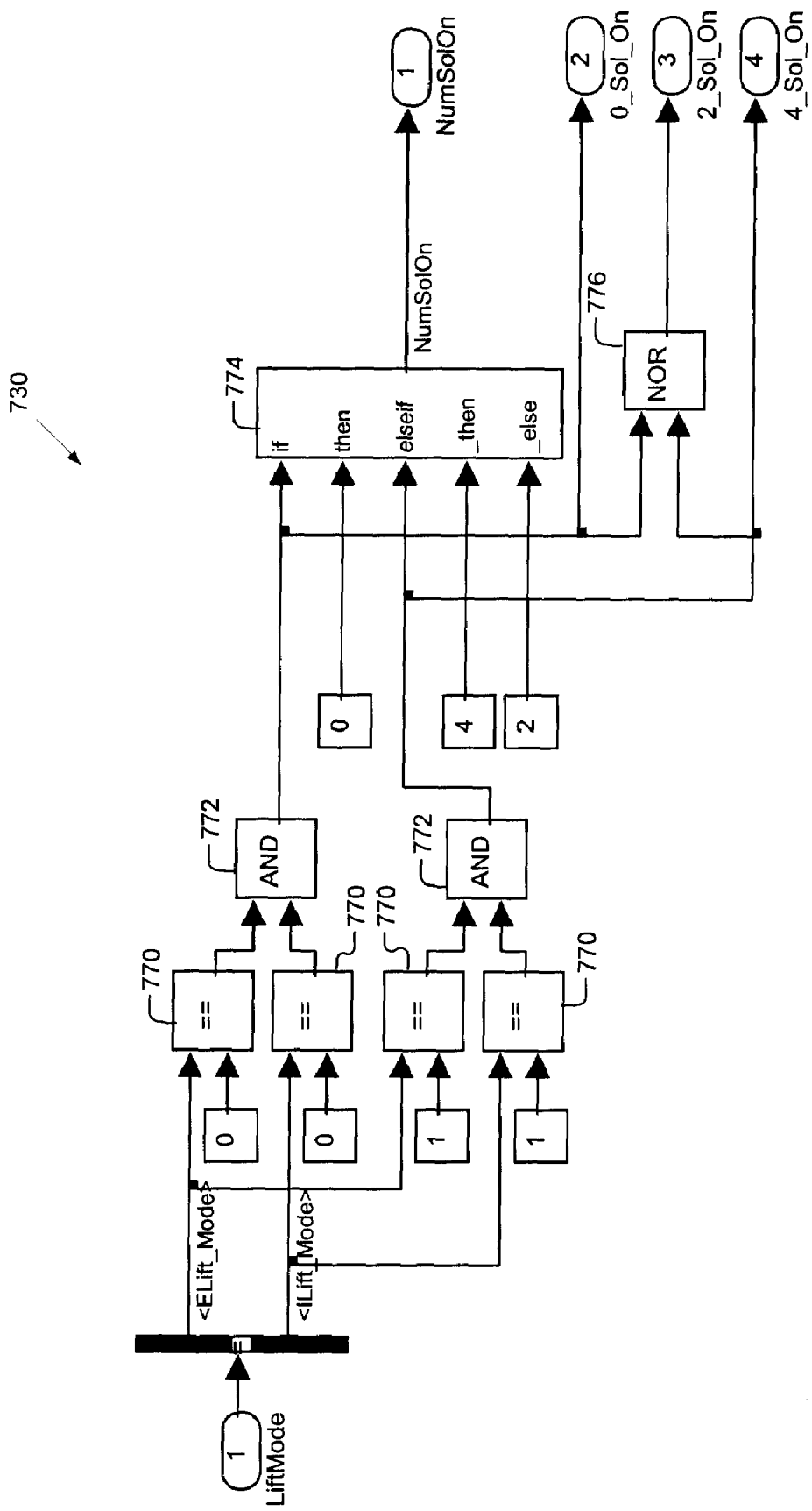
FIG. 29 is a functional block diagram of a number of solenoid ON module of FIG. 28.

Referring now to FIG. 29, a functional block diagram of the number of solenoids ON module 730 of FIG. 28 is shown. The ELift_Mode and the ILift_Mode are each compared with both LOW and HIGH signals, such as zero (0) and one (1), via comparators 770. Outputs of the comparators 770 for LOW and HIGH comparisons are respectively provided to two AND gates 772. Outputs of the AND gates 772 are provided to an if_then_else module 774. The if_then_else module 774 determines the number of solenoids active. When output of the first AND gate is true, then zero solenoids are ON. When output of the first AND gate is false, then 2 or 4 solenoids are ON depending upon the output of the second AND gate. When the output of the second AND gate is true then four solenoids are ON. The outputs of the AND gates are also provided as ON status signals for zero and four solenoids and to a NOR gate 776 to provide a two solenoid ON status signal. The status signals are used to activate the modules 732-736.

Figure 30:
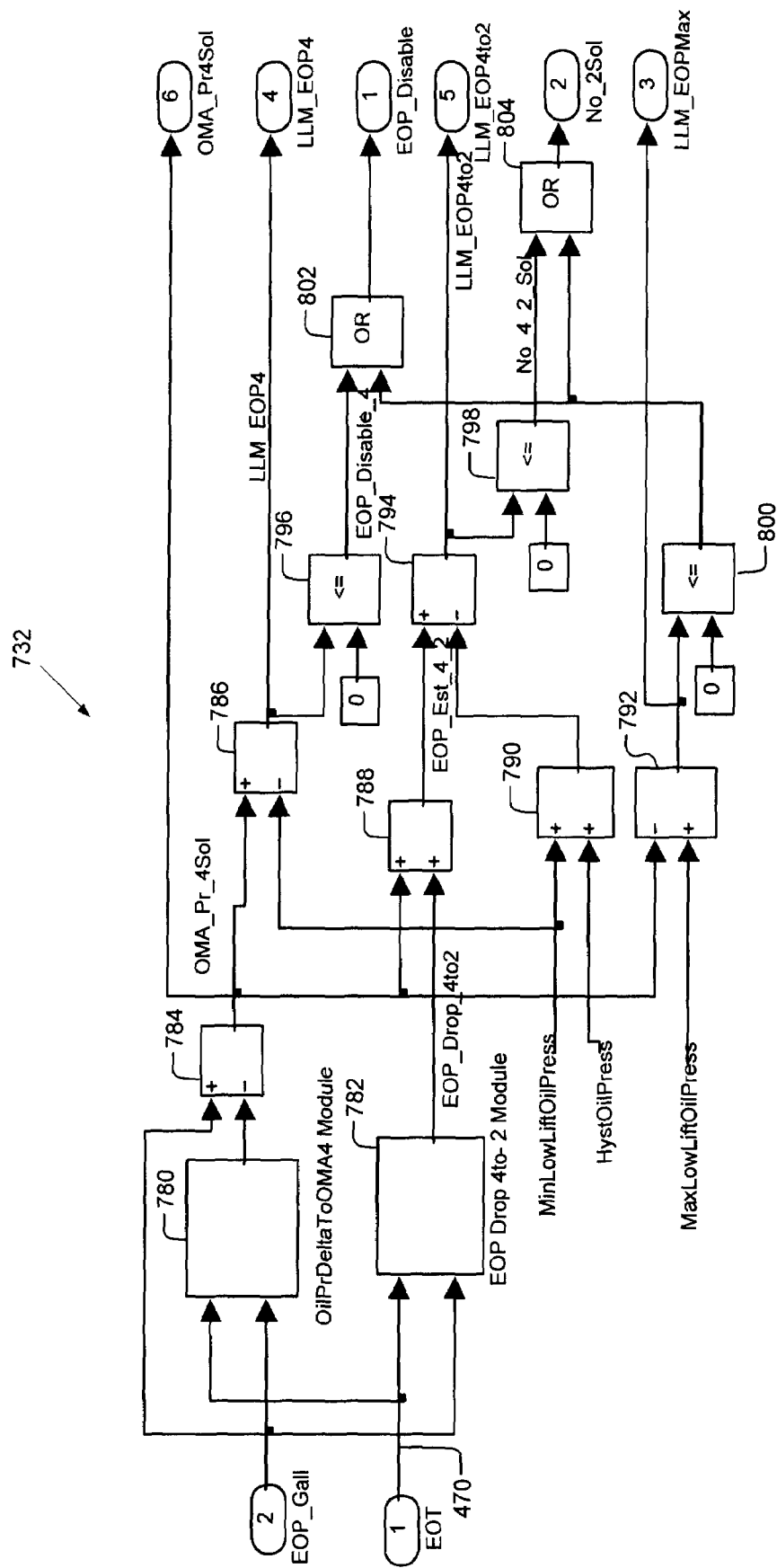
FIG. 30 is a functional block diagram of a four solenoid ON module of FIG. 28.

Referring now to FIG. 30, a functional block diagram of the four solenoid ON module 732 of FIG. 28 is shown. The four solenoid ON module 732 sets disallow flags when estimated or predicted oil pressure after a switch to low lift is less than a minimum allowed oil pressure for reliable operation. Low lift is disabled when a current oil pressure is less than a minimum reliable oil pressure.

The four solenoid ON module 732 includes an oil pressure difference (OilPrDeltaToOMA4) module 780 and an EOP drop from 4-to-2 solenoids (EOP Drop 4-to-2) module 782. The OilPrDeltaToOMA4 module 780 determines oil pressure difference between an oil pressure near an oil pump (gallery) and an oil pressure at an oil manifold assembly (OMA), which may be includes as part of or proximate an intake manifold assembly. The difference determined when four solenoids are ON. The difference is determined based on the EOP at the gallery (EOP_Gall) and the EOT 470. The difference is subtracted from the EOP_Gall via a first summer 784 to provide the estimated OMA pressure for four solenoids (OMA_Pr_4Sol).

The EOP Drop 4-to-2 module 782 generates an EOP drop in oil pressure (EOP_Drop_4to2) signal based on the EOP_Gall and the EOT 470. This represents the estimated change in oil pressure when switching from 4 to 2 solenoids. The modules 780 and 782 may include equations and/or tables.

The four solenoid ON module 732 also includes a second-sixth summers 786-794, comparators 796, 798, 800 and OR gates 802, 804. The second summer 786 subtracts a low lift minimum oil pressure (MinLowLiftOilPress) signal from the OMA_Pr_4Sol to generate a low lift margin EOP (LLM_EOP4) for 4 solenoids. LLM_EOP4 is provided to the first comparator 796. When the LLM_EOP4 is less than or equal to zero (0), an EOP disable (EOP_Disable_4) is HIGH, otherwise the EOP disable (EOP_Disable_4) is LOW.

The third summer 788 sums the OMA_Pr_4Sol with the EOP_Drop_4to2 to generate an EOP estimation (EOP_Est_4_2) signal for a 4-to-2 solenoid activation switch. The fourth summer 790 sums MinLowLiftOilPress with a hysteresis oil pressure (HystOilPress) signal; the sum of which is subtracted via the sixth summer 794 from the EOP_Est_4_2 to generate a low lift margin EOP for 4-to-2 solenoid activation switch (LLM_EOP4to2) signal. When the LLM_EOP4to2 is less than or equal to zero (0) a 4-to-2 solenoid limit (No_4_2_Sol) signal is generated in a HIGH state, as provided by the second comparator 798.

The fifth summer 792 subtracts OMA_Pr_4Sol from a maximum low lift oil pressure (MaxLowLiftOilPress) signal to generate a low lift margin EOP maximum (LLM_EOPMax) signal. When LLM_EOPMax is less than or equal to zero (0), output of the third comparator 800 is HIGH, otherwise the output of the third comparator 800 is LOW. The output of the third comparator 800 is provided to the OR gates 802 and 804, which also respectively receive EOP_Disable_4 and No_4_2_Sol. Output of the first OR gate 802 is an EOP disable signal (EOP_Disable). Output of the second OR gate is a two solenoid limit (No_2_Sol) signal.

Figure 31:
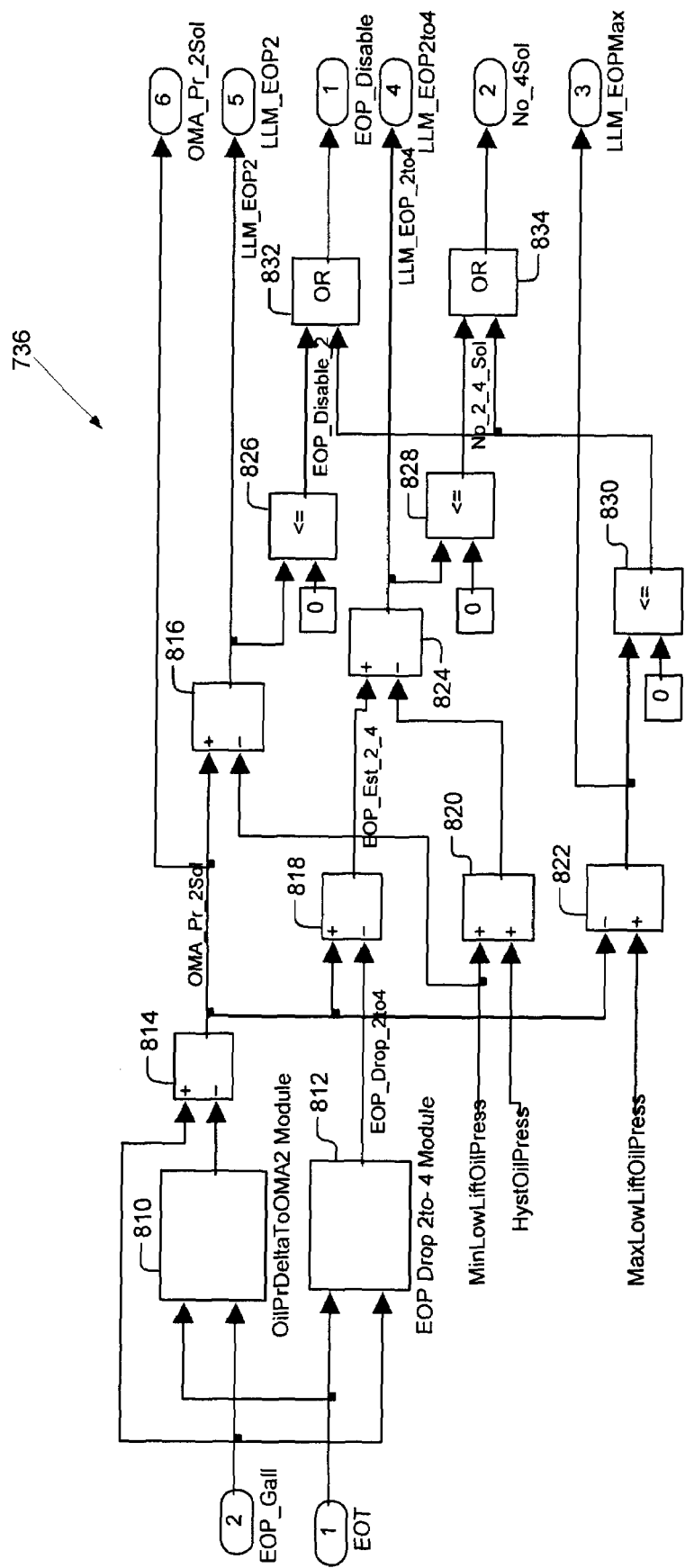
FIG. 31 is a functional block diagram of a two solenoid ON module of FIG. 28.

Referring now to FIG. 31, a functional block diagram of the two solenoid ON module 736 of FIG. 28 is shown. The two solenoid ON module 736 sets disallow flags when estimated or predicted oil pressure after a switch to low lift is less than a minimum allowed oil pressure for reliable operation. Low lift is disabled when a current oil pressure is less than a minimum reliable oil pressure.

The two solenoid ON module 736 includes an oil pressure difference (OilPrDeltaToOMA2) module 810 and an EOP drop from 2-to-4 solenoids (EOP Drop 2-to-4) module 812. The OilPrDeltaToOMA2 module 810 determines oil pressure difference between an oil pressure near an oil pump (gallery) and an oil pressure at an oil manifold assembly (OMA), which may be includes as part of or proximate an intake manifold assembly. The difference determined when two solenoids are ON. The difference is determined based on the EOP at the gallery (EOP_Gall) and the EOT 470. The difference is subtracted from the EOP_Gall via a first summer 814 to provide the estimated OMA pressure for two solenoids (OMA_Pr_2Sol).

The EOP Drop 2-to-4 module 812 generates an EOP drop in oil pressure (EOP_Drop_2to4) signal based on the EOP_Gall and the EOT 470. This represents the change in oil pressure when switching from 2 to 4 solenoids. The modules 810 and 812 may include equations and/or tables.

The two solenoid ON module 736 also includes a second-sixth summers 816-824, comparators 826, 828, 830 and OR gates 832, 834. The second summer 816 subtracts a low lift minimum oil pressure (MinLowLiftOilPress) signal from the OMA_Pr_2Sol to generate a low lift margin EOP (LLM_EOP2) for 2 solenoids. When the LLM_EOP2 is less than or equal to zero (0), an EOP disable (EOP_Disable_2) generated by the first comparator 826 is HIGH, otherwise the EOP disable (EOP_Disable_2) is LOW.

The third summer 818 sums the OMA_Pr_2Sol with the EOP_Drop_2to4 to generate an EOP estimation (EOP_Est_2_4) signal for a 2-to-4 solenoid activation switch. The fourth summer 820 sums MinLowLiftOilPress with a hysteresis oil pressure (HystOilPress) signal; the sum of which is subtracted via the sixth summer 824 from the EOP_Est_2_4 to generate a low lift margin EOP for 2-to-4 solenoid activation switch (LLM_EOP2to4) signal. When the LLM_EOP2to4 is less than or equal to zero (0) a 2-to-4 solenoid limit (No_2_4_Sol) signal is generated by the second comparator 828 in a HIGH state.

The fifth summer 822 subtracts OMA_Pr_2Sol from a maximum low lift oil pressure (MaxLowLiftOilPress) signal to generate a low lift margin EOP maximum (LLM_EOPMax) signal. When LLM_EOPMax is less than or equal to zero (0), output of the third comparator 830 is HIGH, otherwise the output of the third comparator 830 is LOW. The output of the third comparator 830 is provided to the OR gates 832 and 834, which also respectively receive EOP_Disable_2 and No_2_4_Sol. Output of the first OR gate 832 is an EOP disable signal (EOP_Disable). Output of the second OR gate 834 is a four solenoid limit (No_4_Sol) signal.

Figure 32:
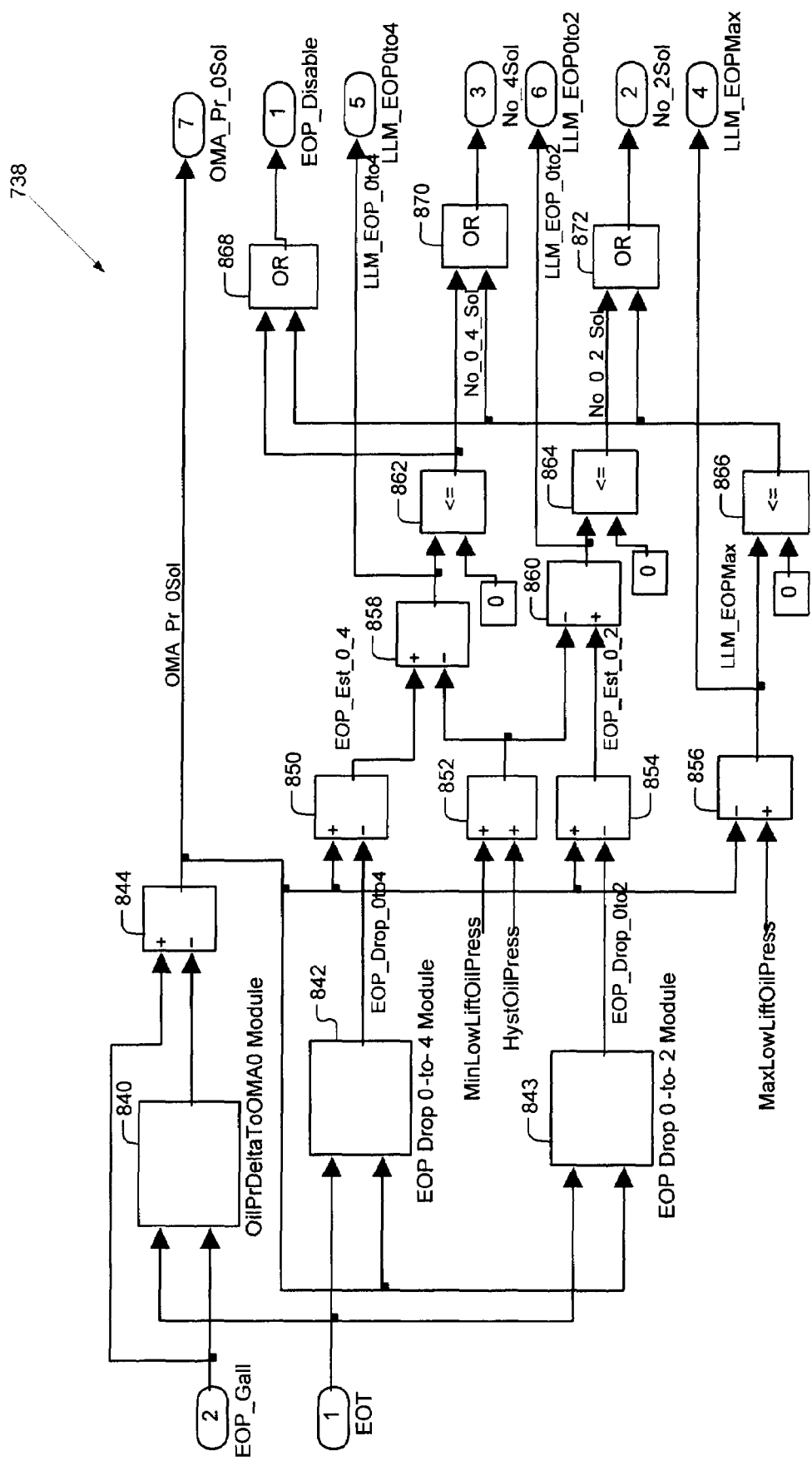
FIG. 32 is a functional block diagram of a zero solenoid ON module of FIG. 28.

Referring now to FIG. 32, a functional block diagram of the zero solenoid ON module 738 of FIG. 28 is shown. The zero solenoid ON module 738 sets disallow flags when estimated or predicted oil pressure after a switch to low lift is less than a minimum allowed oil pressure for reliable operation. Low lift is not allowed when a current oil pressure is less than a minimum reliable oil pressure.

The zero solenoid ON module 738 includes an oil pressure difference (OilPrDeltaToOMA0) module 840, an EOP drop from 0-to-4 solenoids (EOP Drop 0-to-4) module 842 and an EOP drop from 0-to-2 solenoids (EOP Drop 0-to-2) module 843. The OilPrDeltaToOMA0 module 840 determines oil pressure difference between an oil pressure near an oil pump (gallery) and an oil pressure at an oil manifold assembly (OMA), which may be includes as part of or proximate an intake manifold assembly. The difference determined when zero solenoids are ON. The difference is determined based on the EOP at the gallery (EOP_Gall) and the EOT 470. The difference is subtracted from the EOP_Gall via a first summer 844 to provide the estimated OMA pressure for zero solenoids (OMA_Pr_0Sol).

The EOP Drop 0-to-4 module 842 generates an EOP drop in oil pressure (EOP_Drop_0to4) signal based on the EOP_Gall and the EOT 470. This represents the change in oil pressure when switching from 2 to 4 solenoids. The EOP Drop 0-to-2 module 843 generates an EOP drop in oil pressure (EOP_Drop_0to2) signal based on the EOP_Gall and the EOT 470. This represents the change in oil pressure when switching from 0 to 2 solenoids. The modules 840, 842 and 843 may include equations and/or tables.

The zero solenoid ON module 738 also includes a second-seventh summers 850-860, comparators 862, 864, 866 and OR gates 868, 870, 872. The second summer 850 subtracts an EOP drop in oil pressure from 0-to-4 solenoids (EOP_Drop_0to4) signal from OMA_Pr_0Sol to generate an EOP estimation oil pressure (EOP_Est_0_4) signal for switching from 0-to-4 solenoids.

The third summer 852 sums a low lift minimum oil pressure (MinLowLiftOilPress) signal with a hysteresis oil pressure (HystOilPress) signal; the result of which is subtracted from EOP_Est_0_4 via the first comparator 862 a low lift margin EOP limit (LLM_EOP_0to4) signal for 0-to-4 solenoid switching.

The fourth summer 854 generates a EOP estimation oil pressure (EOP_Est_0_2) signal for switching between 0 and 2 solenoids based on OMA_Pr_0Sol and EOP_Drop_0to2. The fifth summer 856 subtracts OMA_Pr_0Sol from MaxLowLiftOilPress to generate a maximum low lift margin EOP (LLM_EOPMax) signal.

When LLM_EOP0to4 is less than or equal to zero (0), then a 0-to-4 limit (No_0_4_Sol) signal is generated by the output of the first comparator 862 is HIGH, otherwise the output is LOW. The output of the first comparator is provided to the OR gates 868, 870. When LLM_EOP0to2 is less than or equal to zero (0), then a 0-to-2 limit (No_0_2_Sol) signal is generated by the second comparator 864 in a HIGH state. LLM_EOPMax is compared with the value zero (0) via the third comparator 866; the resultant output of which is provided as an input to each of the OR gates 868, 870, 872.

Figure 33:
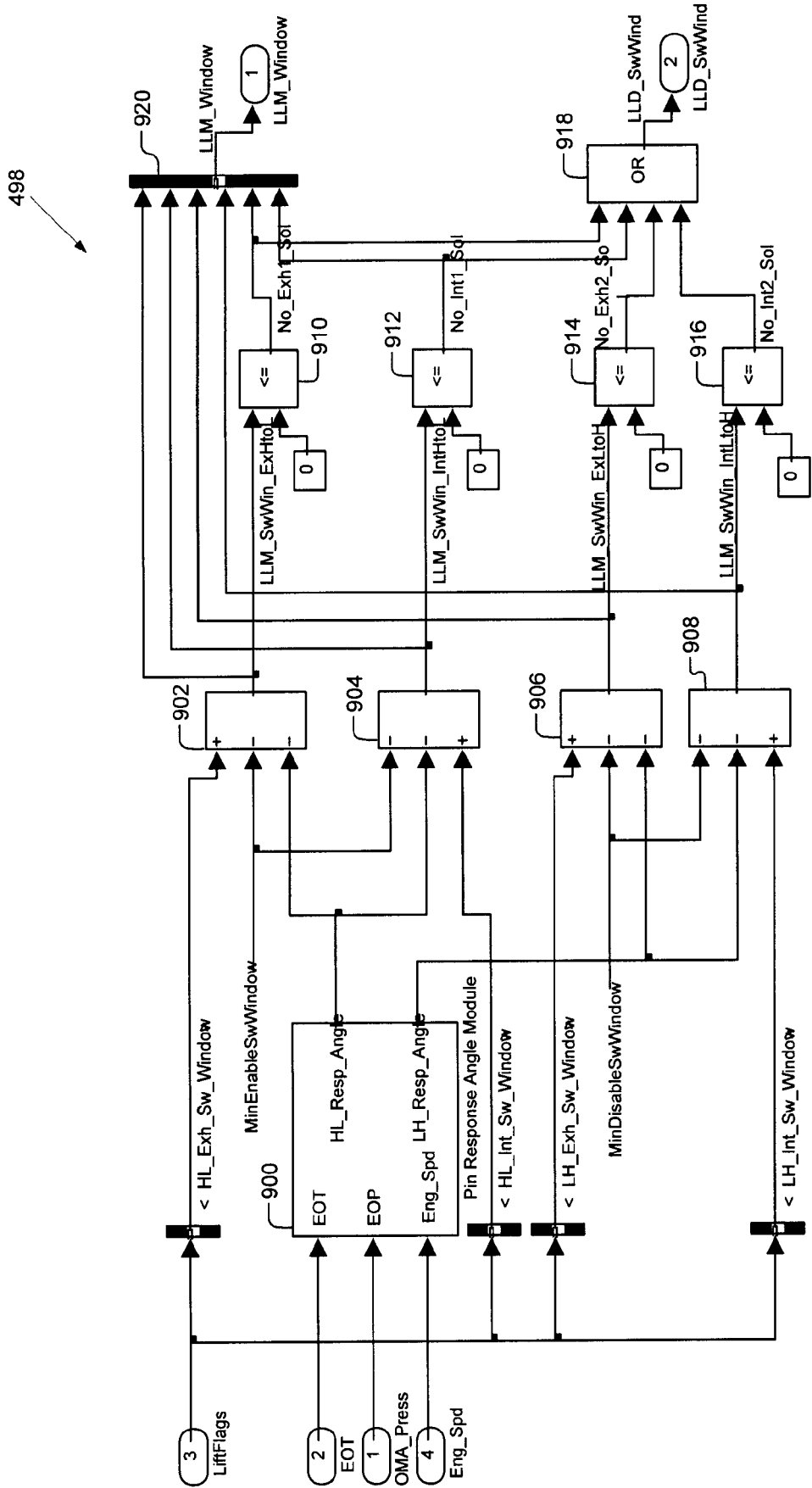
FIG. 33 is a functional block diagram of a window limit module of FIG. 17.

Referring now to FIG. 33, a functional block diagram of the window limit module 498 of FIG. 17 is shown. The window limit module 498 prevents switching between lift modes when the system switching speed is not quick enough for a switch to occur within a switching window time frame. The window limit module 498 prevents low lift change when estimated latching pin response, converted to crank angles, correspond with points in time that are outside available switching window angle. This may account for margins. A change to high lift is performed when estimated pin response angles correspond with points in time that are outside the switching windows. The window limit module 498 includes a pin response angle module 900. The pin response module 900 generates a high to low lift response angle (HL_Resp_Angle) signal and a low to high lift response angle (LH_Resp_Angle) signal based on EOT 470, EOP 472 and EngSpd 476.

The window limit module 498 also includes summers 902-908, comparators 910-916 and a OR gate 918. The first summer 902 subtracts the sum of a minimum enable switching window (MinEnableSwWindow) signal and HL_Resp_Angle from a high to low lift exhaust switch window (HL_Exh_Sw_window) signal to generate a low lift margin switching window exhaust high to low lift limit (LLM_SwWin_ExHtoL) signal. The second summer 904 subtracts the sum of a minimum enable switching window (MinEnableSwWindow) signal from a high to low lift intake switching window (HL_Int_Sw_Window) signal to generate a low lift margin switching window intake high to low lift limit (LLM_SwWin_IntHtoL) signal.

The third summer 906 subtracts the sum of a minimum disable switching window (MinDisableSwWindow) signal and LH_Resp_Angle from LH_Exh_Sw_Window to generate a low lift margin switching window exhaust low to high lift limit (LLM_SwWin_ExLtoH) signal. The fourth summer 908 subtracts the sum of MinDisableSwWindow and LH_Resp_Angle from a low to high lift intake switching window (LH_IntSw_Window) signal to generate a low lift margin switching window for intake from low to high lift limit (LLM_SwWin_IntLtoH) signal.

When LLMSwWin_ExHtoL is less than or equal to zero (0) the first comparator 910 generates an exhaust solenoid limit (No_Exh1_Sol) signal in a HIGH state. When LLMSwWin_IntHtoL is less than or equal to zero (0) the second comparator 912 generates an intake solenoid limit (No_Int1_Sol) signal in a HIGH state. When LLMSwWin_ExLtoH is less than or equal to zero (0) the first comparator 914 generates an exhaust solenoid limit (No_Exh2_Sol) signal in a HIGH state. When LLMSwWin_IntLtoH is less than or equal to zero (0) the first comparator 916 generates an intake solenoid limit (No_Int2_Sol) signal in a HIGH state.

The outputs of the summers 902-908 and the comparators 910-916 may be provided to a low lift margin bus 920, which provides a low lift margin window (LLM_Window) signal. The outputs of the comparators 910-916 are provided as inputs to the OR gate 918. The OR gate provides a low lift disable switching window (LLD_SwWind) signal.

Figure 34:
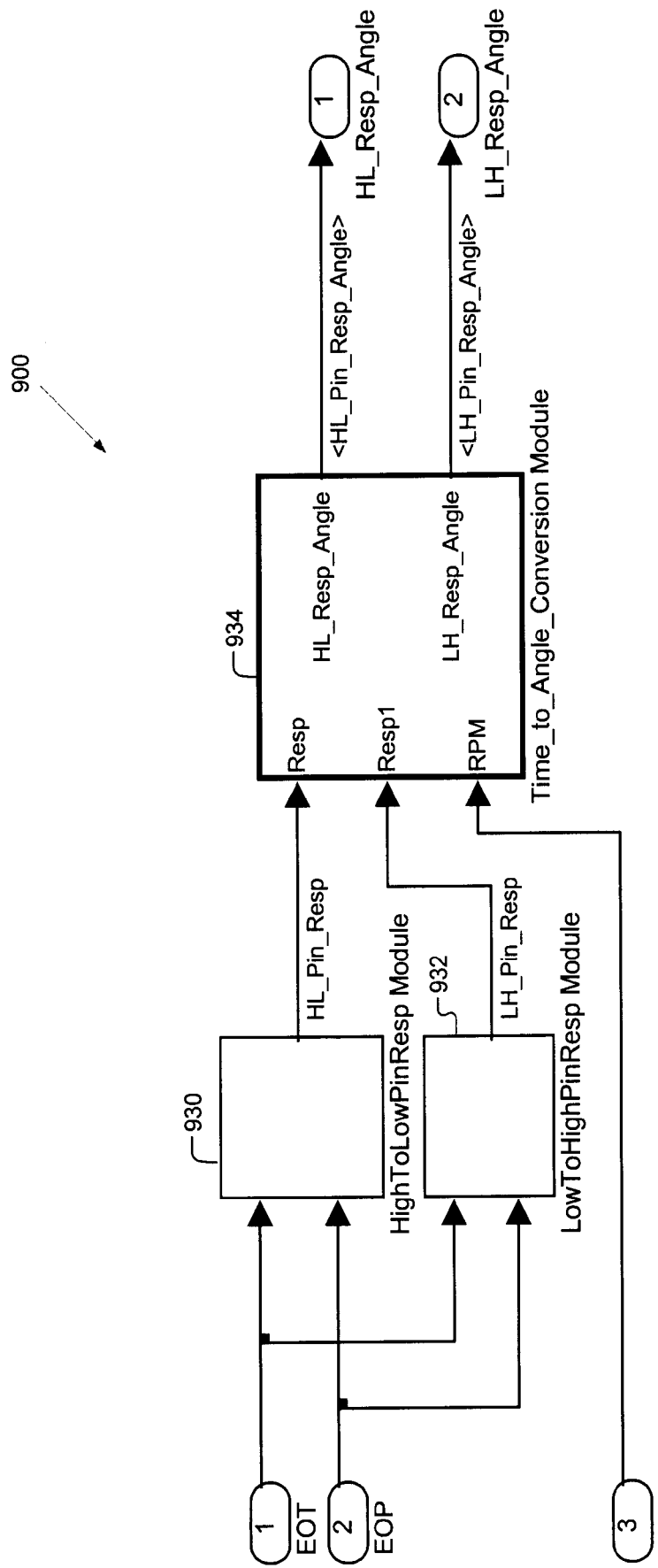
FIG. 34 is a functional block diagram of a pin response angle module of FIG. 33.

Referring now to FIG. 34, a functional block diagram of the pin response angle module 900 of FIG. 33 is shown. The pin response angle module 900 accounts for sources of variation and estimation errors, which affect lift mode switching response times. The pin response angle module 900 may account for solenoid pressure change variation, latch pin response time variation, pressure rise variation, pressure rise estimation error, latch pin response estimation error, solenoid response estimation error, camshaft position error, etc.

The pin response angle module 900, as shown, includes a high to low pin response module 930, a low to high pin response module 932 and a time to angle conversion module 934. The high to low module 930 generates a high to low pin response signal based on EOT 470 and EOP 472. The low to high module 932 generates a low to high pin response signal based on EOT 470 and EOP 472. The stated output signals of the modules 930 and 932 are provided to the conversion module 934. The modules 930 and 932 may include equations and/or look-up tables.

The conversion module 934 converts the response times to response angles based on engine speed. The high to low pin response is converted to a high to low response angle. Likewise, the low to high pin response is converted to a low to high response angle. The response angles may refer to crankshaft angles. In other words, for a given response time, the conversion module 934 determines the corresponding crankshaft angle or position of the crankshaft.

Figure 35:
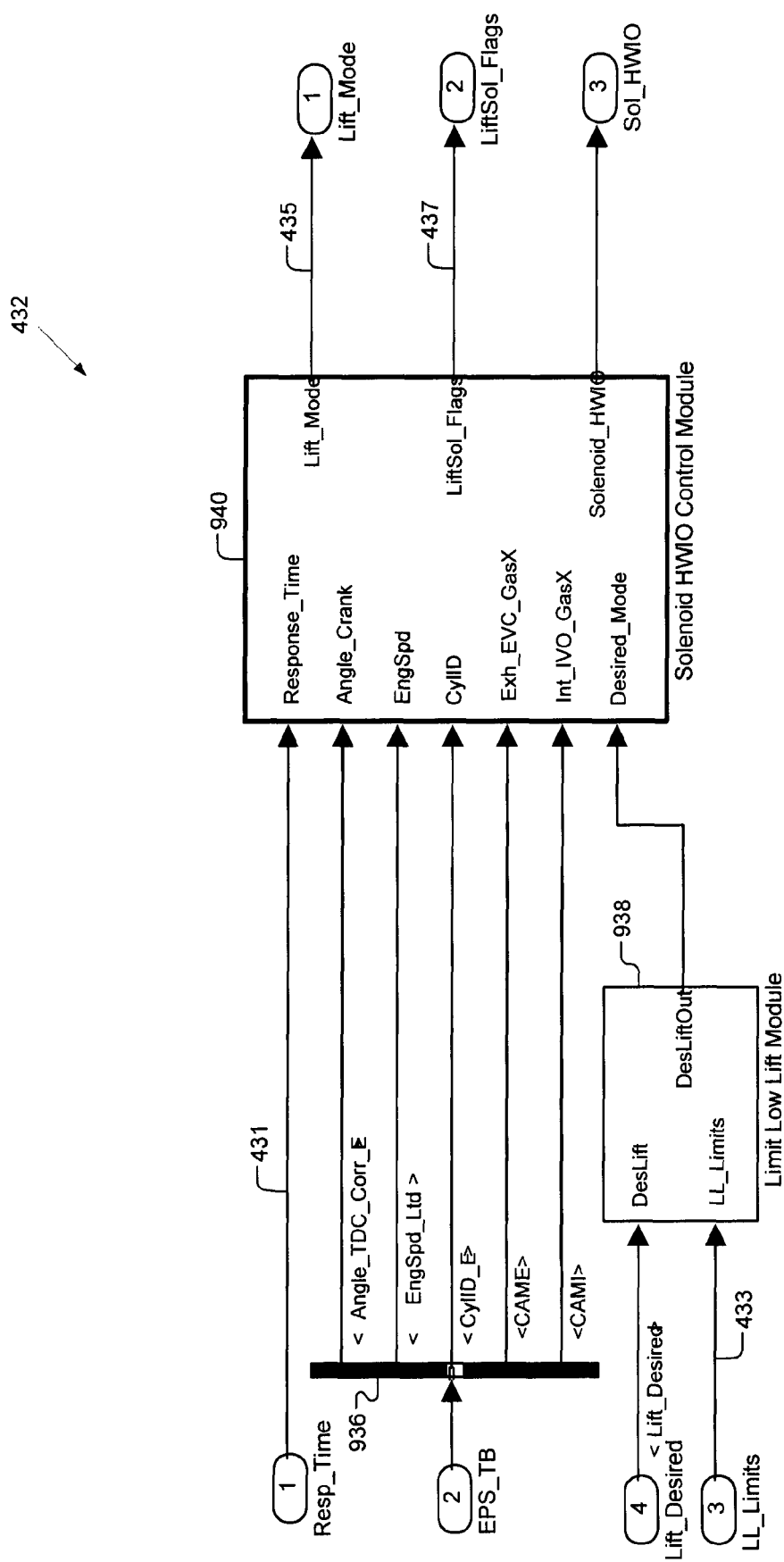
FIG. 35 is a functional block diagram of an event module of FIG. 14.

Referring now to FIG. 35, a functional block diagram of the event module 432 of FIG. 12 is shown. An event trigger logic may be performed during each cylinder firing, for example, after each rotation of a crankshaft of 180° for a 4 cylinder engine. The event module 432 synchronizes control of oil pressure solenoid control valves to engine position for properly timed camshaft lift switching. The event module 432 also outputs synchronized flags to engine control logic of current camshaft lift states. The event module 432 includes an engine position sensing bus 936, a low lift limit module 938 and a solenoid hardware input/output control module 940.

The engine position sensing bus 936 receives a time based engine position sensing signal, which includes a crank angle referenced to top dead center and corrected (Angle_TDC_Corr_E) signal, an engine speed (Eng_Speed) signal, a cylinder identification (CylID_E) signal, a camshaft exhaust angle (CAME) signal, and a camshaft intake angle (CAMI) signal.

The low lift limit module 938 generates a selected lift output (DesLiftOut) signal based on a lift command signal (Lift_Desired) and a low lift limit (LL_Limits) signal.

The solenoid hardware input/output control module 940 generates Lift_Mode 435, LiftSol_Flags 437 and a solenoid hardware input/output (Solenoid_HWIO) signal based on a response time (Resp_time) signal 431, signals from the bus 936 and DesLiftOut. Lift_Mode is the current lift mode. LiftSol_Flags may include flags associated with and the current state of valve control solenoids.

Figure 36:
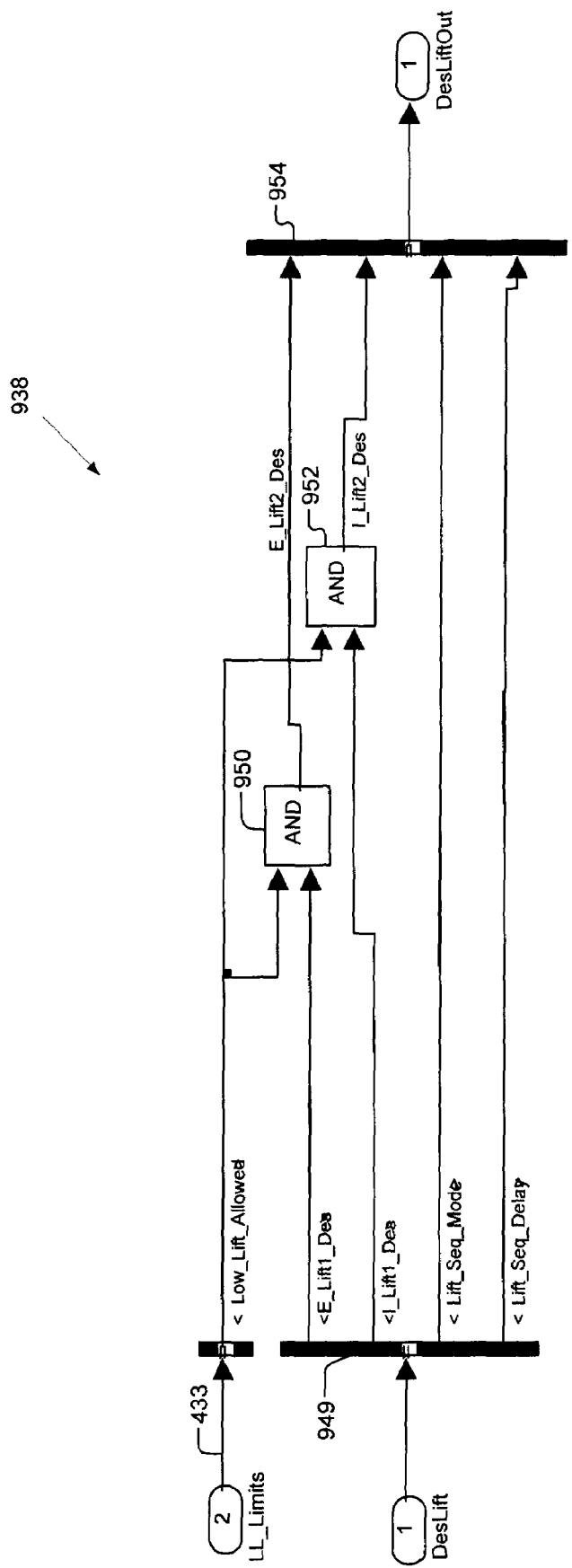
FIG. 36 is a functional block diagram of a limit low lift module of FIG. 35.

Referring now to FIG. 36, a functional block diagram of the low lift module 938 of FIG. 35 is shown. The low lift module 938 disallows low lift and initiates and/or causes operation in high lift for cam lift hardware protection. The low lift module 938 includes a desired lift input bus 949 that receives a desired lift (DesLift) signal, which includes a selected exhaust lift (E_Lift1_Des) signal, a selected intake lift (I_Lift1_Des) signal, a lift sequence mode (Lift_Seq_Mode) signal and a lift sequence delay (Lift_Seq_Delay) signal. E_Lift1_Des and I_Lift1_Des are provided to respective AND gates 950, 952.

The first AND gate provides an exhaust lift selected (E_Lift2_Des) signal based on E_Lift1_Des and a low lift allowed (Low_Lift_Allowed) signal. Low_Lift_Allowed is included in LL_Limits and indicates that a low lift mode is permitted. For example, when Low_Lift_Allowed is HIGH then the low lift module 938 permits operation in low lift mode. The second AND gate provides an intake lift selected (I_Lift2_Des) signal based on I_Lift1_Des and Low_Lift_Allowed.

Lift_Seq_Mode, Lift_Seq_Delay, E_Lift2_Des, and I_Lift2_Des are provided to a desired lift output bus 954. The lift output bus 954 provides a selected lift output signal (DesLiftOut) or (Desired_Mode).

Figure 37:
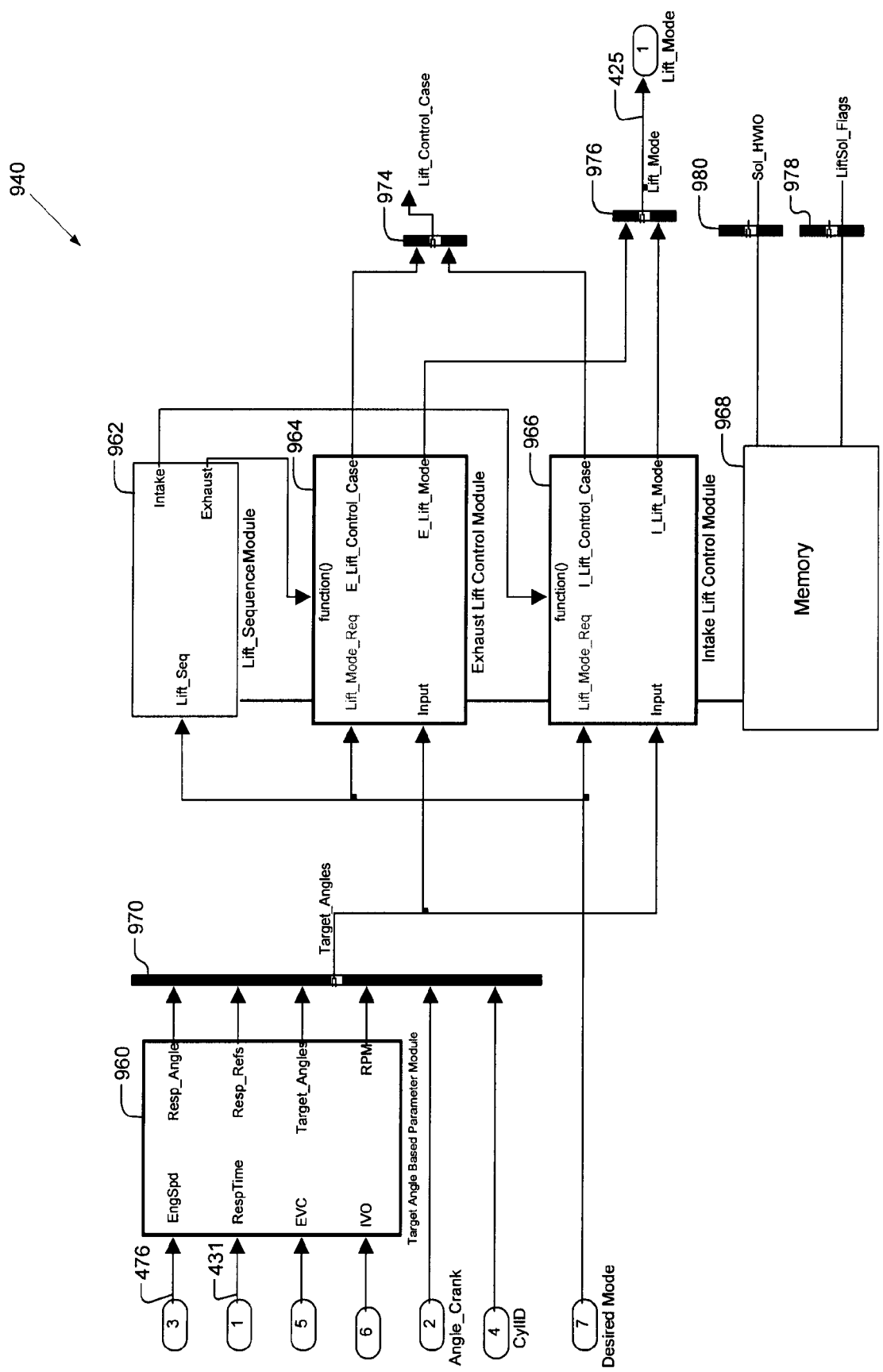
FIG. 37 is a functional block diagram of a solenoid hardware input/output (HWIO) control module of FIG. 35.

Referring now to FIG. 37, a functional block diagram of the solenoid HWIO control module 940 of FIG. 35 is shown. The HWIO control module 940 controls permitted lift changes and current lift status for intake and exhaust valves. The intake lift control logic may be similar to and/or the same as the exhaust lift control logic. The HWIO control module 940 includes a target angle base parameter module 960, a lift sequence module 962, an exhaust lift control module 964, an intake lift control module 966, and a memory 968. The memory 968 may be part of, one and the same as, or separate from the memory 427 of FIG. 14. The lift sequence module 962, the exhaust lift control module 964, and the intake lift control module 966 are coupled to the memory 968 and perform tasks based on information stored in the memory, such as LL_Limits 433, any of the above-described flags, intake and exhaust valve solenoid information, etc. The intake and exhaust valve solenoid information may include crank angle information, camshaft position information, duration information, or other solenoid information.

The target angle base parameter module 960 generates a response angle (Resp_Angle) signal, a response reference (Resp_Refs) signal, a target angles (Target_Angles) signal, and a speed (RPM) signal based on EngSpd 476, RespTime 431, an exhaust camshaft position or exhaust valve closing angle (EVC) signal, and an intake camshaft position or intake valve opening angle (IVO) signal. Resp_Angle, Resp_Refs, Target_Angles, RPM and a crankshaft angle (Angle_Crank) signal and a cylinder identification (CylID) signal are provided to a target angle bus 970 to generate a target angle (Target_Angles) signal. EVC and IVO are based on crankshaft position sensing and intake and exhaust camshaft phase sensors.

The lift sequence module 962 control sequence of changing lift mode of intake and exhaust valves. The lift sequence module 962 determines whether to permit intake valves or exhaust valves to change lift mode first. Intake or exhaust valves may switch first. In one embodiment, the exhaust valves are switched to a low lift mode before the intake valves. The lift sequence module 962 generates an intake signal and an exhaust signal based on a lift sequence (Lift_Seq) signal. Lift_Seq may be included in Desired_Mode. The intake signal and exhaust signal are used to activate the exhaust lift control module 964 and the intake lift control module 966.

The exhaust lift control module 964 generates an exhaust valve lift control signal (E_Lift_Control_Case) signal and E_Lift_Mode based on a lift mode request (Lift_Mode_Req) signal and Target_Angles.

The intake lift control module 966 generates an intake valve lift control signal (I_Lift_Control_Case) signal and I_Lift_Mode based on Lift_Mode_Req and Target_Angles. E_Lift_Control_Case and I_Lift_Control_Case may have a "same or no change" state (0), a "high lift to low lift transition" state (1), or a "low lift to high lift" (2) state. E_Lift_Control_Case and I_Lift_Control_Case are provided to a lift control bus 974 to provide a lift control (Lift_Control_Case) signal, which is provided to the main module 428 of FIG. 14. Lift_Control_Case allows the main module 428 to change operating lift mode of intake and exhaust valves. E_Lift_Mode and I_Lift_Mode indicate current mode of the exhaust and intake valves. E_Lift_Mode and I_Lift_Mode are provided to a lift mode bus 976 to generate Lift_Mode 425.

The memory 968 may generate and/or provide LiftSol_Flags and Sol_HWIO via associated buses 978 and 980.

Figure 38:
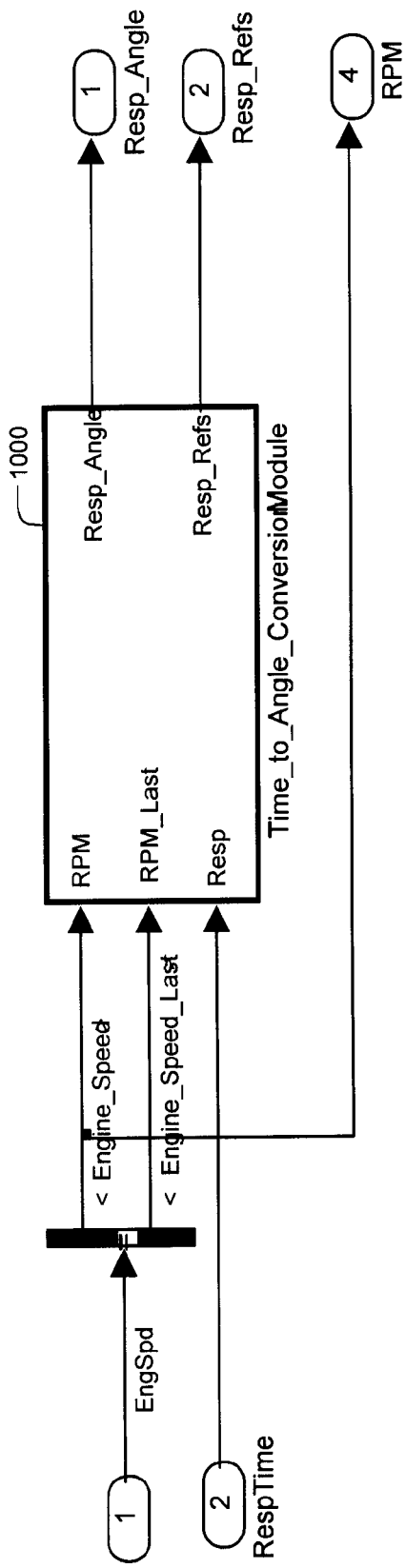
FIG. 38 is a functional block diagram of a portion of a target angle based parameter module of FIG. 37.

Referring now to FIG. 38, a functional block diagram of a portion of the target angle based parameter module 960 of FIG. 37 is shown. The target angle based parameter module 960 includes a time to angle conversion module 1000. The conversion module 1000 converts response time to angles based on engine speed. The conversion module 1000 generates Resp_Angle and Resp_Refs based on EngSpd 476, which may include a current engine speed RPM, a previous engine speed (RPM_Last) signal, and RespTime.

Figure 39:
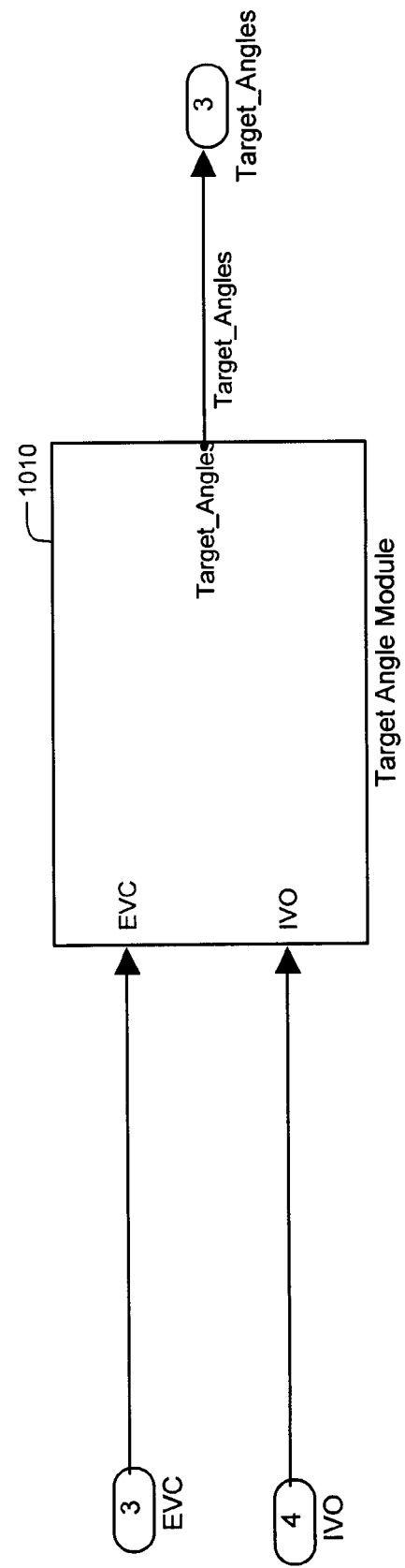
FIG. 39 is a functional block diagram of another portion of the target angle based parameter module of FIG. 37.

Referring now to FIG. 39, a functional block diagram of another portion of the target angle based parameter module 960 of FIG. 37 is shown. The target angle based parameter module 960 includes a target and switching window module 1010. The target and switching window module 1010 generates Target_Angles based on EVC and IVO.

Figure 40:
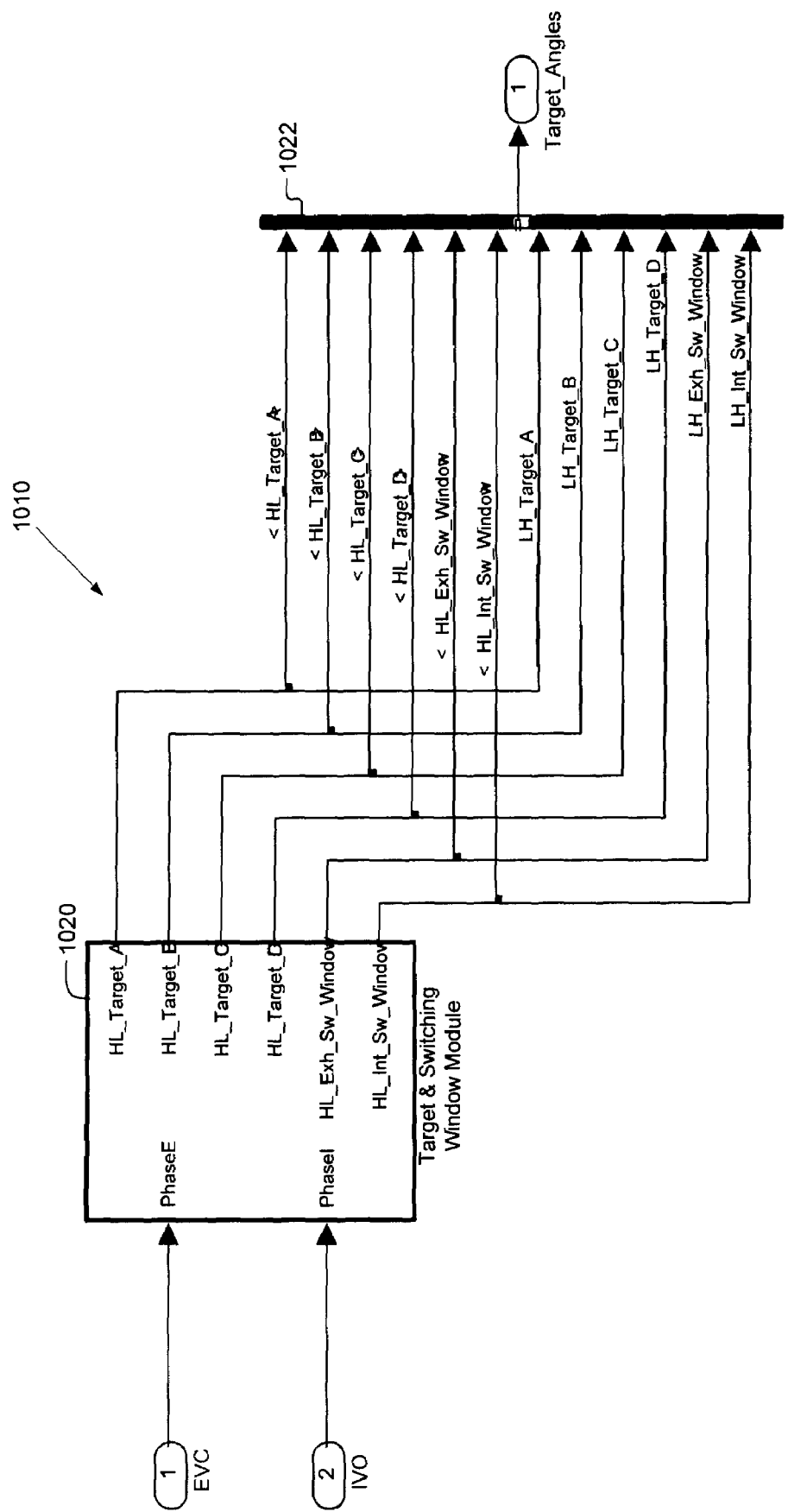
FIG. 40 is a functional block diagram of a target and switching window module of FIG. 39.

Referring now to FIG. 40, a functional block diagram of the target and switching window module 1010 of FIG. 39 is shown. The target and switching window module 1010 includes a high to low module 1020 and a target angle bus 1022. The high to low module generates high to low and low to high target angles for each cylinder and high to low and low to high switching windows for intake and exhaust valves. These signals include HL_Target_A, HL_Target_B, HL_Target_C, HL_Target_D, LH_Target_A, LH_Target_B, LH_Target_C, LH_Target_D, HL_Exh_Sw_Window, HL_Int_Sw_Window, LH_Exh_Sw_Window, and LH_Int_Sw_Window. A-D may refer to each of four cylinders and/or the solenoids associated with each of the cylinders. As another example, A may refer to exhaust valves of cylinders 1 and 2, B may refer to exhaust valves of cylinders 3 and 4, C may refer to intake valves of cylinders 1 and 2, and D may refer to intake valves of cylinders 3 and 4.

The target angles are associated with crankshaft angles that are targeted for a change in oil pressure for switching from low to high or from high to low lift modes. The same or different target angles may be used for switching from low to high and from high to low lift modes.

Figure 41:
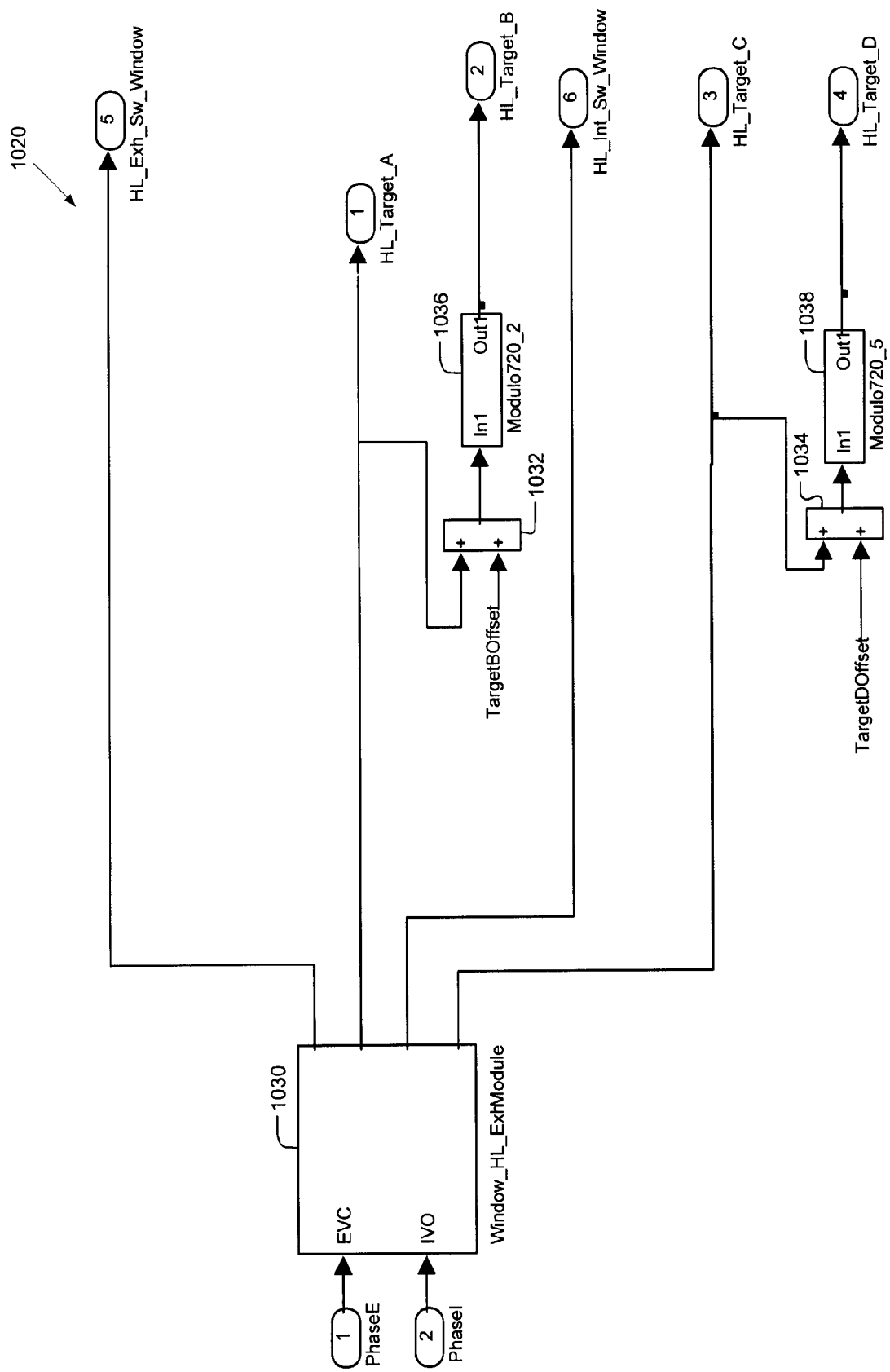
FIG. 41 is a functional block diagram of a target and switching window module of FIG. 40.

Referring now to FIG. 41, a functional block diagram of the target and switching window module 1020 of FIG. 40 is shown. The target and switching window module 1020 includes a high to low lift exhaust module 1030. The high to low lift exhaust module 1030 generates a high to low exhaust switching window (HL_Exh_Sw_Window) signal, a high to low target angle (HL_Target_A) signal, a high to low intake switching window (HL_Int_Sw_Window) signal and a high to low target angle (HL_Target_C) based on EVC and IVO.

The target and switching window module 1020 also includes first and second summers 1032, 1034 and first and second modulo modules 1036, 1038. The first summer 1032 sums HL_Target_A with a target cylinder B offset (TargetBOffset) signal. Output of the first summer 1032 is received by the first modulo module 1036, which generates a high to low target angle (HL_Target_B) signal. The second summer 1034 sums HL_Target_C with a target cylinder D offset (TargetDOffset) signal. Output of the second summer 1034 is received by the second modulo module 1038, which generates a high to low target angle (HL_Target_D) signal.

As an example, the target angle for solenoid B may be determined by adjusting the target angle for solenoid A by 180°. Similarly, the target angle for solenoid D may be determined by adjusting the target angle for solenoid C by 180°.

In addition to or as an alternative to determining target angles within switching windows, targets may be determined as percentages of a switching window, as fixed or predetermined amounts of time into switching windows, or fixed or predetermined angle into switching windows.

Figure 42:
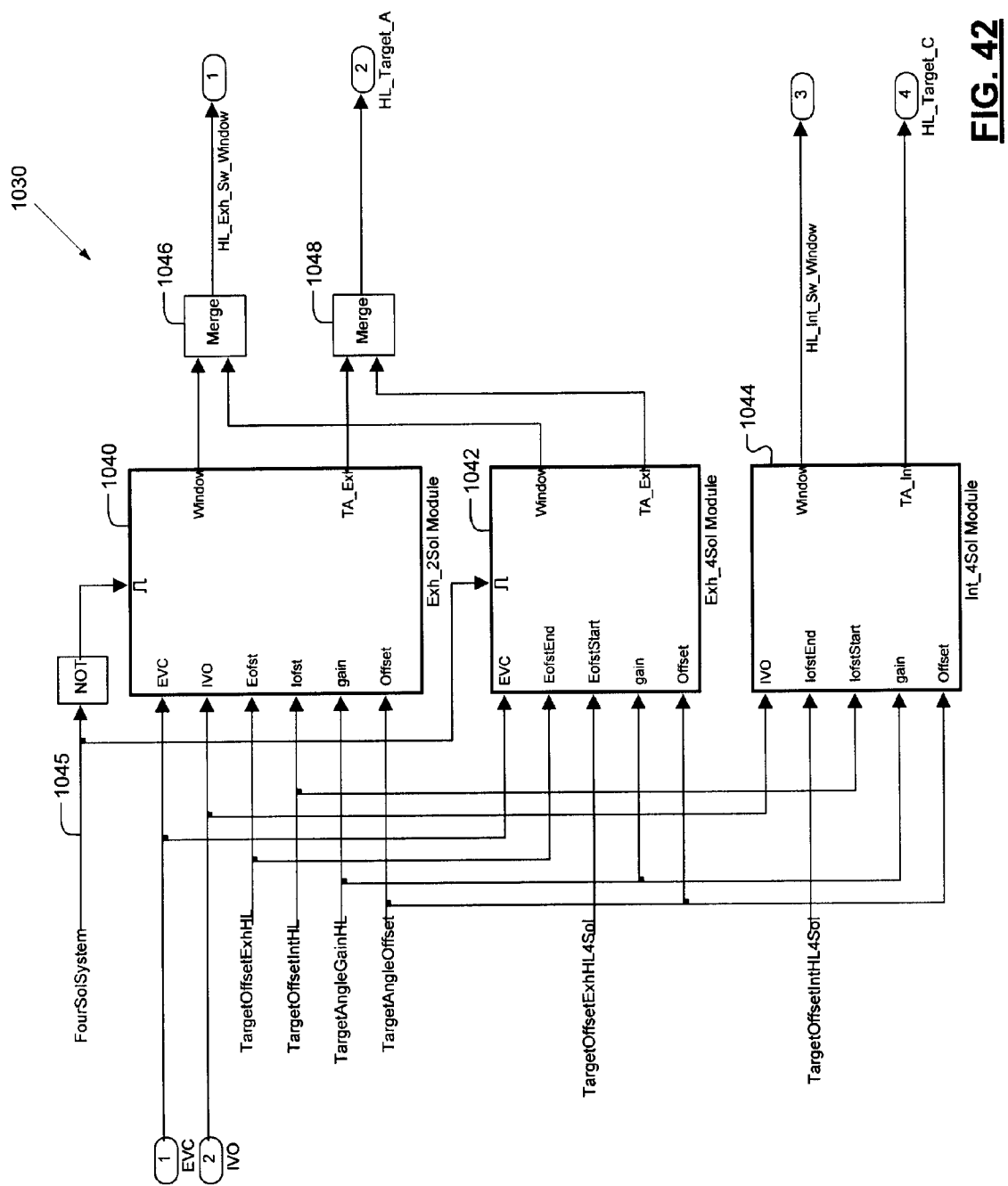
FIG. 42 is a functional block diagram of a window high low exhaust valve module of FIG. 41.

Referring now to FIG. 42, a functional block diagram of the window module 1030 of FIG. 41 is shown. The window module 1030 is setup for a two or four intake/exhaust valve solenoid control system. The window module 1030 includes a two solenoid exhaust module 1040, a four solenoid exhaust module 1042, and a four solenoid intake module 1044. The modules 1040-1044 may receive an activation signal 1045 based on operation of two or four solenoids. As above stated, in a two solenoid system intake and exhaust valves of a cylinder may share a solenoid, whereas in a four solenoid system, intake and exhaust valves of a cylinder may have independent or respective solenoids.

The two solenoid exhaust module 1040 generates a window signal and an exhaust target angle (TA_Exh) signal based on ECV, IVO, an exhaust target offset high to low (TargetOffsetExhHL) signal, an intake target offset high to low (TargetOffsetIntHL) signal, a target angle gain for high to low (TargetAngleGainHL) signal, and a target angle offset (TargetAngleOffset) signal. TargetOffsetExhHL indicates when an exhaust valve is opening. The offset and gain signals provide calibration information. The calibration information may be used to adjust target angles by percentage amounts of a switching window or by a target angle offset.

The four solenoid exhaust module 1042 generates an exhaust window signal (HL_Exh_Sw_Window), and an exhaust target angle (TA_Exh) signal based on EVC, TargetOffsetExhHL, TargetAngleGainHL, TargetAngleOffset and an exhaust target offset high to low (TargetOffsetExhHL4Sol) signal. TargetOffsetExhHL4Sol is an offset to calculate the start of the window from EVC.

The four solenoid intake module 1044 generates an intake window signal (HL_Int_Sw_Window) and intake target angle (HL_Target_C) signal based on IVO, TargetOffsetExhHL, TargetOffsetIntHL, TargetAngleGainHL, TargetAngleOffset, and an intake target offset high to low (TargetOffsetIntHL4Sol) signal. TargetOffsetIntHL4Sol is an offset to calculate the end of the window from IVO.

The window module 1030 also includes first and second merge devices 1046, 1048 that each have two inputs and an output. The first merge device 1046 selects the most recently modified window signal from the two and four solenoid exhaust modules 1040, 1042 to generate HL_Exh_Sw_Window. The second merge device 1048 selects the most recently modified TA_Exh signal from the two and four solenoid exhaust modules 1040, 1042 to generate HL_Target_A.

Figure 43:
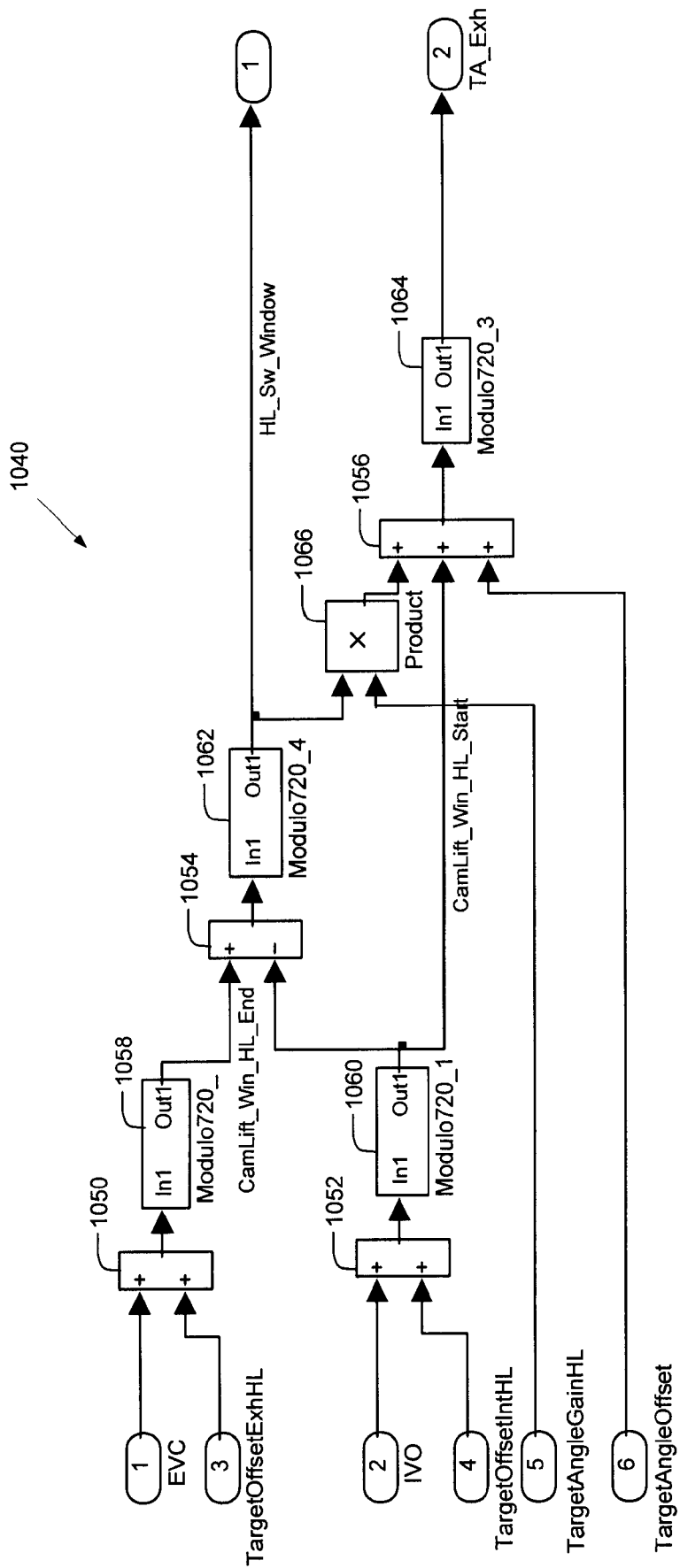
FIG. 43 is a functional block diagram of an exhaust two solenoid module of FIG. 42.

Referring now to FIG. 43, a functional block diagram of the exhaust two solenoid module 1040 of FIG. 42 is shown. The exhaust two solenoid module 1040 determines start, end, and size of switching window. The exhaust two solenoid module 1040 includes summers 1050-1056 and modulo modules 1058-1064. The first summer 1050 sums EVC and TargetOffsetExhHL. The first modulo module 1058 generates a camshaft lift window high to low end angle (CamLift_Win_HL_End) signal based on output of the first summer 1050. The second summer 1052 sums IVO and TargetOffsetIntHL. The second modulo module 1060 generates a camshaft lift window high to low start angle (CamLift_Win_HL_Start) signal based on output of the second summer 1052.

The third summer 1054 subtracts CamLift_Win_HL_Start from CamLift_Win_HL_End. The third modulo module 1062 generates a high to low switching window (HL_Sw_Window) signal based on the output of the third summer 1054. HL_Sw_Window is multiplied by TargetAngleGainHL via a multiplier 1066. The fourth summer 1056 sums the output of the multiplier 1066 with CamLift_Win_HL_Start and TargetAngleOffset. The fourth modulo module 1064 generates TA_Exh based on the output of the fourth summer 1056. TA_Exh may be based on percentage of the switching window and angle offset from the start of the switching window.

Figure 44:
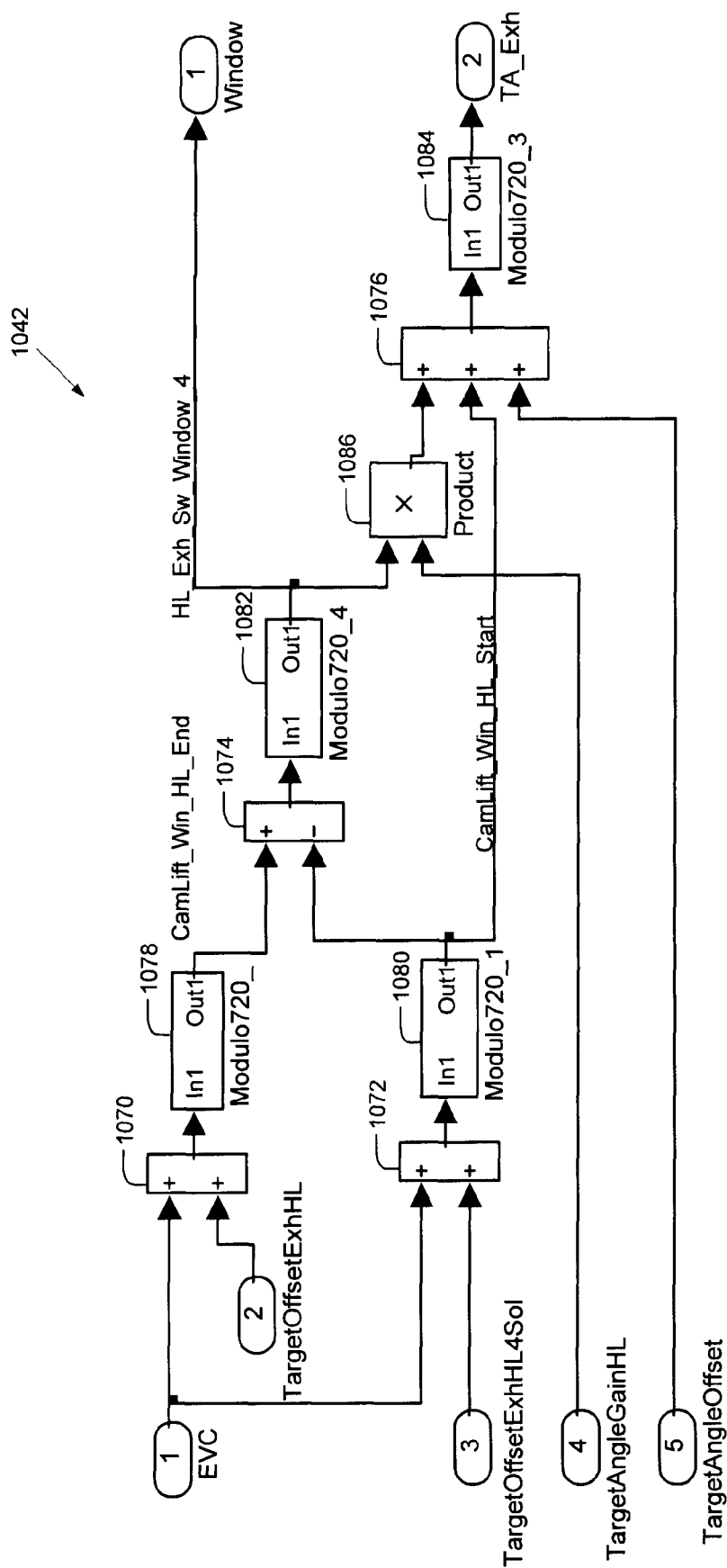
FIG. 44 is a functional block diagram of an exhaust four solenoid module of FIG. 42.

Referring now to FIG. 44, a functional block diagram of the exhaust four solenoid module 1042 of FIG. 42 is shown. The exhaust four solenoid module 1042 includes summers 1070-1076 and modulo modules 1078-1084. The first summer 1070 sums EVC and TargetOffsetExhHL. The first modulo module 1078 generates a camshaft lift window high to low end angle (CamLift_Win_HL_End) signal based on output of the first summer 1070. The second summer 1072 sums EVC and TargetOffsetExhHL4Sol. The second modulo module 1080 generates a camshaft lift window high to low start angle (CamLift_Win_HL_Start) signal based on output of the second summer 1072.

The third summer 1074 subtracts CamLift_Win_HL_Start from CamLift_Win_HL_End. The third modulo module 1082 generates a high to low exhaust switching window (HL_Exh_Sw_Window_4) signal based on the output of the third summer 1074. HL_Exh_Sw_Window_4 is multiplied by TargetAngleGainHL via a multiplier 1086. The fourth summer 1076 sums the output of the multiplier 1086 with CamLift_Win_HL_Start and TargetAngleOffset. The fourth modulo module 1084 generates TA_Exh based on the output of the fourth summer 1076. TA_Exh may be based on percentage of the switching window and angle offset from the start of the switching window.

Figure 45:
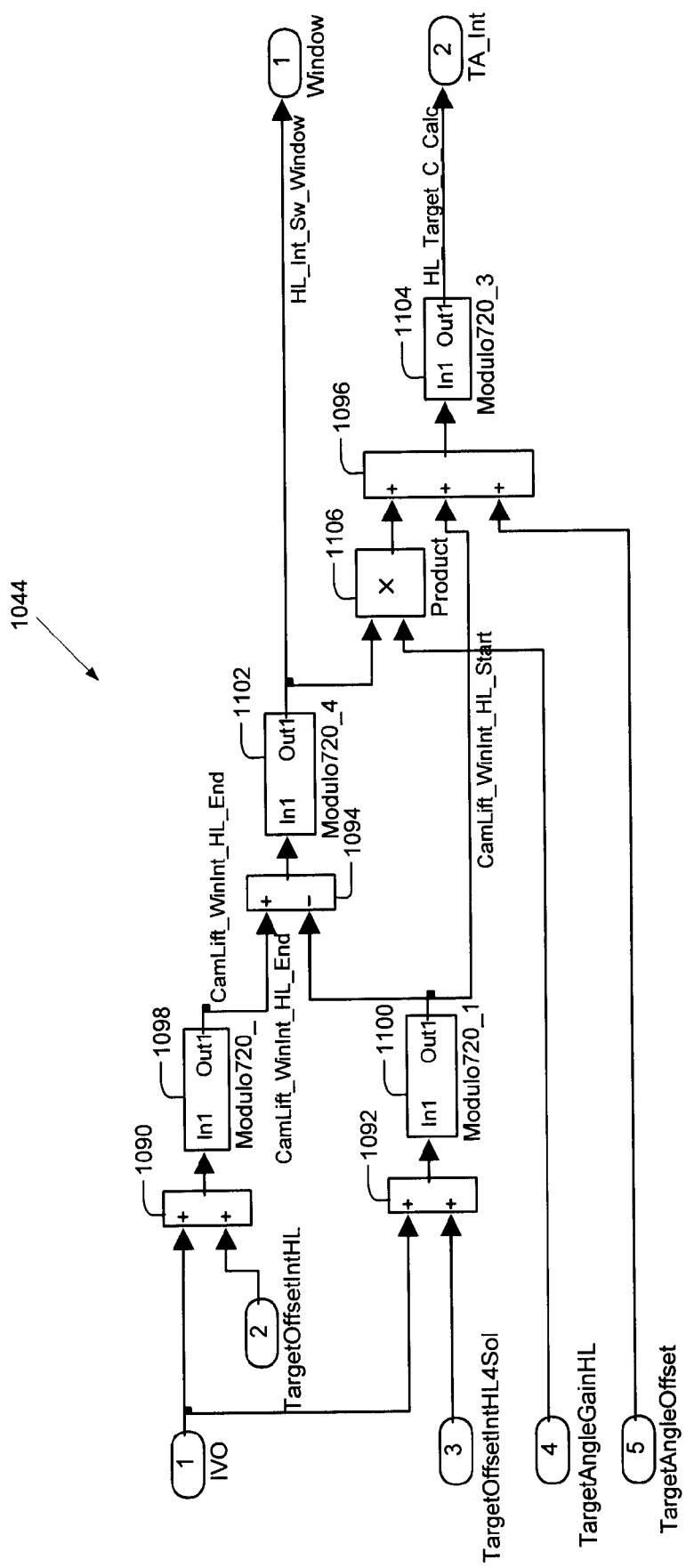
FIG. 45 is a functional block diagram of an intake four solenoid module of FIG. 42.

Referring now to FIG. 45, a functional block diagram of the intake four solenoid module 1044 of FIG. 42 is shown. The intake four solenoid module 1044 includes summers 1090-1096 and modulo modules 1098-1104. The first summer 1090 sums IVO and TargetOffsetIntHL. The first modulo module 1098 generates a camshaft lift window high to low end angle (CamLift_Win_HL_End) signal based on output of the first summer 1090. The second summer 1092 sums IVO and TargetOffsetIntHL4Sol. The second modulo module 1100 generates a camshaft lift window high to low start angle (CamLift_Win_HL_Start) signal based on output of the second summer 1092.

The third summer 1094 subtracts CamLift_Win_HL_Start from CamLift_Win_HL_End. The third modulo module 1102 generates a high to low intake switching window (HL_Int_Sw_Window_4) signal based on the output of the third summer 1094. HL_Int_Sw_Window_4 is multiplied by TargetAngleGainHL via a multiplier 1106. The fourth summer 1096 sums the output of the multiplier 1106 with CamLift_Win_HL_Start and TargetAngleOffset. The fourth modulo module 1104 generates TA_Int based on the output of the fourth summer 1096. TA_Int may be based on percentage of the switching window and angle offset from the start of the switching window.

Figure 46:
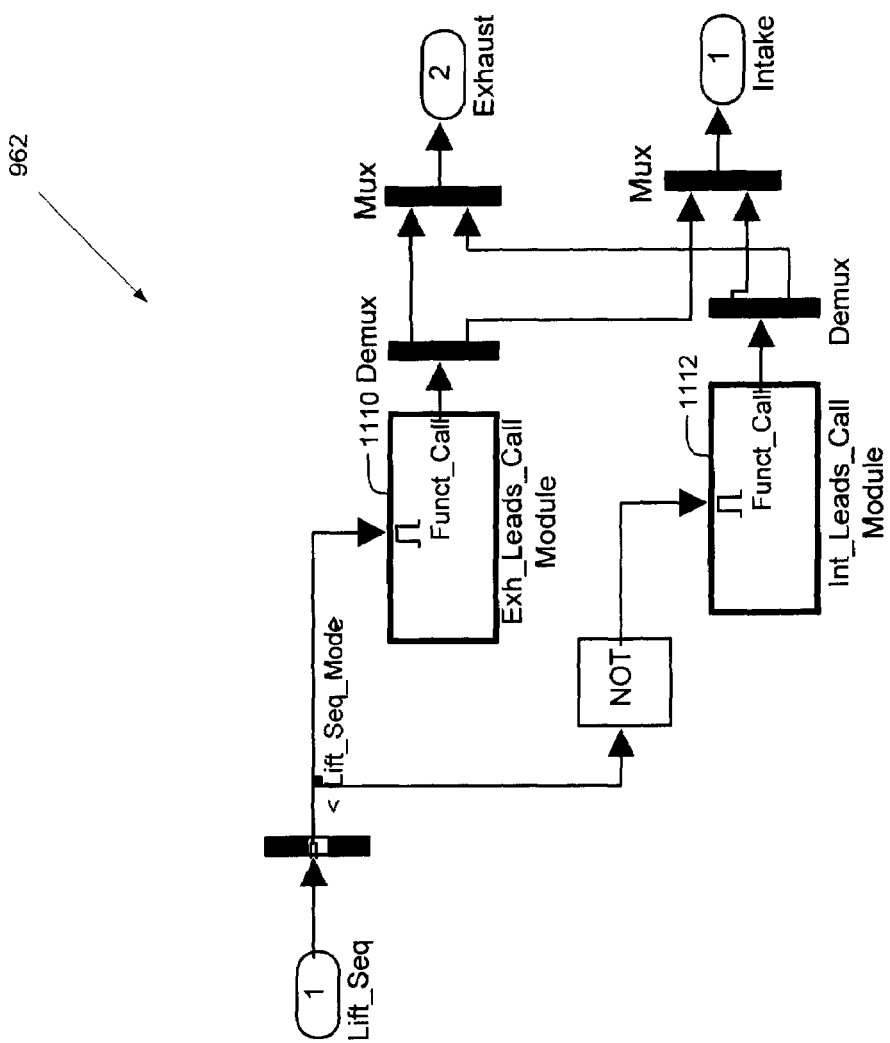
FIG. 46 is a functional block diagram of a lift sequence module of FIG. 37.

Referring now to FIG. 46, a functional block diagram of the lift sequence module 962 of FIG. 37 is shown. The lift sequence module 962 includes an exhaust lead calibration module 1110 and an intake lead calibration module 1112. The lift sequence module 962 allows for selecting which valves lead during a transition between lift modes. For example, the exhaust valves may change lift modes before the intake valves. As another example intake valves may change lift modes before the exhaust valves.

The intake and exhaust lead modules 1110, 1112 receive a Lift_Seq indicating the lift sequence mode. The lift sequence mode may be a intake lead mode or an exhaust lead mode. The Lift_Seq activates the appropriate one of the intake and exhaust lead modules 1110, 1112. Output of the exhaust lead module 1110 is provided to a demultiplexer to generate the intake and exhaust signals. Likewise, the output of the intake lead module 1012 is provided to a demultiplexer to also generate the intake and exhaust signals. The output of the demultiplexers is used to control the order of activation for modules 964 (exhaust) and 966 (intake) based on Lift_Seq_Mode.

The exhaust lead module 1110 and the intake lead module 1112 control activation of exhaust and intake modules that may set lift solenoid enable flags for solenoids A-D. The intake solenoids and the exhaust solenoids may be in low lift mode, high lift mode, in independent modes, transitioning between modes, or in intermediate modes mode for smooth transitioning. In one embodiment, intake valves are operated in low lift while exhaust valves are operated in high lift to improve fuel economy.

Figure 47:
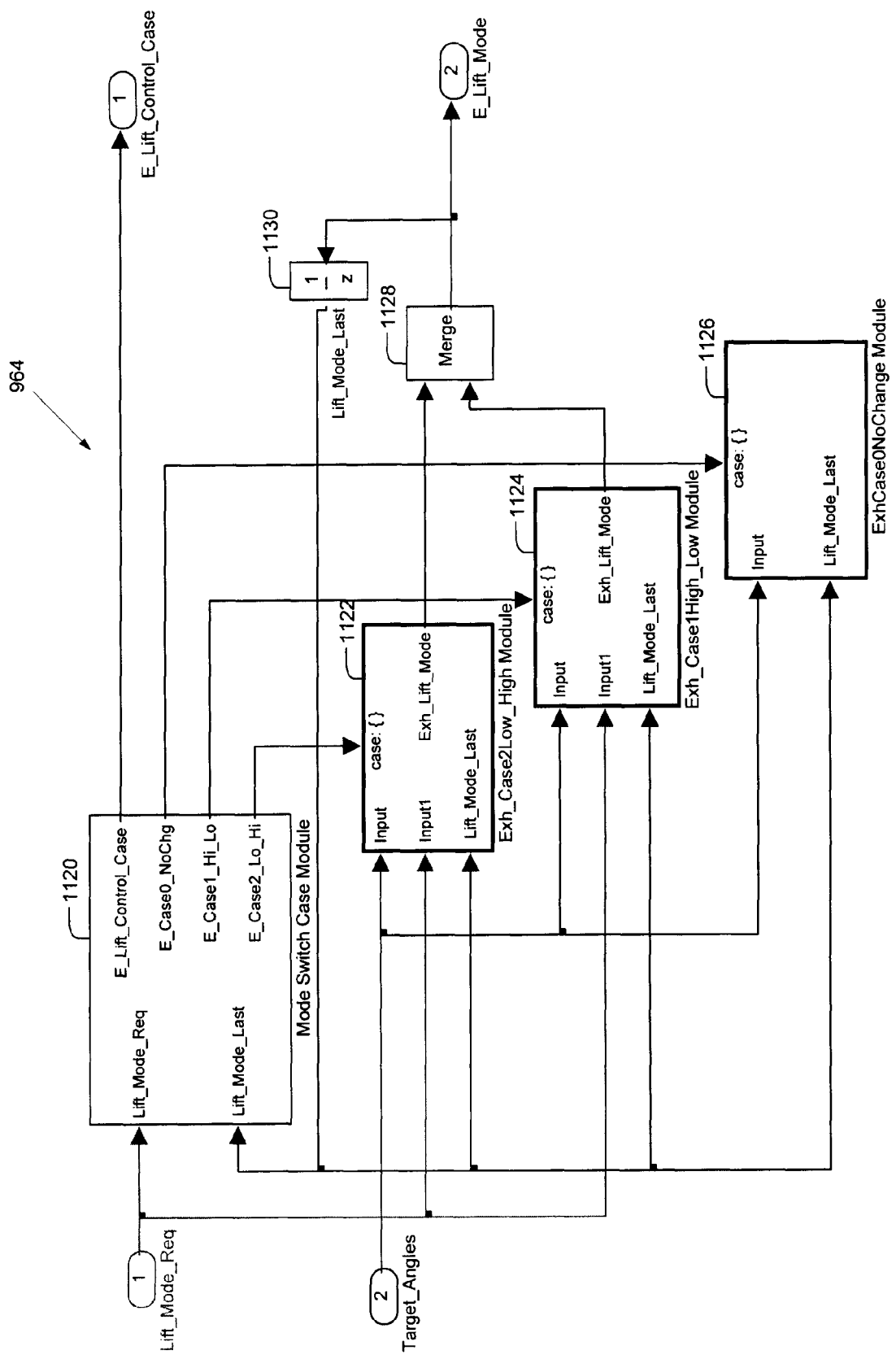
FIG. 47 is a functional block diagram of an exhaust lift control module of FIG. 37.

Referring now to FIG. 47, a functional block diagram of the exhaust lift control module 964 of FIG. 37 is shown. The exhaust lift control module includes a mode switch case module 1120, an exhaust low to high module 1122, an exhaust high to low module 1124, and an exhaust no change module 1126.

The mode switch case module 1120 generates E_Lift_Control_Case and activation signals for the modules 1122-1126 that include E_Case2_Lo_Hi, E_Case1_Hi_Lo and E_Case0_NoChg, respectively. E_Lift_Control_Case and the activation signals are generated based on Lift_Mode_Req and an exhaust lift mode active feedback (Lift_Mode_Last) signal.

The an exhaust low to high module 1122 generates an exhaust lift mode (Exh_Lift_Mode) signal based on Target_Angles, Lift_Mode_Req and Lift_Mode_Last. The exhaust high to low module 1124 includes similar logic as the exhaust low to high module 1122 and also generates an exhaust lift mode (Exh_Lift_Mode) signal based on Target_Angles, Lift_Mode_Req and Lift_Mode_Last. The outputs of the modules 1122 and 1124 are provided to a merge device 1128, which generates E_Lift_Mode. A one event delay of E_Lift_Mode is performed by device 1130 to generate Lift_Mode_Last. The exhaust no change module 1126 indicates no change in lift mode based on Target_Angles and Lift_Mode_Last.

Figure 48:
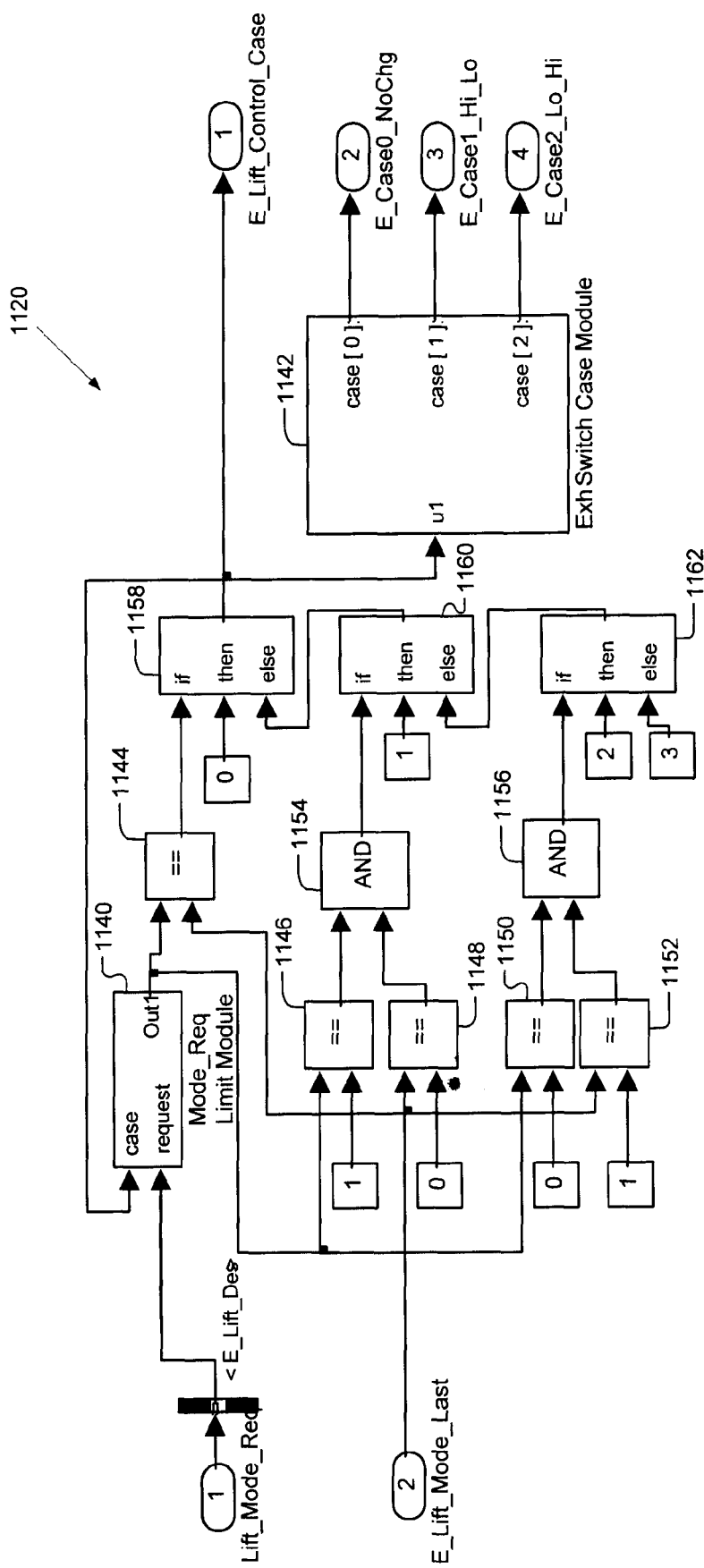
FIG. 48 is a functional block diagram of a mode switch case module of FIG. 47.

Referring now to FIG. 48, a functional block diagram of the mode switch case module 1120 of FIG. 47 is shown. The mode switch case module 1120 determines which, if any change in lift mode is requested to trigger appropriate logic. Lift_Mode_Req bus includes E_Lift_Des, I_Lift_Des, Lift_Seq_Node, and Lift_Seq_Delay. As examples, E_Lift_Des equals one (1) may mean low lift operation of exhaust valves is requested; E_Lift_Des equals zero (0) may mean high lift operation of exhaust valves is requested; I_Lift_Des equals one (1) may mean low lift operation of intake valves is requested; I_Lift_Des equals zero (0) may mean high lift operation of intake valves is requested; Lift_Seq_Mode equals one (1) exhaust valves lead switch; Lift_Seq_Mode equals zero (0) intake valves lead switch; and Lift_Seq_Delay may refer to a number of events to delay before performing a switch in lift modes. The mode switch case module 1120 includes a mode request limit module 1140, an exhaust switch case module 1142, comparators 1144-1152, AND gates 1154, 1156, and if/then/else modules 1158-1162.

The mode request limit module 1140 receives E_lift_Des from bus Lift_Mode_Req and a feedback output signal from the first if/then/else module 1158, E_Lift_Control_Case. Module 1140 forces a minimum number of engine events in each mode to prevent debounce E_Lift_Des. E_Lift_Des may be a zero (0) or a one (1) to request high and low lifts operation, respectively. Output of the mode request limit module 1140 is compared with E_Lift_Mode_Last. E_Lift_Mode_Last may be a zero (0), a one (1), a two (2), or a three (3) to represent a current mode of high lift, low lift, high to low lift switch in process, or low to high lift switch in process, respectively. When the output of the mode request limit module 1140 is equal to E_Lift_Mode_Last, output of the first comparator 1144 is HIGH. When the output of the first comparator is HIGH, output of the first if/then/else module 1158 is zero (0) or E_Lift_Control_Case is zero (0). When the output of the first comparator is LOW than E_Lift_Control_Case is set equal to the output of the second if/then/else module 1160.

The output of the mode request limit module is compared with one (1) by the second comparator 1146 and is compared with zero (0) by the fourth comparator 1150. E_Lift_Mode_Last is compared with zero (0) by the third comparator 1148 and one (1) by the fifth comparator 1152. Outputs of the second and third comparators 1146, 1148 are provided to the first AND gate 1154. Outputs of the fourth and fifth comparators 1150, 1152 are provided to the second AND gate 1156.

When the output of the first AND gate is HIGH, output of the second if/then/else module 1160 is one (1). When the output of the first AND gate is LOW, output of the second if/then/else module 1160 is set equal to the output of the third if/then/else module 1162.

When the output of the second AND gate is HIGH, output of the third if/then/else module 1162 is two (2). When the output of the second AND gate is LOW, output of the third if/then/else module 1162 is three (3).

An E_Lift_Control_Case of zero (0) may refer to no change in lift mode, of one (1) may refer to a transition from high to low lift, of two (2) may refer to a transition from low to high lift, of three (3) may refer to an invalid mode.

The exhaust switch case module 1142 may generate enable/disable signals associated which each of the possible states of E_Lift_Control_Case. The outputs of the exhaust switch case module 1142 may include no change (E_Case0_NoChg) signal, an exhaust high to low lift (E_Case1_Hi_Lo) signal, and an exhaust low to high lift (E_Case2_Lo_Hi) signal to activate the corresponding modules 1122-1126.

Figure 49:
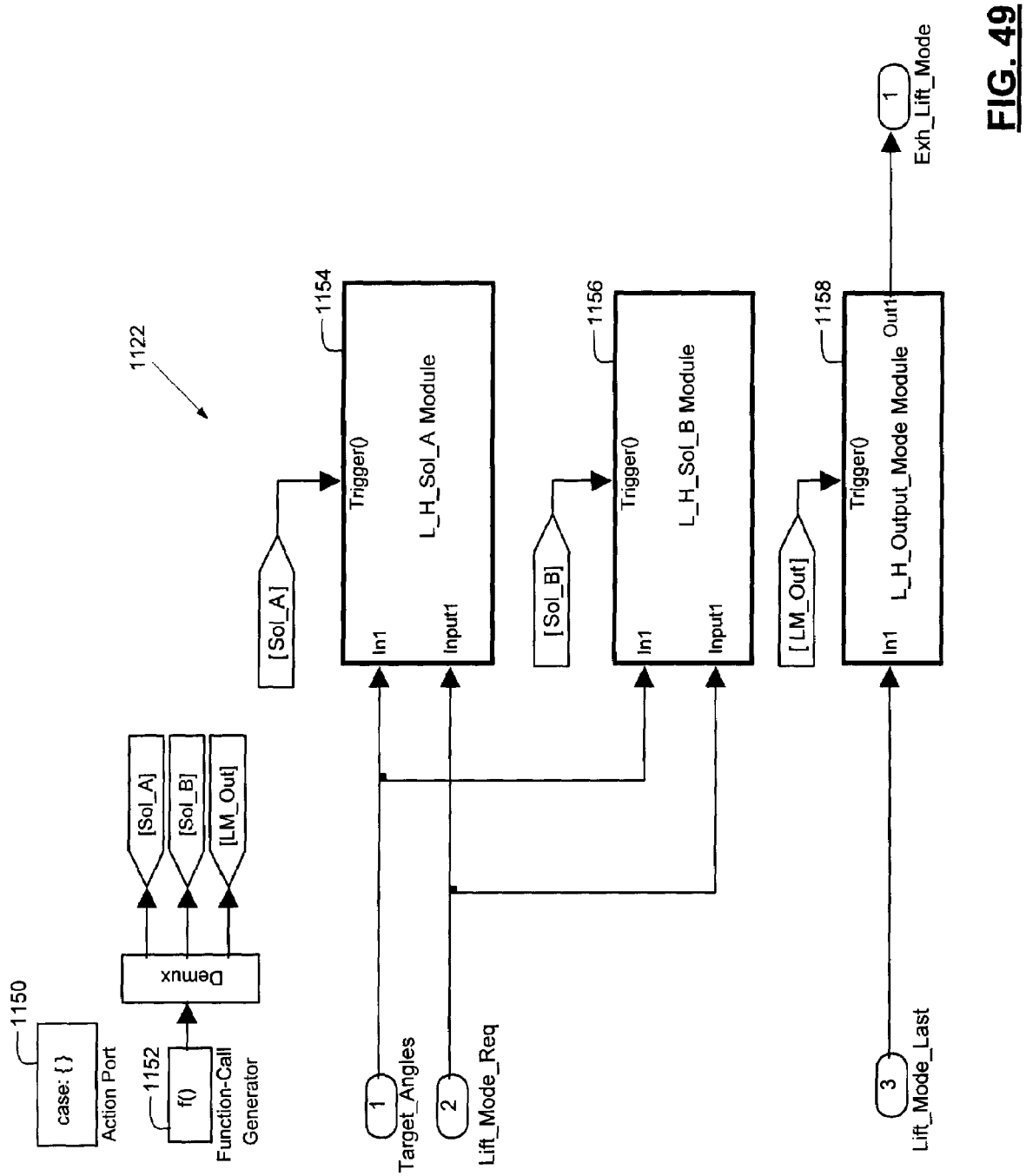
FIG. 49 is a functional block diagram of an exhaust case two low-to-high module of FIG. 47.
Figure 50A:
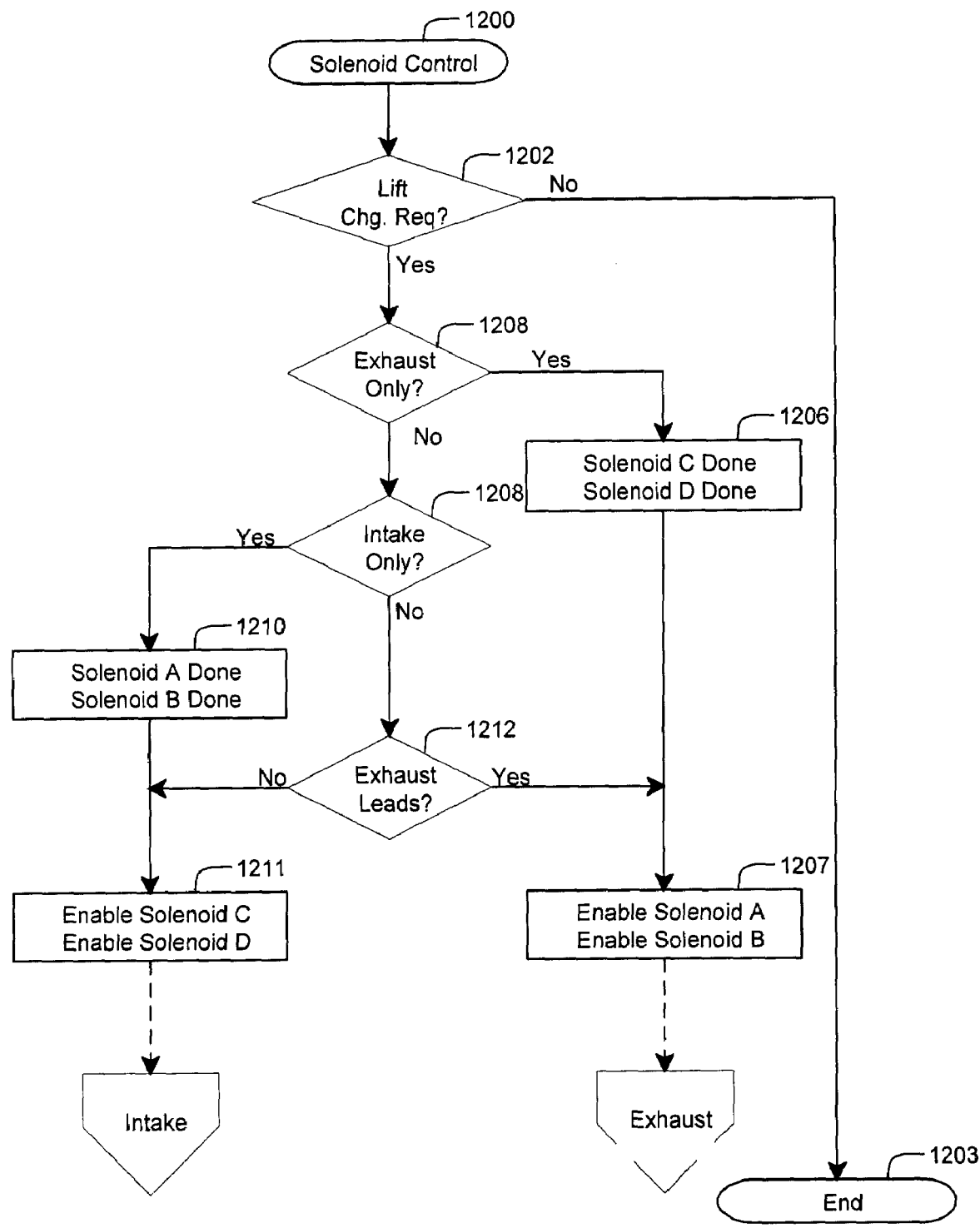
FIG. 50A is a logic flow diagram illustrating a method of controlling a valvetrain in accordance with an embodiment of the present disclosure.
Figure 50B:
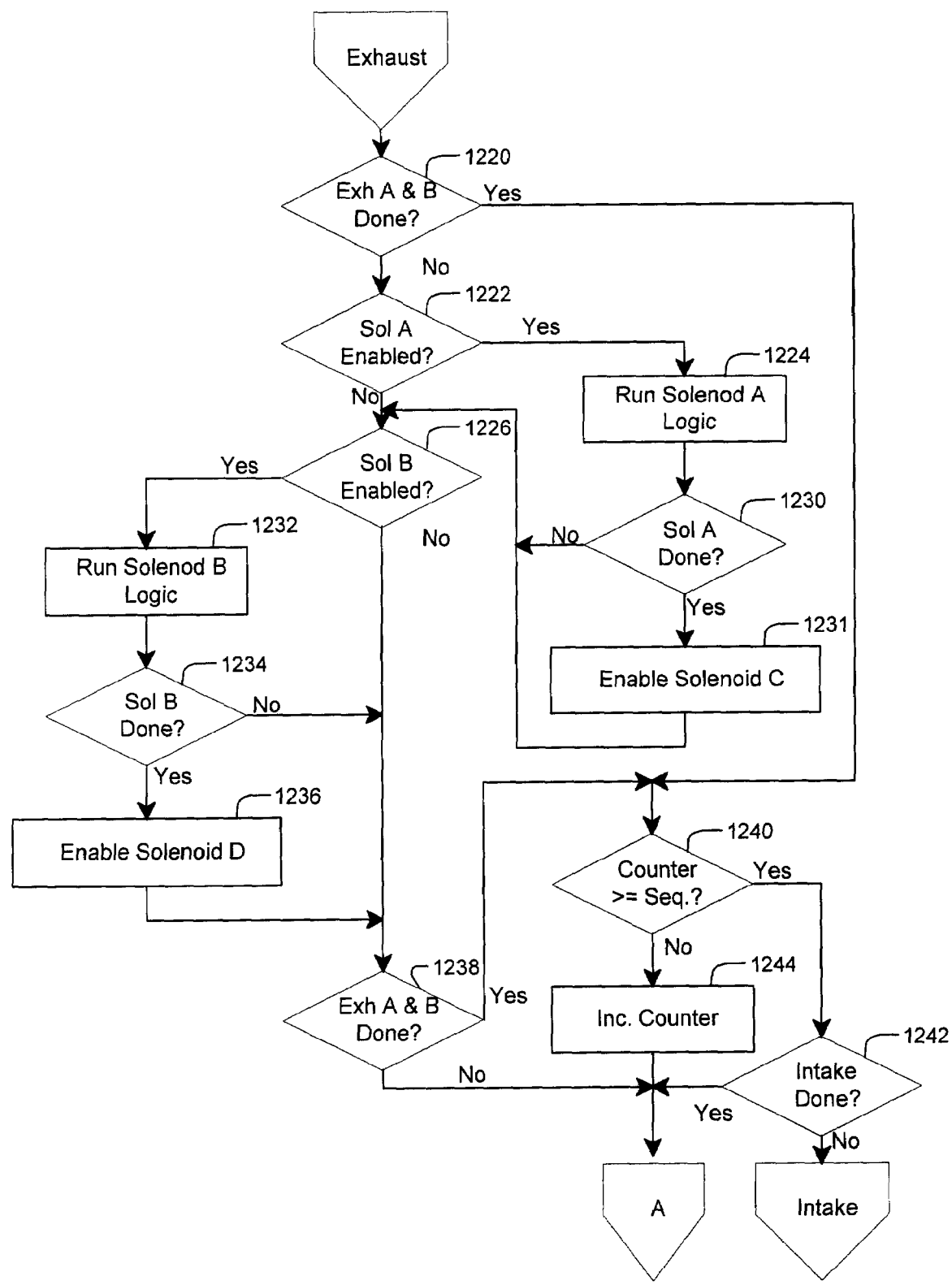
FIG. 50B is a continuance of FIG. 50A.
Figure 50C:
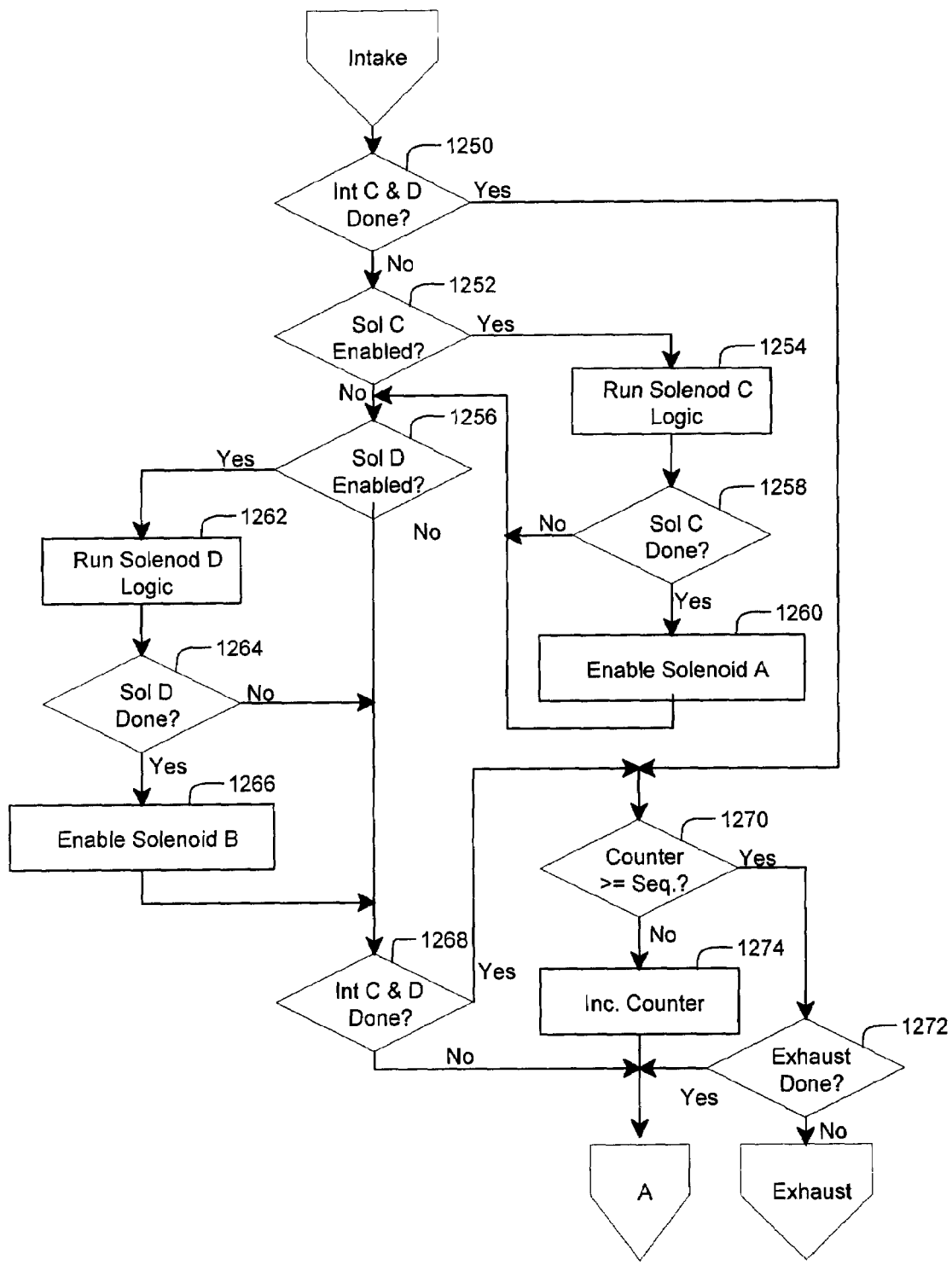
FIG. 50C is a continuance of FIGS. 50A-50B.
Figure 50D:
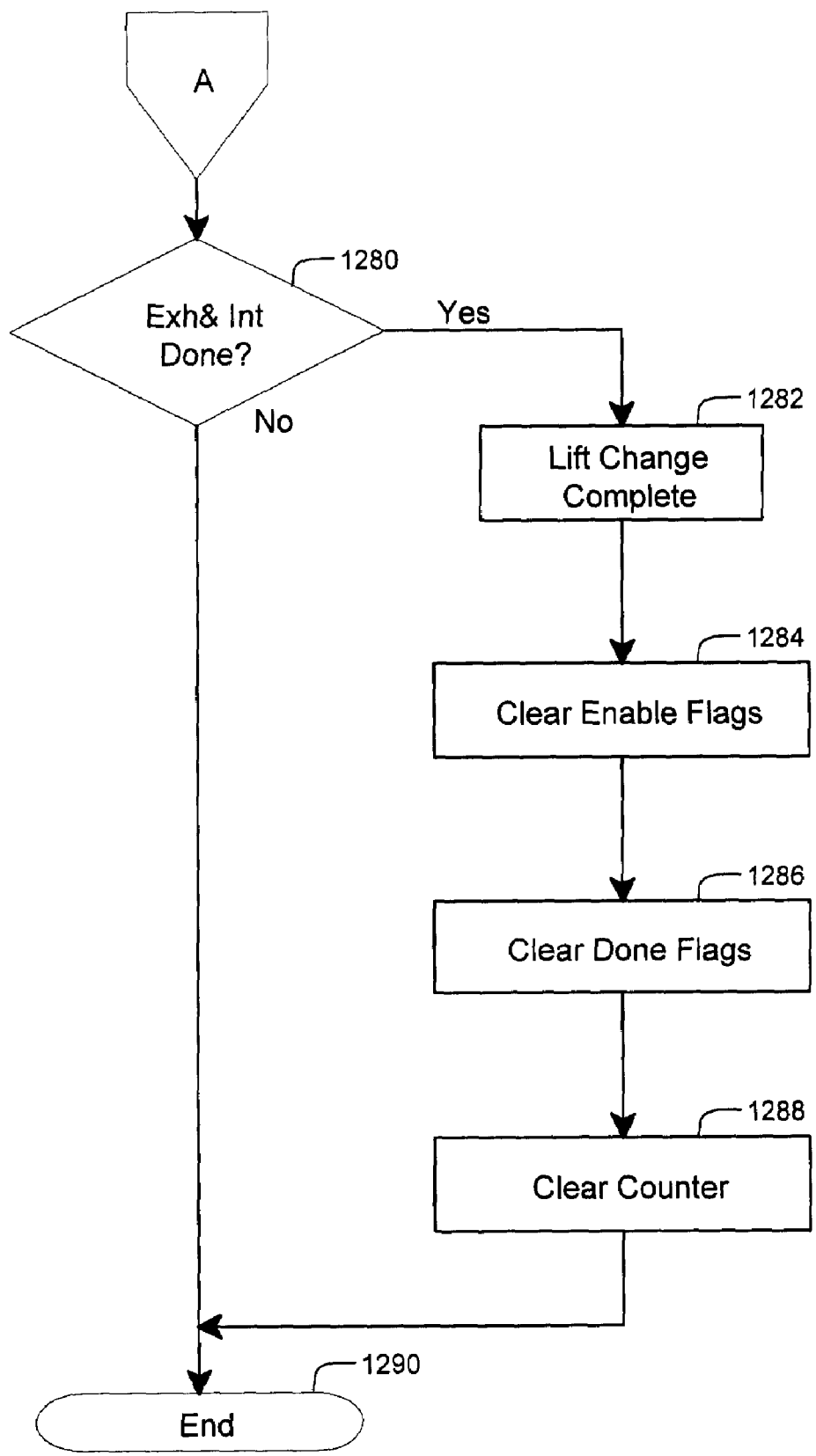
FIG. 50D is a continuance of FIGS. 50A-50C.

Referring now to FIG. 49, a functional block diagram of the exhaust case two low-to-high module 1122 of FIG. 47 is shown. The exhaust case two low-to-high module 1122 includes an action port 1150, a function call generator 1152, a low to high solenoid A module 1154, a low to high solenoid B module 1156 and a low to high output mode module 1158.

The action port 1150 is activated by module 1120 The function call generator generates lift solenoid output state Sol_A, Sol_B signals and limit output (LM_Out) signal. Sol_A and Sol_B are used to trigger the solenoid A and B modules 1154 and 1156 and LM_Out is used to trigger the output module 1158 in sequence. The output module generates Exh_Lift_mode based on Lift_Mode_Last.

The solenoid A and B modules 1154, 1156 control operation of solenoids A and B based on lift solenoid output states Sol_A, Sol_B. Sol_A and Sol_B may be zero (0) referring to a state of looking for a start angle, one (1) referring to a state of looking for an end angle, two (2) referring to a state of being near a target angle, three (3) referring to a state of looking for a cylinder identification flag, and four (4) that output of solenoid status is complete. When the crankshaft is near start angle for solenoid A or B, the associated solenoid may be activated. When solenoid A or B is activated a flag may be generated to indicate the switch. The cylinder identification flag is used for synchronized engine position to indicate when in low or high lift at current crankshaft angle.

Referring now to FIGS. 50A-50D, a logic flow diagram illustrating a method of controlling a valvetrain is shown. Although the following steps are described for a four cylinder engine having four solenoids for control of intake and exhaust lift modes, they may be applied to other engines. For the following steps, solenoid A controls exhaust valves for cylinders 1 and 2, solenoid B controls exhaust valves for cylinders 3 and 4, solenoid C controls intake valves for cylinders 1 and 2, and solenoid D controls intake valves for cylinders 3 and 4.

Solenoid control begins at 1200. In step 1202 when a lift mode change request is generated control proceeds to step 1204, otherwise control ends at 1203. In step 1204, when the lift mode request is for exhaust valves and not for intake valves, control proceeds to step 1206, otherwise to step 1208. In step 1208, when the lift mode request is for intake valves and not for exhaust valves, control proceeds to step 1210, otherwise to step 1212 for lift mode request for both exhaust and intake. In step 1210 for intake and not exhaust, solenoids A and B for exhaust are set to done.

In step 1212, when a switch in exhaust valve lift mode leads a switch in intake valve lift mode, control proceeds to step 1207, otherwise to step 1211. In step 1207, logic for the solenoids A and B is enabled. After step 1207 control proceeds to step 1220. In step 1211, logic for the solenoids C and D is enabled. After step 1211 control proceeds to step 1250.

In step 1220, when a switch in exhaust valves A and B has occurred, control proceeds to step 1240, otherwise to step 1222. In step 1222, when solenoid A logic is enabled, control proceeds to step 1224, otherwise to step 1226. In step 1224, control runs solenoid A logic to perform a switch in lift mode and sets Exh A done flag when completed. In step 1228, when a switch has occurred for solenoid A, control proceeds to step 1230, otherwise to step 1226. In step 1231, logic for solenoid C is enabled.

In step 1226, when solenoid B logic is enabled control proceeds to step 1232, otherwise to step 1238. In step 1232, control runs solenoid B logic to perform a switch in lift mode for solenoid B and sets Exh B Done when completed. In step 1234, when solenoid B has switched modes, control proceeds to step 1236, otherwise to step 1238. In step 1236, control enables logic for the solenoid D.

In step 1238, when a switch has completed for both exhaust solenoids A and B control proceeds to step 1240, otherwise to step 1280. In step 1240, when a counter is greater than or equal to a delay (Seq.), control proceeds to step 1242, otherwise to step 1244. In step 1244 the counter is incremented. In step 1242 when the intake valves have been switched control proceeds to step 1280, otherwise to step 1250.

In step 1250, when solenoids C and D have been switched control proceeds to step 1270, otherwise to step 1252. In step 1252, when solenoid C logic is enabled, control proceeds to step 1254, otherwise to step 1256. In step 1254, control runs solenoid C logic to switch operating mode of solenoid C and sets Int C done flag when completed. In step 1258, when the switch for solenoid C is done, control proceeds to step 1260, otherwise to step 1256.

In step 1256, when solenoid D logic is enabled control proceeds to step 1262. In step 1262, control runs solenoid D logic to switch operating mode of solenoid D and sets Int D done flag when completed. In step 1264, when a switch has been performed for solenoid D, control proceeds to step 1266, otherwise to step 1268. In step 1266, control enables solenoid B logic. In step 1268 when a switch has occurred for solenoids C and D, control proceeds to step 1270, otherwise to step 1280.

In step 1270, when the counter is greater than or equal to the delay Seq., control proceeds to step 1272, otherwise to step 1280. In step 1272 when the exhaust solenoids have been switched, control proceeds to step 1280, otherwise to step 1220.

In step 1280, when exhaust and intake solenoids have been switched control proceeds to step 1282, otherwise control may proceed to 1290 and end or return to step 1202 to complete the pending switch or perform another switch. In step 1282, a lift change complete indication is generated. In step 1284, enable flags which may have been set in the above steps for solenoids A-D, are cleared for solenoids A-D. In step 1286, done flags, which may have been set in the above steps for solenoids A-D, are cleared. In step 1288, the counter is cleared. After step 1288, control may proceed to step 1290 or return to step 1202.

The above-described steps are meant to be illustrative examples; the steps may be performed sequentially, synchronously, simultaneously, continuously, during overlapping time periods or in a different order depending upon the application.

Figure 51:
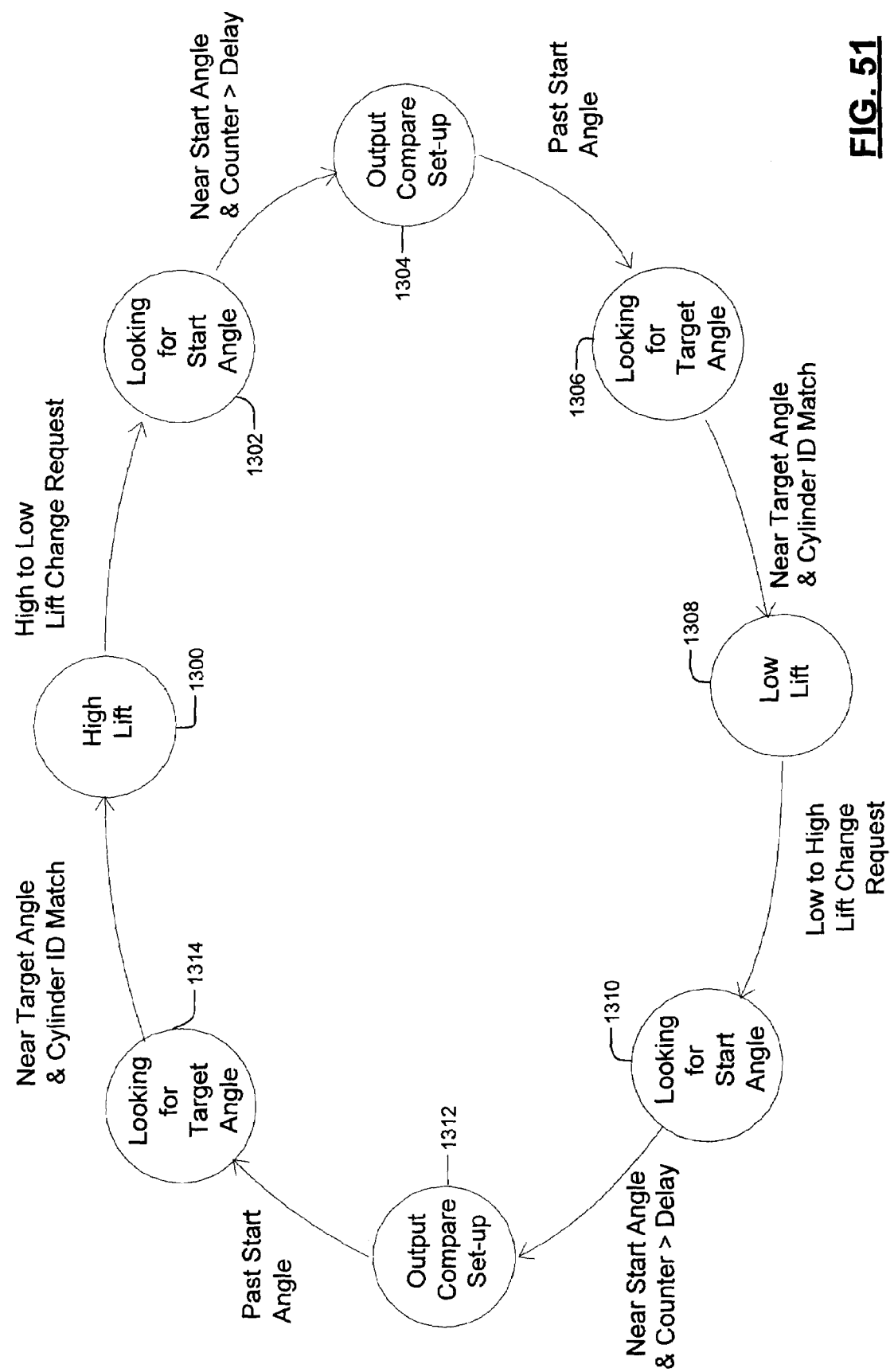
FIG. 51 is a state flow diagram illustrating a method of controlling a valvetrain in accordance with another embodiment of the present disclosure.

Referring now to FIG. 51, a state flow diagram illustrating a method of controlling a valvetrain solenoid and reporting status flags are shown.

When a solenoid is in a high lift state, as generally indicated by state 1300, and transition to a low lift state, control generates a high to low lift change request. In state 1302, control monitors the crankshaft angle to locate a precalculated start angle. The start angle may, for example, be based on a target angle to begin a switch and oil pressure, response time and voltage change at the solenoid.

When the crankshaft angle is near the start angle and the counter is greater than the delay Seq., control proceeds to state 1304. In state 1304, control compares a current crankshaft angle with a predetermined crankshaft angle. When the crankshaft angle is equal to the predetermined crankshaft angle, control activates solenoid A.

When the crankshaft angle is past the start angle, control is in state 1306. In state 1306, control looks for the target angle. When the crankshaft angle is near the target angle and cylinder identification is a match, control determines that the solenoid is in low lift mode, as provided by state 1308. States 1310-1314 are similar to states 1302-1306, however they are modified for switching from low lift to high lift.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A valve control system for an internal combustion engine comprising:
    a valve actuation system that actuates each of an intake valve and an exhaust valve between N open lift modes, where N is an integer greater than one; and
    a control module that defines a switching window having a start time based on intake valve timing and an end time based on exhaust valve timing,
    wherein said control module enables transitioning of at least one of said intake and exhaust valves between said N open lift modes based on said switching window.

2. The valve control system of claim 1 further comprising a plurality of sensors that generate sensor signals,
    wherein said control module enables said transitioning based on said sensor signals.

3. The valve control system of claim 2 wherein said plurality of sensors comprise at least one of a power supply sensor, an oil temperature sensor, and a coolant temperature sensor, an engine speed sensor, a crank shaft angle sensor, a cylinder identification sensor, an intake camshaft position sensor, and an exhaust valve camshaft position sensor.

4. The valve control system of claim 1 wherein said start time is associated with opening of an intake valve and said end time is associated with opening of an exhaust valve.

5. The valve control system of claim 1 wherein said control module prevents transitioning between said N open lift modes when response time to switch between said N open lift modes is greater than duration of said switching window.

6. The valve control system of claim 1 wherein said control module switches open lift mode of a selected one of said intake valve or said exhaust valve before switching the other one of said intake valve and said exhaust valve.

7. The valve control system of claim 1 wherein said control module determines duration of said switching window, and
    wherein said control module switches between said N open lift modes based on said duration.

8. The valve control system of claim 1 wherein said control module determines position of said switching window in time relative to crankshaft timing, and
    wherein said control module switches between said N open lift modes based on said position.

9. The valve control system of claim 1 wherein said control module determines a target angle for switching between said N open lift modes based on at least one of said start time, said end time, an offset from said switching window start time, an offset from said switching window end time, and a percentage of switching window duration.

10. The valve control system of claim 1 comprising a time module that generates a response time signal and a lift limit signal based on sensor signals,
    wherein said control module enables said transitioning based on said response time signal and said lift limit signal.

11. The valve control system of claim 10 wherein said lift limit signal comprises at least one of a lift control valve voltage limit signal, an engine speed limit signal, an oil temperature signal, an oil pressure signal, a switching window limit signal, and an engine coolant temperature limit signal.

12. The valve control system of claim 1 comprising a time module that generates a response time signal and a lift limit signal based a current lift mode signal and a lift flag signal,
    wherein said control module enables said transitioning based on said response time signal and said lift flag signal.

13. The valve control system of claim 1 further comprising sensors that generate at least one of a power supply signal, an oil temperature signal and a coolant temperature signal,
    wherein said control module generates a response time signal and a lift limit signal based on at least one of said power supply signal, said oil temperature signal and said coolant temperature signal, and
    wherein said control module enables said transitioning based on said response time signal and said lift limit signal.

14. The valve control system of claim 1 comprising an event module that generates a current lift mode signal and a lift flag signal based on a response time signal and a lift limit signal,
    wherein said control module enables said transitioning based on said current lift mode signal and said lift flag signal.

15. The valve control system of claim 1 further comprising sensors that generate at least one of a crank angle signal, a cylinder identification signal, an intake camshaft position signal, and an exhaust camshaft position signal,
    wherein said control module generates a current lift mode signal and a lift flag signal based on at least one of said crank angle signal, said cylinder identification signal, said intake camshaft position signal, and said exhaust camshaft position signal, and
    wherein said control module enables said transitioning based on said current lift mode signal and said lift flag signal.

16. The valve control system of claim 1 further comprising:
    a time module that generates a response time signal and a lift limit signal based on a current lift mode signal and a lift flag signal; and
    an event module that generates said current lift mode signal and said lift flag signal based on said response time signal and said lift limit signal.

17. The valve control system of claim 1 wherein said control module determines a target angle and enables said transitioning based on said target angle,
    wherein said target angle includes a crankshaft target angle that is associated with a transition start time of one of said intake and exhaust valves.

18. The valve control system of claim 1 wherein said control module prevents said transitioning based on response time of said valve actuation system.

19. The valve control system of claim 18 wherein said control module generates a response crank angle position based on said response time and prevents said transitioning based on said crank angle position.

20. The valve control system of claim 19 wherein said control module prevents said transitioning based on at least one of valve assembly oil pressure variation, lift transition pin response variation, valve assembly oil pressure error estimation, and lift transition pin response error estimation.

21. The valve control system of claim 1 wherein said switching window is associated with a time duration in which transition between said open lift modes is permitted.

22. The valve control system of claim 1 wherein said control module permits said transitioning when initiation and completion of said transitioning can occur within said switching window.

23. The valve control system of claim 1 wherein said switching window has a duration that varies based on camshaft phasing of said intake and exhaust valves.

24. A homogeneous charge compression ignition (HCCI) system for an engine comprising the valve control system of claim 1 and comprising:
    a valvetrain with intake and exhaust valves; and
    a valve lift control circuit that actuates and adjusts lift of said intake and exhaust valves.

* * * * *